US007942734B2

(12) United States Patent
Alderucci et al.

(10) Patent No.: US 7,942,734 B2
(45) Date of Patent: May 17, 2011

(54) AMUSEMENT DEVICES AND GAMES INCLUDING MEANS FOR PROCESSING ELECTRONIC DATA WHERE ULTIMATE OUTCOME OF THE GAME IS DEPENDENT ON RELATIVE ODDS OF A CARD COMBINATION AND/OR WHERE CHANCE IS A FACTOR: EXPECTED BIASES SUCH AS LONG SHOT AND FAVORITE BIAS

(75) Inventors: Dean P. Alderucci, New York, NY (US); Charles Plott, Pasadena, CA (US); Mark Miller, New York, NY (US)

(73) Assignee: CFPH, LLC, New York, NY (US)

( * ) Notice: Subject to any disclaimer, the term of this patent is extended or adjusted under 35 U.S.C. 154(b) by 62 days.

(21) Appl. No.: 12/367,604

(22) Filed: Feb. 9, 2009

(65) Prior Publication Data

US 2010/0203940 A1 Aug. 12, 2010

(51) Int. Cl.
*A63F 13/00* (2006.01)
*A63F 1/18* (2006.01)

(52) U.S. Cl. ........... 463/21; 463/16; 463/42; 273/138.1; 273/139; 273/461

(58) Field of Classification Search .............. 463/17-22, 463/24-29, 33, 42-43, 16; 273/138.1, 138.2, 273/139, 141 A, 269, 454-456, 460-461
See application file for complete search history.

(56) References Cited

U.S. PATENT DOCUMENTS 4,285,521 A 8/1981 Joel, III
4,296,927 A 10/1981 Larsen
4,379,555 A 4/1983 Dean
4,443,012 A 4/1984 Makovic et al.
4,593,904 A 6/1986 Graves
4,779,871 A * 10/1988 Rasmussen .................. 273/161
4,795,160 A 1/1989 Sterling
4,998,735 A * 3/1991 Blackwell, III ............... 273/249
5,411,257 A 5/1995 Fulton
5,544,892 A 8/1996 Breeding
5,573,244 A * 11/1996 Mindes ........................... 463/26
5,573,249 A 11/1996 Johnson
5,645,486 A * 7/1997 Nagao et al. .................... 463/27
5,672,106 A * 9/1997 Orford et al. ................... 463/28
5,823,873 A 10/1998 Moody
5,868,619 A 2/1999 Wood et al.
6,193,606 B1 * 2/2001 Walker et al. ................... 463/20
6,302,791 B1 * 10/2001 Frohm et al. .................... 463/21
6,394,899 B1 * 5/2002 Walker .............................. 463/9
(Continued)

OTHER PUBLICATIONS

Noth, M. et al. "Information Aggregation in Experimental Asset markets: Traps and Misaligned Beliefs," Social Science Working Paper No. 1060. Pasadena: California Institute of technology (Apr. 1999).

(Continued)

*Primary Examiner* — David L Lewis
*Assistant Examiner* — Arthur O. Hall

(57) ABSTRACT

Games related to the provision of information are described. Games may be formulated to exploit biases such as long shot bias and favorite bias. Games related to the provision of information are described. Games may be formulated to exploit biases relating to the Monty Hall paradox. Games related to the provision of information are described. Games may include wagering on hands of cards, e.g., poker wagering games.

78 Claims, 13 Drawing Sheets

U.S. PATENT DOCUMENTS

| | | | | |
|---|---|---|---|---|
| 6,568,680 | B1 | 5/2003 | Moody et al. | |
| 6,666,765 | B2 * | 12/2003 | Vancura | 463/9 |
| 6,857,959 | B1 | 2/2005 | Nguyen | |
| 6,863,606 | B1 * | 3/2005 | Berg et al. | 463/16 |
| 6,966,834 | B1 * | 11/2005 | Johnson | 463/25 |
| 7,001,278 | B2 * | 2/2006 | Maya et al. | 463/26 |
| 7,111,845 | B2 | 9/2006 | Walker et al. | |
| 7,201,655 | B2 * | 4/2007 | Walker et al. | 463/13 |
| 7,297,059 | B2 * | 11/2007 | Vancura et al. | 463/27 |
| 7,452,273 | B2 * | 11/2008 | Amaitis et al. | 463/22 |
| 7,607,976 | B2 * | 10/2009 | Baerlocher et al. | 463/16 |
| 7,618,319 | B2 * | 11/2009 | Casey et al. | 463/25 |
| 7,654,533 | B2 * | 2/2010 | Seal | 273/429 |
| 7,704,137 | B2 * | 4/2010 | Englman | 463/16 |
| 7,713,123 | B2 * | 5/2010 | Gerson et al. | 463/25 |
| 7,736,236 | B2 | 6/2010 | Soltys et al. | |
| 7,740,539 | B2 | 6/2010 | Simon | |
| 7,758,048 | B1 * | 7/2010 | Crapuchettes et al. | 273/274 |
| 2005/0197183 | A1 * | 9/2005 | Walker et al. | 463/25 |
| 2006/0094506 | A1 * | 5/2006 | Tarter et al. | 463/42 |
| 2006/0116198 | A1 | 6/2006 | Leen et al. | |
| 2006/0135252 | A1 | 6/2006 | Amaitis et al. | |
| 2006/0154721 | A1 | 7/2006 | Okuniewicz | |
| 2006/0232008 | A1 | 10/2006 | Goldberg | |
| 2006/0258433 | A1 | 11/2006 | Finocchio et al. | |
| 2008/0058052 | A1 | 3/2008 | Schwartz et al. | |
| 2008/0081688 | A1 | 4/2008 | Plowman | |
| 2008/0146311 | A1 * | 6/2008 | Walker et al. | 463/20 |
| 2008/0248850 | A1 | 10/2008 | Schugar | |
| 2008/0318651 | A1 | 12/2008 | Gross et al. | |
| 2009/0233665 | A1 | 9/2009 | Okada | |

OTHER PUBLICATIONS

U.S. Appl. No. 12/172,310, filed Jul. 14, 2008; 88 pages.
U.S. Appl. No. 12/368,444, filed Feb. 10, 2009; 187 pages.
U.S. Appl. No. 12/368,446, filed Feb. 10, 2009; 188 pages.
Charles R. Plott, et al.; Division of the Humanities and Social Sciences California Institute of Technology; Information Aggregation Mechanisms; Concept, Design and Implementation for a Sales Forecasting Problem; 33 pages; Mar. 2002.
U.S. PTO Office Action for U.S. Appl. No. 12/172,310; Nov. 29, 2010; 17 pages.
Notice of Allowance for U.S. Appl. No. 12/368,444; Oct. 12, 2010; 14 pages.
Notice of Allowance for U.S. Appl. No. 12/368,446; Oct. 15, 2010 ; 14 pages.
Notice of Allowance for U.S. Appl. No. 12/368,444; Feb. 4, 2011; 5 pages.
Notice of Allowance for U.S. Appl. No. 12/368,446; Feb. 9, 2011; 27 pages.

* cited by examiner

AMUSEMENT DEVICES AND GAMES INCLUDING MEANS FOR PROCESSING ELECTRONIC DATA WHERE ULTIMATE OUTCOME OF THE GAME IS DEPENDENT ON RELATIVE ODDS OF A CARD COMBINATION AND/OR WHERE CHANCE IS A FACTOR: EXPECTED BIASES SUCH AS LONG SHOT AND FAVORITE BIAS

BACKGROUND

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

SUMMARY

In some embodiments, a machine implemented method includes providing first information about a set of possible outcomes of an event to users. At least a part of the first information may identify a characteristic of a true outcome of the set of possible outcomes. The method may further include receiving second information. The second information may be based on at least first wagers placed by the users. The first wagers may be placed following provision of the first information. The method may further include determining a first set of likelihood values corresponding to the set of possible outcomes using the second information. Each likelihood value of the first set of likelihood values may correspond to a respective possible outcome of the set of possible outcomes. The method may further include determining a second set of likelihood values based at least in part on the first set of likelihood values if one or more likelihood values of the first set of likelihood values are less than a first threshold value or greater than a second threshold value. The method may further include associating the second set of likelihood values with at least some possible outcomes of the set of possible outcomes. The method may further include providing third information based on the second set of likelihood values to at least some users of the users.

In some embodiments, a system includes one or more servers. The one or more servers may be configured to communicate with one or more devices via a communications network. The one or more servers may include memory configured to store instructions for execution. The one or more servers may further include one or more processing devices configured to execute the instructions. The instructions may be for causing the one or more processing devices to provide first information about a set of possible outcomes of an event to users. At least a part of the first information may identify a characteristic of a true outcome of the set of possible outcomes. The instructions may be for further causing the one or more processing devices to receive second information. The second information may be based on at least first wagers placed by the users. The first wagers may be placed following provision of the first information. The instructions may be for further causing the one or more processing devices to determine a first set of likelihood values corresponding to the set of possible outcomes using the second information. Each likelihood value of the first set of likelihood values may correspond to a respective possible outcome of the set of possible outcomes. The instructions may be for further causing the one or more processing devices to determine a second set of likelihood values based at least in part on the first set of likelihood values if one or more likelihood values of the first set of likelihood values are less than a first threshold value or greater than a second threshold value. The instructions may be for further causing the one or more processing devices to associate the second set of likelihood values with at least some possible outcomes of the set of possible outcomes. The instructions may be for further causing the one or more processing devices to provide third information based on the second set of likelihood values to at least some users of the users.

In some embodiments, a system includes one or more servers. The one or more servers may be configured to communicate with one or more devices via a communications network. The one or more servers may include means for providing first information about a set of possible outcomes of an event to users. At least a part of the first information may identify a characteristic of a true outcome of the set of possible outcomes. The one or more servers may further include means for receiving second information. The second information may be based on at least first wagers placed by the users. The first wagers may be placed following provision of the first information. The one or more servers may further include means for determining a first set of likelihood values corresponding to the set of possible outcomes using the second information. Each likelihood value of the first set of likelihood values may correspond to a respective possible outcome of the set of possible outcomes. The one or more servers may further include means for determining a second set of likelihood values based at least in part on the first set of likelihood values if one or more likelihood values of the first set of likelihood values are less than a first threshold value or greater than a second threshold value. The one or more servers may further include means for associating the second set of likelihood values with at least some possible outcomes of the set of possible outcomes. The one or more servers may further include means for providing third information based on the second set of likelihood values to at least some users of the users.

In some embodiments, a system includes one or more servers. The one or more servers may be configured to communicate with one or more devices via a communications network. The one or more servers may include a first apparatus configured to make available data that defines outcomes of an event, the data indicating a feature of a true outcome of the event. The one or more servers may further include a second apparatus configured to process second data relating to wagers. The wagers may be accepted following the data being made available. The one or more servers may further include a third apparatus configured to develop odds for the outcomes from the second data. The one or more servers may further include a fourth apparatus configured to develop second odds if some of the odds exceed or fall below assigned levels. The one or more servers may further include a fifth apparatus configured to relate the second odds to the outcomes. The one or more servers may further include a sixth apparatus configured to develop third data. The third data may be based at least on the second odds. The one or more servers may further include a seventh apparatus configured to make available the third data.

In some embodiments, a method includes causing first information about a set of possible outcomes of an event to be provided to users. At least a part of the first information may identify a characteristic of a true outcome of the set of possible outcomes. The method may further include receiving second information. The second information may be based on at least first wagers placed by the users. The first wagers may be placed following provision of the first information. The method may further include determining a first set of likelihood values corresponding to the set of possible outcomes using the second information. Each likelihood value of the first set of likelihood values may correspond to a respective possible outcome of the set of possible outcomes. The method may further include determining a second set of likelihood values based at least in part on the first set of likelihood values if one or more likelihood values of the first set of likelihood values are less than a first threshold value or greater than a second threshold value. The method may further include associating the second set of likelihood values with at least some possible outcomes of the set of possible outcomes. The method may further include causing third information based on the second set of likelihood values to be provided to at least some users of the users.

In some embodiments, a system includes one or more servers. The one or more servers may be configured to communicate with one or more devices via a communications network. The one or more servers may include means for causing first information about a set of possible outcomes of an event to be provided to users. At least a part of the first information identifies a characteristic of a true outcome of the set of possible outcomes. The one or more servers may further include means for receiving second information. The second information may be based on at least first wagers placed by the users. The first wagers may be placed following provision of the first information. The one or more servers may further include means for determining a first set of likelihood values corresponding to the set of possible outcomes using the second information. Each likelihood value of the first set of likelihood values may correspond to a respective possible outcome of the set of possible outcomes. The one or more servers may further include means for determining a second set of likelihood values based at least in part on the first set of likelihood values if one or more likelihood values of the first set of likelihood values are less than a first threshold value or greater than a second threshold value. The one or more servers may further include means for associating the second set of likelihood values with at least some possible outcomes of the set of possible outcomes. The one or more servers may further include means for causing third information based on the second set of likelihood values to be provided to at least some users of the users.

In some embodiments, a machine implemented method includes providing first information about a set of possible outcomes of an event to users. At least a part of the first information may identify a characteristic of a true outcome of the set of possible outcomes. The method may further include receiving second information. The second information may be based on at least first wagers placed by the users. The first wagers may be placed following provision of the first information. The method may further include determining a first set of likelihood values corresponding to the set of possible outcomes using the second information. Each likelihood value of the first set of likelihood values may correspond to a respective possible outcome of the set of possible outcomes. The method may further include determining that a first likelihood value of the first set of likelihood values is greater than a first threshold value or less than a second threshold value. The first likelihood value may correspond to a first possible outcome of the set of possible outcomes. The method may further include performing one or more first actions or one or more second actions responsively to determining that the first likelihood value is greater than the first threshold value or less than the second threshold value.

In some embodiments, a system includes one or more servers. The one or more servers may be configured to communicate with one or more devices via a communications network. The one or more servers may include memory configured to store instructions for execution. The one or more servers may further include one or more processing devices configured to execute the instructions. The instructions may be for causing the one or more processing devices to provide first information about a set of possible outcomes of an event to users. At least a part of the first information may identify a characteristic of a true outcome of the set of possible outcomes. The instructions may be for further causing the one or more processing devices to receive second information. The second information may be based on at least first wagers placed by the users. The first wagers may be placed following provision of the first information. The instructions may be for further causing the one or more processing devices to determine a first set of likelihood values corresponding to the set of possible outcomes using the second information. Each likelihood value of the first set of likelihood values may correspond to a respective possible outcome of the set of possible outcomes. The instructions may be for causing the one or more processing devices to determine that a first likelihood value of the first set of likelihood values is greater than a first threshold value or less than a second threshold value. The first likelihood value may correspond to a first possible outcome of the set of possible outcomes. The instructions may be for causing the one or more processing devices to perform one or more first actions or one or more second actions responsively to determining that the first likelihood value is greater than the first threshold value or less than the second threshold value.

In some embodiments, a system includes one or more servers. The one or more servers may be configured to communicate with one or more devices via a communications network. The one or more servers may include means for providing first information about a set of possible outcomes of an event to users. At least a part of the first information may identify a characteristic of a true outcome of the set of possible outcomes. The one or more servers may further include means for receiving second information. The second information may be based on at least first wagers placed by the users. The first wagers may be placed following provision of the first information. The one or more servers may further include means for determining a first set of likelihood values corresponding to the set of possible outcomes using the second information. Each likelihood value of the first set of likelihood values may correspond to a respective possible outcome of the set of possible outcomes. The one or more servers may further include means for determining that a first likelihood value of the first set of likelihood values is greater than a first threshold value or less than a second threshold value. The first likelihood value may correspond to a first possible outcome of the set of possible outcomes. The one or more servers may further include means for performing one or more first actions or one or more second actions responsively to determining that the first likelihood value is greater than the first threshold value or less than the second threshold value.

In some embodiments, a machine implemented method includes providing first information about a set of possible outcomes of an event to users. At least a part of the first information may identify a characteristic of a true outcome of the set of possible outcomes. The method may further include determining a first set of likelihood values corresponding to the set of possible outcomes using first wagers placed by the users following provision of the first information. Each likelihood value of the first set of likelihood values may correspond to a respective possible outcome of the set of possible outcomes. The method may further include determining at least one second likelihood value responsively to comparing the first set of likelihood values to one or more predetermined values. The one or more predetermined values may be derived from data regarding expected biases of the users. The method may further include providing the at least one second likelihood value to at least one user of the users.

In some embodiments, a system includes one or more servers. The one or more servers may be configured to communicate with one or more devices via a communications network. The one or more servers may include means for providing first information about a set of possible outcomes of an event to users. At least a part of the first information may identify a characteristic of a true outcome of the set of possible outcomes. The one or more servers may further include means for determining a first set of likelihood values corresponding to the set of possible outcomes using first wagers placed by the users following provision of the first information. Each likelihood value of the first set of likelihood values may correspond to a respective possible outcome of the set of possible outcomes. The one or more servers may further include means for determining at least one second likelihood value responsively to comparing the first set of likelihood values to one or more predetermined values. The one or more predetermined values may be derived from data regarding expected biases of the users. The one or more servers may further include means for providing the at least one second likelihood value to at least one user of the users.

In some embodiments, a method includes providing first information about a set of possible outcomes of an event to users. At least a part of the first information may identify a characteristic of a true outcome of the set of possible outcomes. The method may further include receiving second information. The second information may be based on at least first wagers placed by the users. The first wagers may be placed following provision of the first information. The method may further include determining a first set of likelihood values corresponding to the set of possible outcomes using the second information. Each likelihood value of the first set of likelihood values may correspond to a respective possible outcome of the set of possible outcomes. The method may further include determining at least one second likelihood value responsively to comparing the first set of likelihood values to one or more predetermined values. The one or more predetermined values may be derived from data regarding expected biases of the users. The method may further include providing third information based on the at least one second likelihood value to at least one user of the users.

DETAILED DESCRIPTION

Figure 1:
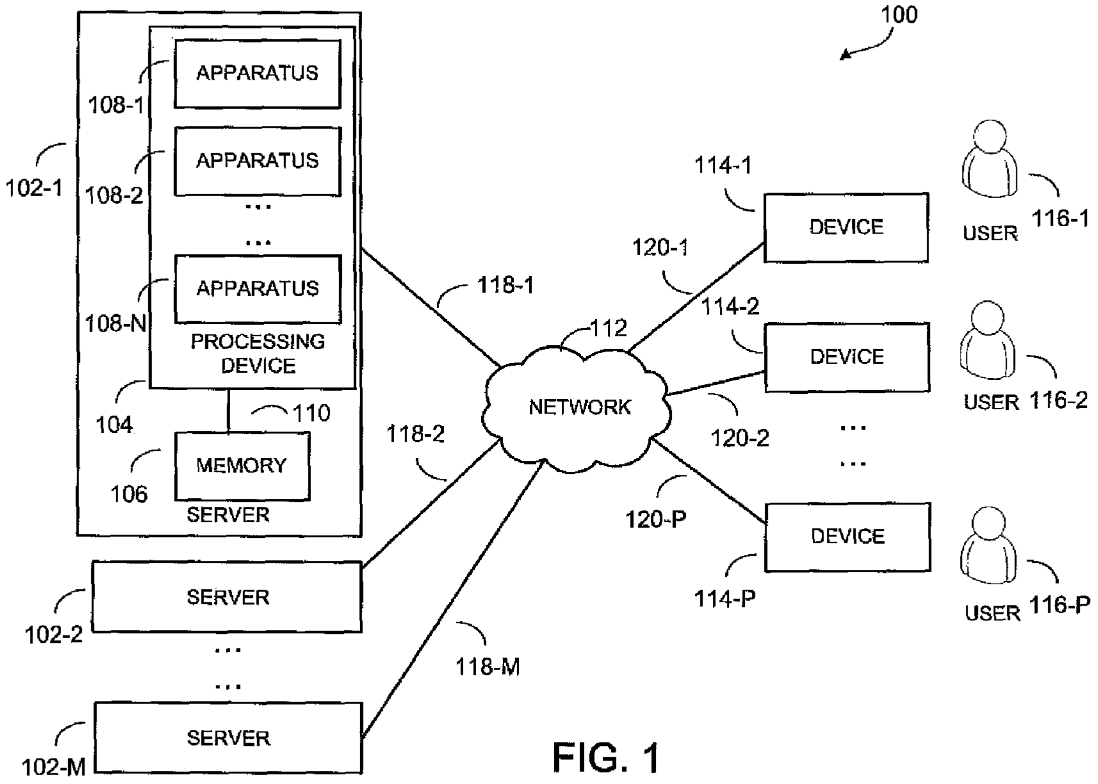
FIG. 1 is a diagram showing an example apparatus for playing a game, according to some embodiments.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make bets into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold'em and Omaha hold'em, respectively.

Poker Hand Rankings

Straight Flush

A straight flush is a poker hand such as Q♠ J♠ 10♠ 9♠ 8♠,which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣is known as a royal flush, and is the highest ranking standard poker hand (excluding five of a kind).

Examples:

7♥ 6♥ 5♥ 4♥ 3♥ beats 5♠4♠3♠2♠A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples:

10♣ 10♦ 10♥ 10♠5♦ ("four tens" or "quad tens") defeats 6♦ 6♥ 6♠6♣ K♠ ("four sixes" or "quad sixes")

10♣ 10♦ 10♥ 10♠Q♣ ("four tens, queen kicker") defeats 10♣ 10♦ 10♥ 10♠5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples:

10♠ 10♥ 10♦ 4♠ 4♦ ("tens full") defeats 9♥ 9♣ 9♠ A♥ A♣("nines full")

K♠K♣ K♥ 3♦ 3♠("kings full") defeats 3♠3♥ 3♦ K♠K♦ ("threes full")

Q♥ Q♦ Q♣ 8♥ 8♣ ("queens full of eights") defeats Q♥ Q♦ Q♣ 5♠5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples:

A♥ Q♥ 10♥ 5♥ 3♥ ("ace-high flush") defeats K♠Q♠J♠ 9♠6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠10♠9♠5♠2♠ ("spade flush")

Straight

A straight is a poker hand such as Q♣J♠10♠9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣K♣Q♦ J♠10♠is an ace-high straight, and ranks above a king-high straight such as K♥ Q♠J♥ 10♥ 9♦. But the ace may also be played as a 1-spot in a hand such as 5♠4♦ 3♦ 2♠A♣, called a wheel or five-high straight, which ranks below the six-high straight 6♠5♣4♣3♥ 2♥. The ace may not "wrap around", or play both high and low in the same hand: 3♣2♦ A♠K♠Q♣ is not a straight, but just ace-high no pair.

Examples:

8♠7♠6♥ 5♥ 4♠ ("eight-high straight") defeats 6♦ 5♠4♦ 3♥ 2♣ ("six-high straight")

8♠7♠6♥ 5♥ 4♠ ties 8♥ 7♦ 6♣5♣4♥

Three of a Kind

Three of a kind, also called trips, set or a prile, is a poker hand such as 2♦ 2♠2♥ K♠6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples:

8♠8♥ 8♦ 5♠3♣ ("three eights") defeats 5♣5♥ 5♦ Q♦ 10♣ ("three fives")

8♠8♥ 8♦ A♣ 2♦ ("three eights, ace kicker") defeats 8♠ 8♥ 8♦ 5♠3♣ ("three eights, five kicker")

Two Pair

A poker hand such as J♥ J♣4♣4♠9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠9♠), as in "Kings over nines", "Kings and nines" or simply "Kings up".

Examples:

K♥ K♦ 2♣ 2♦ J♥ ("kings up") defeats J♦ J♠10♠10♣ 9♠ ("jacks up")

9♣9♦ 7♦ 7♠6♥ ("nines and sevens") defeats 9♥ 9♠5♥ 5♦ K♣ ("nines and fives")

4♠4♣3♠3♥ K♦ ("fours and threes, king kicker") defeats 4♥ 4♦ 3♦ 3 10♠ ("fours and threes with a ten")

One Pair

One pair is a poker hand such as 4♥ 4♠K♠10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples:

10♣10♠6♠4♥ 2♥ ("pair of tens") defeats 9♥ 9♣A♥ Q♦ 10♦ ("pair of nines")

10♥ 10♦ J♦ 3♥ 2♣ ("tens with jack kicker") defeats 10♣ 10♠6♠4♥ 2♥ ("tens with six kicker")

2♦ 2♥ 8♠5♣4♣ ("deuces, eight-five-four") defeats 2♣ 2♠8♠5♥ 3♥ ("deuces, eight-five-three")

High Card

A high-card or no-pair hand is a poker hand such as K♥ J♣8♣7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples:

A♦ 10♦ 9♠5♣4♣ ("ace high") defeats K♣Q♦ J♣8♥ 7♥ ("king high")

A♣Q♣7♦ 5♥ 2♣ ("ace-queen") defeats A♦ 10♦ 9♠5♣ 4♣ ("ace-ten")

7♠6♣5♠4♦ 2♥ ("seven-six-five-four") defeats 7z,22 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣A♠Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the bet, take precisely one more card and then "stand." When a player has identical value cards, such as a pair of 8s, the player can "split" by placing an additional bet and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by betting that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a “natural” pays less than 3:2 (e.g., Las Vegas Strip single-deck Blackjack paying out at 6:5 for a “natural”); if a hand can only be split once (is re-splitting possible for other than aces); if doubling down is restricted to certain totals (e.g., 9 11 or 10 11); if Aces may not be re-split; if the rules are those of “no-peek” (or European) Blackjack, according to which the player loses hands that have been split or “doubled down” to a dealer who has a “natural” (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player’s advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer’s advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer’s up card is a 10, but if the player knows that the deck has a disproportionately small number of low-value cards remaining, the odds may be altered in favor of standing on the 16.

There are a number of card-counting schemes, all dependent for their efficacy on the player’s ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

Rules of Baccarat

Some versions of Baccarat are now described. In Baccarat, cards 2-9 are worth face value, 10’s and face cards (J, Q, K) are worth zero, and Aces are worth 1 point. Players calculate their score by taking the sum of all cards and performing a modulo 10 operation on the sum. For example, a hand consisting of 2 and 3 is worth 5 (2+3=5). A hand consisting of 6 and 7 is worth 3 (6+7=13 mod 10=3). A hand consisting of 4 and 6 is worth zero, which is also referred to as Baccarat (4+6=10 mod 10=0). The name “Baccarat” is used to describe the worst hand of the game i.e., one worth 0 points. The highest score that can be achieved is 9.

One common variation of Baccarat is referred to as Punto Banco. In Punto Banco, players may bet on either a Player hand or a Banker hand. The initial deal comprises two cards dealt to each of the Player hand and the Banker hand. Both cards in each hand are then turned over and added together to determine the initial score of each hand. After the deal, play is controlled by rules without controlling input from any players. Depending on the two hands, the Player and Banker will draw a card or stand. The hand with the highest total after each participant acts is the winning hand.

If either the Player or the Banker achieves a total of 8 or 9 on the initial deal (known as a ‘natural’), no further cards are drawn. If neither Player has an 8 or a 9, play proceeds as follows.

- If the Player has an initial total of 0-5, the Player draws a single card. If the Player has an initial total of 6 or 7, he stands.
- The Banker’s play depends on the Banker’s hand, on whether the Player drew a card, and on what card the Player drew:
  - If the Player did not draw a card, the Banker draws if he has 0-5, and stands if he has 6-7.
  - If the Player drew a 2 or 3, the Banker draws if he has 0-4, and stands if he has 5-7.
  - If the Player drew a 4 or 5, the Banker draws if he has 0-5, and stands if he has 6-7.
  - If the Player drew a 6 or 7, the Banker draws if he has 0-6, and stands if he has 7.
  - If the Player drew an 8, the Banker draws if he has 0-2, and stands if he as 3-7.
  - If the Player drew an ace, 9, 10, or face-card, the Banker draws if he has 0-3, and stands if he has 4-7.

After hands are played, the winner and loser will be determined based on the final scores of the hands. Losing bets will be collected and the winning bets will be paid according to the rules of the house. In some embodiments, 1-1 will be paid for the Player and 95% for the ‘Banker’, with a 5% commission to the house. Some embodiments pay even money or 1-1 to both ‘Player’ and ‘Banker’ except when the ‘Banker’ wins with 6. Then the ‘Banker’ will be paid 50% or half the original bet. Other embodiments may have other payouts associated with various wagers, as is described in more detail below.

If both the ‘Banker’s’ hand and the ‘Player’s’ hand have the same value at the end of the deal a tie outcome. A tie may be referred to as an egalite. In some embodiments, a tie bet will be paid at the odds of 9 for 1, 8 to 1, or any other desired odds. In some embodiments, in the event of a tie, players betting on Player of Banker may reclaim their initial bets. In other embodiments, these bets may be lost.

Another version of Baccarat is known as Chemin de Fer. Chemin de Fer generally involves six full packs of cards of the same pattern shuffled together. Shuffling in Chemin de Fer typically involves a first player, known as the croupier shuffling the cards, and then passing them on, each player having the right to shuffle in turn. When they have made the circuit of the table, the croupier again shuffles, and, having done so, offers the cards to the player on his left, who cuts. The croupier places the cards before him, and, taking a manageable quantity from the top, hands it to the player on his right, who for the time being is dealer, or “Banker.” Of course, other implementations may include any variation from this tradition.

The dealer places before him the amount he is disposed to risk. The other players, beginning with the player on the immediate right of the dealer, is entitled to say “Banco”, meaning to "go bank," to play against the whole of the Banker's stake. If no one does so, each player places a desired bet amount before him. If the total so bet by the players is not equal to the amount for the time being in the bank, other persons standing round may stake in addition. If it is more than equal to the amount in the bank, the players nearest in order to the Banker have the preference to stake up to such amount, the Banker having the right to decline any stake in excess of that limit.

The Banker proceeds to deal four cards face downwards: the first, for the Player, to the right; the second to himself; the third for the Player, the fourth to himself. The player who has the highest stake represents all of the players. If two players are equal in this respect, the player first in rotation has the preference. Each then looks at his cards. If he finds that they make either nine or eight he turns them up, and the hand is at an end. If the Banker's point is the better, the stakes of the players become the property of the bank. If the players' point is better, the Banker pays each player the amount of his stake.

The stakes are made afresh, and the game proceeds. If the Banker has been the winner, he deals again. If otherwise, the cards are passed to the player next in order, who thereupon becomes Banker in his turn.

If neither party turns up his cards, this is an admission that neither has eight or nine. In this case the Banker is bound to offer a third card. If the point total of the Player is Baccarat (i.e., 0), one, two, three, or four, he accepts as a matter of course. A third card is then dealt to him, face upwards. If his point is already six or seven, he will, equally as a matter of course, refuse the offered card. To accept a card with six or seven, or refuse with Baccarat, one, two, three, or four (known in either case as a "false draw"), is a breach of the established procedure of the game, and may result in a penalty or a loss. At the point of five, and no other, is it optional to the player whether to take a card or not; generally, nobody has the right to advise him, or to remark upon his decision.

The Banker may decide whether he himself will draw a card, the Banker, having drawn or not drawn, as he may elect, exposes his cards, and receives or pays as the case may be. In the case of ties, neither win nor lose, but the stakes remain for the next hand.

The Banker is not permitted to withdraw any part of his winnings, which go to increase the amount in the bank. Should he at any given moment, desire to retire, he says, "I pass the deal." In such case each of the other players, in rotation, has the option of taking it, but he must start the bank with the same amount at which it stood when the last Banker retired. Should no one present care to risk that high a figure, the deal passes to the player next on the right hand of the retiring Banker, who is in such case at liberty to start the bank with such amount as he thinks fit, the late Banker now being regarded as last in order of rotation, though the respective priorities are not otherwise affected.

A player who has "gone bank," and lost, is entitled to do so again on the next hand, notwithstanding that the deal may have "passed" to another player.

When the first supply of cards is exhausted, the croupier takes a fresh handful from the heap before him, has them cut by the player on his left, and hands them to the Banker. To constitute a valid deal, there must be not less than seven cards left in the dealer's hand. Should the cards in hand fall below this number, they are discarded, and the Banker takes a fresh supply as described above.

Yet another version of Baccarat is known as Baccarat Banque. In Baccarat Banque the position of Banker is more permanent than in Chemin de Fer. Three packs of cards are shuffled together. (The number is not absolute, but three is the more usual number.) The Banker (unless he retires either of his own free will or by reason of the exhaustion of his finances) holds office until all these cards have been dealt.

The bank is at the outset put up to auction, i.e. belongs to the player who will undertake to risk the largest amount. In some implementations, the person who has first agreed to play, has the right to hold the first bank, risking such amount as he may think proper.

The Banker deals three cards, the first to the player on his right, the second to the player on his left, and the third to himself; then three more in like manner. The players on the right (and any bystanders staking with them) win or lose by the cards dealt to that side; the others by the cards dealt to the left side. The rules as to turning up with eight or nine, offering and accepting cards, and so on, are the same as at Baccarat Chemin de Fer.

Each player continues to hold the cards for his side so long as he wins. If he loses, the next hand is dealt to the player next following him in rotation.

Any player may "go bank," the first claim to do so belonging to the player immediately on the right of the Banker; the next to the player on his left, and so on alternatively in regular order. If two players on opposite sides desire to "go bank," they go half shares.

A player going bank may either do so on a single hand, in the ordinary course, or on two hands separately, one-half of the stake being played upon each hand. A player going bank and losing may, again go bank; and if he again loses, may go bank a third time, but not further.

A player undertaking to hold the bank must play out one hand, but may retire at anytime afterwards. On retiring, he is bound to state the amount with which he retires. It is then open to any other player (in order of rotation) to continue the bank, starting with the same amount, and dealing from the remainder of the pack, used by his predecessor. The outgoing Banker takes the place previously occupied by his successor.

The breaking of the bank does not deprive the Banker of the right to continue, provided that he has funds with which to replenish it, up to the agreed minimum.

Should the stakes of the players exceed the amount for, the time being in the bank, the Banker is not responsible for the amount of such excess. In the event of his losing, the croupier pays the players in order of rotation, so far as the funds in the bank will extend; beyond this, they have no claim. The Banker, may, however, in such a case, instead of resting on his right, declare the stakes accepted, forthwith putting up the funds to meet them. In such event the bank thenceforth becomes unlimited, and the Banker must hold all stakes (to whatever amount) offered on any subsequent hand, or give up the bank.

It should be recognized that variations of the game of Baccarat are given as example only, and that other embodiments may include any variation desired. For example, various embodiments may include variants to the described traditions of Baccarat. Such variations, for example may allow a game to be played by a gaming device. Such variations may include variations to the game play rules, such as who wins when, what payouts are received, when bets may be made, what actions must be take, the number of player, the number of decks, and so on.

XIII. Tracking the Action at a Table

U.S. Pat. No. 6,579,181 generally describes, "a system for automatically monitoring playing and betting of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security "In another aspect, the system can include a chip tray reader that automatically images the contents of a chip tray. The system periodically determines the number and value of chips in the chip tray from the image, and compares the change in contents of the chip tray to the outcome of game play to verify that the proper amounts have been paid out and collected.

"In a further aspect, the system can include a table monitor that automatically images the activity or events occurring at a gaming table. The system periodically compares images of the gaming table to identify betting, as well as the appearance, removal and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and betting patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each seat's, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each player's hand(s) and the dealer's hand as each card is dealt to a specific hand, seat or position and converts the game card value of each card dealt from the shoe to the players and the dealer of the game to a card count system value for one or more card count systems programmed into the evaluation software. The CPU also records each players decision(s) to hit a hand, and the dealer's decision to hit or take another card when required by the rules of the game, as the hit card is removed from the shoe. The dealer uses one or more of the keyboards and LCD displays carried by the shoe to record each player's decision(s) to Insure, Surrender, Stand, Double Down, or Split a hand. When the dealer has an Ace or a Ten as an up-card, he/she may use one or more of the keyboards to prompt the computer system's software, since the dealer's second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to bet upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each player's card count strategy, and a playing table coupled to the card delivery shoe apparatus and having at least one keypad means located thereon for permitting the at least one player to select at least one of various card playing options to bet upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each player's received playing cards and their values with information as to playing tactics used by each player relative to the values of the received playing cards, for combining use of all of this information for identifying each player's playing strategy, and for also identifying each player's card count strategy based on each player's betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to bet upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display may be located at each game table and may display one or more jackpot awards for one or more winning combinations of cards. In one embodiment of the present invention, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Further more, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealer's, and may evaluate the players' wins.

Gaming data may then be processed by means of the EDP program and shown simultaneously to the actual game at a special monitor or display. Same data may be recalled later on to monitor the total results whenever requested.

Various embodiments include a gaming table and a gaming table cloth arranged on the gaming table, the gaming table cloth provided with betting boxes and areas designated for placement of the gaming chips and other areas designated for placement of the playing cards, a card shoe for storage of one or more decks of playing cards, this card shoe including means for drawing individual ones of the playing cards face down so that a card value imprint on the drawn card is not visible to a player of the game of chance, a card recognition means for recognizing this card value imprint on the drawn card from the card shoe, this card recognition means being located in the card shoe, an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively, a gaming bet detector for automatic recognition or manual input of gaming bets, and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can includes means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the table cloth are arrange over at least two single detectors.

The gaming apparatus may includes automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

XIV. Following the Bets

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system of the invention must encompass. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand. Small variances such as allowing or disallowing a hit on a "soft" seventeen count (e.g., an Ace and a 6)

may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing, but has more rigid rules as to when hits may be taken by the player and the dealer, and each position may take a maximum of one card as a hit. The hand identification system of the invention must be able to address the needs of identifying hands in each of these types of games and especially must be able to identify hands in the most complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is incorporated herein in its entirety by reference. Some delivery systems or shoes with reading capability include, but are not limited to those disclosed in U.S. Pat. Nos. 4,750,743; 5,779,546; 5,605,334; 6,361,044; 6,217,447; 5,941,769; 6,229,536; 6,460,848; 5,722,893; 6,039,650; and 6,126,166. In various embodiments, the cards are read in the smart card delivery shoe, such as one card at a time in sequence. Reading cards by edge markings and special codes (as in U.S. Pat. No. 6,460,848) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer. As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified. Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealer's hand completed, all bets are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer must play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the $73^{rd}$ hand dealt). This date stamping of hands or even cards in memory can be used as an analytical search tool for security and to enhance hand identification.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealer's sensor or other initiated signal identifies that all further cards are going to the dealer may be useful in defining the edges of play between rounds and in identifying the dealer's hand and the end of a round of play. When the dealer's cards are deposited and read in the smart discard rack, the central computer knows that another round of play is to occur and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or cardroom game modified to include a progressive jackpot component. During the play of a Twenty-One game, for example, in addition to this normal bet, a player will have the option of making an additional bet that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or card-room game such as Draw Poker, Stud Poker, Lo-Ball Poker or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

XV. Card Shufflers

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid state circuits or a microprocessor, either of which techniques preferably employ a high frequency generator for stepping an N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe, and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the method of the present invention.

Various embodiments include a computer controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly therealong by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rearwardmost card in the stack of cards delivered to the dealing shoe. When shuffling and cutting operations are performed subsequent to the initial set-up, the paddle rests against the rearwardmost card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., "dither") means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system may be controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

XVI. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XVII. Video Wagering Games

Video betting games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVIII. Apparatus for Playing a Game over a Communications System

Referring to FIG. 1, it is a diagram showing an example apparatus 100 for playing a game, according to some embodiments. A plurality of servers 102-1 to 102-M is configured to communicate with a plurality of devices 114-1 to 114-P via a communications network 112. Each server 102 is configured to communicate with the network 112 over a respective communication link 118 of a plurality of communication links 118-1 to 118-M. Each device 114 is configured to communicate with the network 112 over a respective communication link 120 of a plurality of communication links 120-1 to 120-P. The communication links 118, 120 may be wireless or wired communication links, or any combination of these.

In some embodiments, a server such as the server 102 may include a computing device configured to communicate with another device, e.g., another computing device. The server is not necessarily a server in the sense of "server-client" relationship. A server may be integrated into another server or another device.

Each server 102 includes memory 106 and one or more processing devices 104, which are shown only in server 102-1 for ease of illustration. Memory 106 is configured to store instructions for execution, while the one or more processing devices 104 are configured to execute the instructions. The server 102 may use one or more computer-readable media that may store executable instructions that may cause the one or more processing devices 104 to perform various steps described herein. In some embodiments, the one or more computer-readable media are tangible media. The one or more processing devices 104 may include a plurality of apparatuses 108-1 to 108-N.

In some embodiments, an apparatus such as apparatus 108 may include a software module running on a server. Apparatuses may be used with one another on the same server or across servers, for example, one apparatus may include a software module running on a first server, while another apparatus may include a software module running on the first server or a software module running on a different, second server.

In some embodiments, one or more of the apparatuses 108-1 to 108-N may not be part of the one or more processing devices 104 but rather may be, e.g., a software module stored in memory 106. For example, one or more of the apparatuses 108-1 to 108-N may include instructions stored in memory 106. In some implementations, one or more of the apparatuses 108-1 to 108-N may be an antenna or an input-output interface for the server 102. Various steps described herein may be performed by one or more of the apparatuses 108-1 to 108-N.

In some embodiments, a device such as device 114 may include any device, such as a computing device. Devices may include portable devices (e.g., laptops, personal digital assistants (PDAs)); media devices, communications devices, mobile devices (e.g., mobile gaming devices), handheld devices (e.g., media (e.g., music) players, cell phones, Smartphones, PDAs), wireless or wired devices, interactive kiosks, automated teller machines, computer terminals, graphical user interfaces, motor vehicle displays, airplane seat displays, navigation devices (e.g., GPS devices); headsets, or devices integrated into other devices or servers.

In related fashion to that described with respect to each server 102, in some embodiments each device 114 may include memory and one or more processing devices (not shown).

In some embodiments, a communications network such as the communications network 112 may include a wired or wireless network, or combination thereof, configured to provide wired or wireless connections and/or communications links to, from, and between network entities such as servers, or devices (e.g., computing devices).

The network 112 may be, e.g., the Internet, a local area network (LAN), or a wide area network (WAN).

In some embodiments, information may be provided to users such as the plurality of users 116-1 to 116-P of FIG. 1. In some embodiments, a server such as server 102 may be said to provide information to users, even though the server 102 may not strictly provide the information directly to users. Rather, a server such as server 102 may provide information to user(s) via one or more intermediate network entities between the server and the user(s), e.g., a communications network such as communications network 112, communication links such as communications links 118, 120, and/or one or more devices such as the plurality of devices 114-1 to 114-P. A server such as server 102 may also be said to cause information to be provided to users, with the information being directly provided by, e.g., a device such as device 114. A wagering system may provide information to users without directly providing information to users. A wagering system may cause information to be provided to users.

In some embodiments, wagers may be placed by users such as the plurality of users 116-1 to 116-P of FIG. 1, wagers placed by the users may be accepted, and information from users may be received. In some embodiments, a server such as server 102 may be said to accept wagers from users, or receive information from users, even though the server 102 may not strictly accept the wagers directly from users or receive the information directly from users. Rather, a server such as server 102 may accept wagers or receive information from user(s) via one or more intermediate network entities between the server and the user(s), e.g., a communications network such as communications network 112, communication links such as communications links 118, 120, and/or one or more devices such as the plurality of devices 114-1 to 114-P. A wagering system may accept wagers or receive information from users without directly accepting the wagers or directly receiving the information from the users.

Users

The plurality of users 116-1 to 116-P are shown in FIG. 1 and each user 116 may use a respective device 114 of the plurality of devices 114-1 to 114-P. It should be understood that one or more users 116 may use a particular device 114.

In some embodiments, a user such a user 116 may be a participant in, or an observer of, e.g., a system, such as a wagering system. A user may be registered with the system. A user may simply participate in the system without being registered with the system. A user may be an individual placing a wager with the system. A user may not have to place a wager to be considered a user of the system. A user may be a player of a game in, e.g., a wagering system. A user may play a game using, e.g., a device such as a mobile gaming device. A user may be a player of a live game. For example, a user may be a player playing blackjack against a dealer and other players in a casino, or a player playing poker seated around a table with other players. A user may include a player of game at, e.g., a kiosk who places a wager with no prior affiliation or involvement with the kiosk or the game or the wagering system and no subsequent affiliation or involvement with the kiosk or the game or the wagering system. A user may place one or more wagers on one or more possible outcomes of an event.

In some embodiments, a user may be a non-human entity associated with, acting or operating as a proxy for, or participating, acting, or operating on behalf of, an individual (a human individual), a group of individuals, an organization, or an other entity, such as, e.g., the wagering system itself. In some embodiments, a non-human entity may include an entity that is not a human being, e.g., a computer program or a processor or another apparatus configured to execute a computer program. In some embodiments, a user who is a non-human entity is not considered an internal part of the wagering system, e.g., the user participates in (e.g., places wagers), but operates outside of and external to the wagering system.

Wagering System; Wagers

FIG. 1 presents an example of a wagering system in which each user 116 of the plurality of users 116-1 to 116-P may use a respective device 114 of the plurality of devices 114-1 to 114-P to, e.g., place a wager with the system. In some embodiments, a wagering system may include the entire apparatus 100, e.g., the plurality of servers 102-1 to 102-M as well as the plurality of devices 114-1 to 114-P. In some embodiments, a wagering system may include only a network infrastructure of one or more servers such as the plurality of server 102-1 to 102-M but not devices such as the devices 114-1 to 114-P. A wagering system may include a stand-alone device such as the device 114 without, e.g., accompanying network infrastructure.

In some embodiments, a wagering system may include any apparatus configured to process wagers or information regarding wagers, or both. A wagering system may be any apparatus configured to, e.g., receive, accept wagers placed by users. A wagering system may include an individual accepting a wager from a user. A wagering system may include a device accepting a wager from a user. A wagering system may include a live game (e.g., a card game) in which users (e.g., players of the live game) place wagers on, e.g., whether a hand of cards in the card game is a winning hand.

In some embodiments, wagers may include bets placed by users of the wagering system, or bets generated by the wagering system, or both. Placing a wager may include, e.g., purchasing a ticket, or using a credit.

In some embodiments, the wagering system may include a pari-mutuel wagering system. In some embodiments, a pari-mutuel wagering system may include a wagering system in which wagers, e.g., on a particular event or set of possible outcomes of an event may be pooled together to determine likelihood values associated with the possible outcomes. If fewer wagers are placed on a particular possible outcome, the likelihood value (e.g., a payout amount associated with that possible outcome) may in general be higher than the likelihood value associated with a possible outcome for which a higher number of wagers are placed. In some embodiments, a wagering system that includes a pari-mutuel wagering system may receive a take or a commission from the pool of wagers and the take may be removed from the pool prior to the likelihood values being determined, or prior to the pool being shared among users who placed winning wagers. In some embodiments, likelihood values determined in the pari-mutuel wagering system may vary from likelihood values that may be determined solely from wagers placed by users of the wagering system. That is, in some embodiments, likelihood values may not always be dictated by wagers placed by users of the wagering system.

XIX. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XX. Example Embodiments

Figure 2:
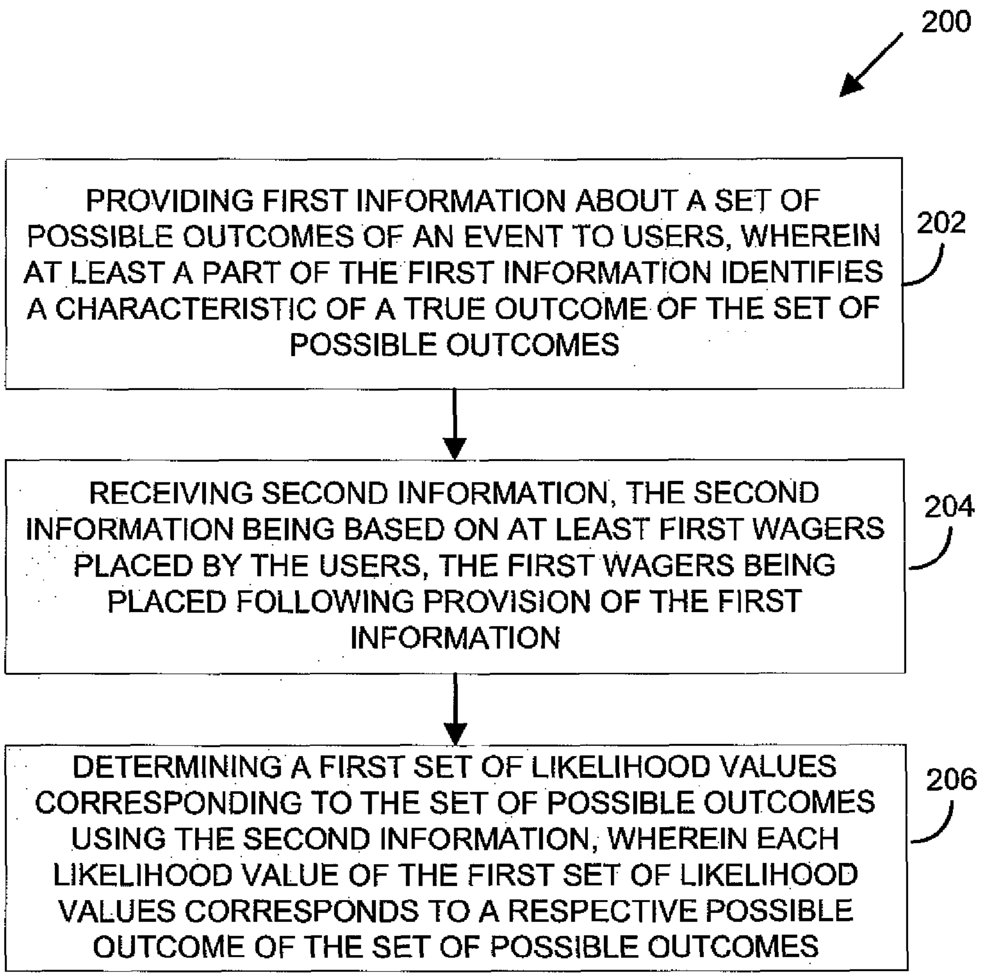
FIGS. 2-7 are flow diagrams of example processes according to some embodiments.

FIG. 2 illustrates an example process 200 that may be implemented on the example apparatus 100 of FIG. 1. For example, in some embodiments, one or more servers 102 of the plurality of servers 102-1 to 102-M and/or one or more devices 114 of the plurality of devices 114-1 to 114-P may perform one or more steps of the process 200.

According to the process 200, in some embodiments, first information about a set of possible outcomes of an event is provided (202) to users. At least a part of the first information may identify a characteristic of a true outcome of the set of possible outcomes.

In some embodiments, second information is received (204). The second information may be based on at least first wagers placed by the users. The first wagers may be placed by the users following provision of the first information.

In some embodiments, a first set of likelihood values corresponding to the set of possible outcomes is determined (206) using the second information. Each likelihood value of the first set of likelihood values may correspond to a respective possible outcome of the set of possible outcomes.

Information

In some embodiments, information may include data. Information may include data provided to a user of a wagering system, provided by a user of a wagering system, data used by a wagering system in processing (e.g., to determine likelihood values, identify characteristics of true outcomes), or any combination of these. Information may be generated internally to the wagering system, or externally, or both. Information, e.g., may be about, may be based on, may identify, or may include, e.g., likelihood value(s), wagers, possible outcomes, or characteristic(s) of true outcome(s) of an event, or any combination of these.

In some embodiments, information may include data made available to users regarding possible outcomes of an event (or events). This information may include, or may identify, a characteristic of a true outcome and may, e.g., include anything encompassed by "a characteristic of a true outcome". Information may include, as part of or separately from a characteristic of a true outcome, a positive indication of a true outcome, a negative indication of a true outcome, information regarding whether one or more specific possible outcomes will or will not occur (e.g., information that definitely includes and/or excludes possible outcomes), information regarding whether one or more specific possible outcomes may or may not occur (e.g., information that does not definitely include and/or exclude possible outcomes). Information may include likelihood values, wagers, information about other users' actual or possible activities, payout amounts, and so on. In some embodiments, information may include one or more pieces of information. In some embodiments, information may include one or more pieces of information that respectively identify, e.g., one or more characteristics of one or more true outcomes of a set of possible outcomes.

Information may include different pieces of information, depending on the event. In an event that includes a card game, information may include, or may identify, e.g., a number (or rank, e.g., tens, kings, etc.) of a card, a suit of the card, or a color of the card. In an event that includes a horse race, first information may include, e.g., a color of a horse, an age of the horse, a number of the horse, or a breed of the horse.

Provision of Information; Placement of Wagers Following Provision of Information Referring to FIG. 2, in some embodiments, first information about a set of possible outcomes of an event is provided (202) to users.

In some embodiments, providing X may include making X available. In some embodiments, information is provided, e.g., to users. Thus, in some embodiments, providing information to users may include making information available to users. In some embodiments, providing information may include outputting the information. Providing information may include making the information widely available, e.g., making the information available to the public, to a large segment of the public, or to all the users of, e.g., a wagering system. Providing information may include making the information narrowly available, e.g., making the information available to a single individual or entity, such as a user of the system, or to a group of individuals or a group of entities, such as a group of users of the system. Providing information may include providing, e.g., pieces (e.g., unique pieces) or parts of the information to users of the wagering system, e.g., so that one or more users receive the same piece of the information, no two users receive the same piece of the information, some users do not receive any piece of the information, every user that receives a piece of the information receives a unique piece of the information, some users that receive a piece of the information receive a unique piece of the information, and so on. Information may be provided as audio information, video information, actual sounds capable of being heard (e.g., audible sounds), actual images capable of being seen (e.g., visible images), codes, partially or fully encrypted or otherwise encoded information, gestures, or any combination of these. Providing information may include, e.g., publishing the information on a website, printing the information on one or more sheets of paper (e.g., as part of a pamphlet or other publication, such as a racing form), or displaying the information on a video screen. Providing information may include one or more devices, entities, users, persons or organizations telling or otherwise informing one or more other devices, entities, users, persons or organizations about the information (e.g., by word of mouth). Provision of information to a user need not imply receipt of the information by the user, understanding of the information by the user, knowledge of the information by the user, or consideration of the information by the user.

In some embodiments, information may include one or more pieces of information. In some embodiments, information may be provided to users. Providing information to users may include providing at least one of the one or more pieces of information to the users.

In some embodiments, a piece of information may be provided to one user that is different from a piece of information provided to another user. For example, in some embodiments, a piece of information of the one or more pieces of information provided to the users may be provided to at least one user of the users. In some embodiments, another piece of information of the one or more pieces of information may be provided to at least one other user. In some embodiments, the piece of information provided to the at least one user may be different than the another piece of information provided to the at least one other user.

In some embodiments, a different piece of information may be provided to each user. For example, in some embodiments, a different piece of information of the one or more pieces of information provided to users may be provided to each user of the users.

In some embodiments, the same piece of information may be provided to each user. For example, in some embodiments, the same piece of information of the one or more pieces of information provided to users may be provided to each user of the users.

Referring to FIG. 2, in some embodiments, first information about a set of possible outcomes of an event is provided (202) to users, e.g., users of a wagering system. In some embodiments, at least some users do not receive the first information. In some embodiments, providing the first information to users of a wagering system may include making the first information available to all users of the wagering system. In some embodiments, providing the first information to users may include making the first information available to the public.

In some embodiments, available to the public means publicly available, not just to some or all of the users of, e.g., a wagering system. In some embodiments, making information available to the public may include making information available to at least one individual who is not a user of a wagering system. Making information available to the public may include making information available to at least one individual who is not using a wagering system at the time that the information is made available. Making information available to the public may include, e.g., broadcasting information in a specific venue, such as a casino, or a room of a casino.

In some embodiments, providing the first information to users may include outputting the first information as at least one of audio information or visual information. In some embodiments, outputting may include moving or sending data, e.g., audio information or visual information, from one or more devices to or toward one or more other devices. In some embodiments, outputting the first information may include outputting the visual information to at least one of a continuously updating ticker system, a user display interface, a portable device, or one or more sheets of paper. In some embodiments, outputting the first information may include outputting the audio information to at least one of a loudspeaker, or an audio speaker of a device.

In some embodiments, audio information may include information that is capable of being output to one or more devices and that may be, e.g., converted by the one or more devices to actual sounds capable of being heard. The one or more devices may play the actual sounds. In some implementations, audio information may be converted to visual information.

In some embodiments, visual information may include information that is capable of being output to one or more devices and that may be, e.g., converted by the one or more devices to actual images capable of being seen. The one or more devices may display the actual images.

Referring to FIG. 2, in some embodiments, second information is received (204). The second information may be based on at least first wagers placed by the users. In some embodiments, the second information may include the first wagers. In some embodiments, receiving second information may include accepting the first wagers from the users.

In some embodiments, the first wagers may be placed by the users following provision of the first information. In some embodiments, it may be impossible to know for certain (or at all) what factors a user considers in placing a wager; therefore, wagers being placed following, e.g., provision of information, may or may not reflect, or be based on, the information. It may be the case, however, that a user to whom the first information was provided carefully considered the first information in placing a wager following the provision of the first information. It may also be that a user, e.g., failed to understand the first information, failed to consider the first information, or failed to receive the first information, in placing a wager following the provision of the first information. It may also be that a user, e.g., understood and carefully considered the first information but, for, e.g., strategic reasons, placed a wager contrary to what the first information may have indicated to the user. In some embodiments, not every user to whom first information is provided places a first wager.

Since it may be impossible to ascertain a user's motivation in performing (or not performing) certain actions, it should be understood that knowledge of a user's motivation is not required for infringement of, or interpretation of, the claims.

Events; Possible Outcomes of Events

Referring to FIG. 2, in some embodiments, first information about a set of possible outcomes of an event is provided (202) to users. In some embodiments, a set includes a group of one or more elements.

In some embodiments, an event may include a happening that may include a game or a contest. In some embodiments, an event may have one or more possible outcomes and one or more true outcomes associated with it. Examples of events include games of chance, a card game, a slot game, a dice game, craps, a lottery game, a casino game, a race (e.g., a horse race), a political contest (e.g., a U.S. Presidential election), a sporting contest (e.g., a baseball game, a football game, a basketball game, and so on), a lottery (e.g., Powerball), bingo, keno, etc. In some embodiments, an event may include an event related to, e.g., a card game, a slot game, a lottery game, a casino game, a race, or a sporting event, or any combination of these.

In some embodiments, an event may be conducted, controlled, and operated fully within and by a wagering system and/or by an organization administering the wagering system. For example, a wagering system may accept wagers on the possible outcomes of a card game (e.g., an electronic simulation of a card game) that the wagering system may itself be conducting. in some embodiments, an event may be conducted completely apart and independently from a wagering system. For example, a wagering system may accept wagers on the possible outcomes of a football game, but the wagering system may have nothing to do with the football game.

In some embodiments, an event may be intermediate to another event. An event may be (or may include) an intermediate outcome of an otherwise broader event, or the event may be (or may include) an intermediate outcome in relationship to one or more other outcomes of an otherwise broader event. For example, in a card game, an event A might be the next card that is dealt in the card game, so that the event A is an intermediate outcome to the whole card game, or is an intermediate outcome in relationship to one or more other outcomes of the card game (e.g., a winning poker or blackjack hand). Thus, for example, the otherwise broader event may include a card game, and the event (an intermediate outcome) may include, e.g., the next card to be drawn in the card game. In a lottery game, event Z might be the next ball that is drawn in the lottery game, so that the event Z is an intermediate outcome to the whole lottery game, or is an intermediate outcome to one or more other outcomes of the lottery game (e.g., a winning combination of drawn balls). Thus, for example, the otherwise broader event may include a lottery game, and the event (an intermediate outcome) may include, e.g., the next ball to be drawn in the lottery game. In a race such as a horse race, event Q might be the horse that is leading at the midpoint of the race (in time or distance), so that the event Q is an intermediate outcome to the whole horse race, or is an intermediate outcome to one or more other outcomes of the horse race (e.g., the horse to come in first in the race). Thus, for example, the otherwise broader event may include a race such as a horse race, and the event (an intermediate outcome) may include, e.g., the race participant (e.g., a horse) that is leading in the race at a point prior to an end of the race.

In some embodiments, an event may include a pari-mutuel game. In some embodiments, an event may include a non-pari-mutuel game. In some embodiments, a game may include a semi-structured or structured activity, often including rules or guidelines. A game may have one or more possible outcomes and one or more true outcomes associated with it.

In some embodiments, a game, such as a pari-mutuel game, may include, e.g., a card game, a slot game, a lottery game, a casino game, a race, or a sporting event, or any combination of these.

In some embodiments, an event can have one or more possible outcomes. In some embodiments, a possible outcome may include an outcome that may occur. An outcome may be one of several possible outcomes of an event (or events). Several possible outcomes of an event may be identified beforehand as possibly going to occur. Possible outcomes in a set of possible outcomes are not necessarily (but may be) mutually exclusive. For example, in a horse race with only one winner (no ties allowed), the possible outcomes "horse A wins" and "horse B wins" are mutually exclusive if horse A and horse B are not the same horse. On the other hand, in a horse race with only one winner (no ties allowed), the possible outcomes "horse C wins" and "horse D loses" are not mutually exclusive unless horse C and horse D are the same horse.

In some embodiments, a possible outcome may include outcomes that are theoretically "possible" at, e.g., the beginning of an event, or at the beginning of wagering, but that may become statistically "impossible" during the course of an event, or during wagering. A wagering system may permit wagering on a "possible" outcome that the wagering system knows in advance of wagering will not be the true outcome because the wagering system is aware of a true outcome of an event, or because the wagering system is aware that the "possible" outcome, while theoretically possible, is effectively impossible (e.g., horse C entered in a horse race has two broken legs, making it effectively impossible for horse C to win a race).

True Outcomes; Characteristics of a True Outcome

Referring to FIG. 2, in some embodiments, first information about a set of possible outcomes of an event is provided (202) to users. At least a part of the first information may identify a characteristic of a true outcome of the set of possible outcomes.

In some embodiments, a true outcome may include an outcome of a set of possible outcomes that has actually occurred, or will definitely occur, or that is known to be the actual outcome of an event (or events). For example, if there is a horse race with 5 horses A, B, C, D, and E, there are at least 5 possible outcomes, "horse A wins", "horse B, wins", "horse C wins", "horse D wins", and "horse E wins". Other possible outcomes include "horse A loses", etc. If horse A wins the horse race, a true outcome is "horse A wins." If it is known before running the race that horse D will not, under any circumstances, win the horse race, a true outcome is "horse D loses", even if the horse race has not yet been run. Yet, "horse D loses" may also be a "possible outcome" for purposes of wagering during or before the race. There may be more than one true outcome to emerge from a set of possible outcomes. True outcomes are not mutually exclusive. For example, if horse A wins and horse B comes in third, the possible outcomes "horse A wins" and "horse B loses" are both true outcomes, and clearly both outcomes can be (and are) true.

In addition to a set of possible outcomes of an event potentially including more than one true outcome, a true outcome may change and may occur throughout the course of an event. For example, an event such a round of Blackjack may include a variety of true outcomes, e.g., the identity of the first card drawn from the card shoe (for storage of one or more decks of playing cards) or from the deck(s) of cards; the identity of the next card drawn from the card shoe; the identity of the dealer's hand of cards; the identity of the user's hand of cards, and so on.

In some embodiments, a wagering system may know a true outcome(s) of an event prior to, e.g., receiving wagers regarding possible outcomes of the event. In some embodiments, a wagering system may not know a true outcome(s) of an event prior to, e.g., receiving wagers regarding possible outcomes of the event. In some embodiments, a wagering system may know one or more characteristics of a true outcome of an event but, e.g., not the true outcome itself.

In some embodiments, a characteristic may include a trait, a quality, an aspect, a property, or a feature. A characteristic of a true outcome may include a trait, quality, aspect, property, or feature of a true outcome. A characteristic of a true outcome may include a fact relating to a true outcome, a likelihood value relating to a true outcome, or even a true outcome itself. Thus, a characteristic of a true outcome may include what a true outcome (or feature thereof) is, is not, will be, or will not be, and what a true outcome (or feature thereof) is likely to be, is not likely to be, is likely to not be, or is not likely to not be.

Several examples of characteristic(s) of true outcome(s) may exist for various events.

For example, in some embodiments, with an event being a card game, a characteristic of a true outcome may include what, e.g., the color, number, range of numbers, or suit of a winning (or losing) card (or hand, or next card to be dealt, etc.) (a) is, is not, will be, or will not be (e.g., the winning card will be red; the first card to be dealt will not be black; the card will be a 7; the next card to be dealt will be red; the card will not be a 10; the card will be greater than a 5; the losing card will be between a 3 and a 6 inclusive; the winning hand will include one black card; the hand will include a 10; the hand will not include an ace; the card is the 6 of spades; the card is not the 8 of diamonds; at least one card in the hand is not red); or (b) is likely to be, is not likely to be, is likely to not be, or is not likely to not be (e.g., the hand is 90 percent likely to total to "21"; the second card to dealt is only 10 percent likely to be greater than a 5; the "river" card is 55 percent likely to be the 3 of spades).

For example, in some embodiments, with an event being a horse race, a characteristic of a true outcome may include what, e.g., the color, name, number, breed, range of numbers, age of a winning (or losing) horse (a) is, is not, will be, or will not be (e.g., the winning horse will be brown; the losing horse will be black; the winning horse will be a pony; a black horse will come in third place); or (b) is likely to be, is not likely to be, is likely to not be, or is not likely to not be (e.g., the winning horse is 90 percent likely to not be wearing an odd number; there is a 80 percent chance that the winning horse will be brown; there is a 75 percent chance that the losing horse will not have competed in any races in the last month).

For example, in some embodiments, with an event being a lottery (with, e.g., numbered balls being drawn from a set of numbered or otherwise marked balls), a characteristic of a true outcome may include what, e.g., the number, marking, color, whether odd or even, range of numbers of a winning (or losing) ball (or combination of balls, the next ball drawn, etc.) (a) is, is not, will be, or will not be (e.g., the winning ball will be 6; the winning combination of balls will include a ball numbered 17; the winning combination will include the numbered day of a user's birth (or, e.g., one or more of a set of numbers of values known to the user and the system); the next ball to be drawn will not be a 27; the third ball to be drawn will be odd-numbered; the winning combination of balls includes at least two numbers from a previous winning combination of balls); or (b) is likely to be, is not likely to be, is likely to not be, or is not likely to not be (e.g., the winning combination of balls is 33 percent likely to include one or more balls with numbers in the range of 20 to 25; the next ball to be drawn is 50 percent likely to be even; the second ball to be drawn is 15 percent likely to be 33; the winning combination of balls is 75 percent likely to include one or more of the following numbered balls: 6, 13, 22, and 37; the next ball to be drawn is 60 percent likely to include three numbers from a previous winning combination of balls.

Other types of events may include, e.g., political or sporting contests or events, games (e.g., casino games) of chance (slot machines, dice games, craps, etc.), lotteries (e.g., powerball), and so on, and characteristics of true outcomes may include features specific to or relating to those events, e.g., for a dice game, a characteristic of a true outcome may include that the total of a die roll will be odd, and so on. For an event such as a political election, a characteristic of a true outcome may include that the winning candidate will be a Democrat, that the winner of the election will not be candidate A, and so on. For an event such as sporting contest or sporting event, a characteristic of a true outcome may include that the winner of the Wimbledon Women's Tennis Final will be from the United States, that the winner of the World Series in Major League Baseball will be from the American League, that a wildcard playoff team in the National Football League will come from the West Division of the National Football Conference, that the winner of the National Basketball Association Finals Game 1 will be the a team from the Eastern Conference, and so on.

In some embodiments, a characteristic of a true outcome of an event may include a positive indication of the true outcome. In some embodiments, a positive indication of the true outcome may include a positive recitation of what the true outcome is (e.g., the winning horse is horse A) or of what a feature of the true outcome is (e.g., the winning card is red). For example, if an event includes a card game, a characteristic of a true outcome of the event that includes a positive indication of the true outcome may include, e.g., a color of a winning card of the card game, a suit of the winning card, a number of the winning card, a range of numbers including the number of the winning card, or an identity of the next card to be drawn. For example, if an event includes a horse race, a characteristic of a true outcome of the event that includes a positive indication of the true outcome may include, e.g., a color of a winning horse of the horse race, an age of the winning horse, a number of the winning horse, or a breed of the winning horse.

In some embodiments, a characteristic of a true outcome of an event may include a negative indication of the true outcome. In some embodiments, a negative indication of the true outcome may include a negative recitation of what the true outcome is not (e.g., the winning horse is not horse C) or of what a feature of the true outcome is not (e.g., the winning card is not a six of hearts). For example, if an event includes a card game, a characteristic of a true outcome of the event that includes a negative indication of the true outcome may include, e.g., a color that is not a color of the winning card of the card game, a suit that is not a suit of the winning card, a number that is not a number of the winning card, a range of numbers that do not include the number of the winning card, or a number that is not a number of the next card to be drawn.

In some embodiments, a characteristic of a true outcome may include information regarding whether one or more specific possible outcomes will or will not occur (e.g., information that definitely includes and/or excludes possible outcomes). In some embodiments, a characteristic of a true outcome may include information regarding whether one or more possible outcomes of a set of possible outcomes of an event is, or is not, the true outcome.

In some embodiments, a characteristic of a true outcome may include information regarding whether one or more specific possible outcomes may or may not occur (e.g., information that does not definitely include and/or exclude possible outcomes). In some embodiments, a characteristic of a true outcome may include information regarding whether one or more possible outcomes of a set of possible outcomes of an event may be, or may not be, the true outcome. For example, if an event includes a card game, a characteristic of a true outcome of the event that includes information regarding whether one or more possible outcomes may be the true outcome may include, e.g., a likelihood that a color is a color of a winning card of the card game, a likelihood that a suit is a suit of the winning card, a likelihood that a number is a number of the winning card, or a likelihood that a range of numbers includes a number of the winning card.

Likelihood Values; Odds Ratios

Referring to FIG. 2, in some embodiments, a first set of likelihood values corresponding to the set of possible outcomes is determined (206) using second information. Each likelihood value of the first set of likelihood values may correspond to a respective possible outcome of the set of possible outcomes.

In some embodiments, determining a first set of likelihood values corresponding to a set of possible outcomes may include determining total amounts of first wagers on possible outcomes of the set of possible outcomes from the second information, and determining the first set of likelihood values using the total amounts of first wagers. In some implementations, the total amounts of first wagers on possible outcomes may include at least one of a number of first wagers (e.g., 10 first wagers placed on a first possible outcome, 5 first wagers placed on a second possible outcome, and so on) or a currency amount of first wagers (e.g., $2000 worth of first wagers placed on a first possible outcome, $700 worth of first wagers placed on a second possible outcome, and so on).

In some embodiments, a likelihood value may include a value assigned to, or corresponding to, a particular outcome (or combination of outcomes). In some embodiments, a likelihood value may be a type of information. A likelihood value may include, for example, a probability, odds, a currency amount (e.g., a currency amount of wagers placed on a respective possible outcome), a payout amount a number of wagers (e.g., a number of wagers placed on a respective possible outcome), or a combination of any of these. A set of likelihood values may include, for example, a set of probabilities, a set of odds, a set of currency amounts, a set of payout amounts, set of numbers of wagers, or a combination of any of these. A likelihood value may include, may reflect, or may be based on, user activities, such as wagering by users. A likelihood value may be unrelated to user activities, such as wagering by users.

In some embodiments, a likelihood value may be a probability reflecting an actual likelihood of a particular outcome (or combination of outcomes) occurring. For example, a tossing a two-sided coin once has two possible outcomes, "heads" or "tails". A likelihood value of 50 percent (or 0.5, or ½, or an odds ratio of 1/1 (odds in favor of heads)) for the outcome "heads" reflects an actual likelihood of the outcome "heads" occurring—on average, such a coin toss will result in "heads" 50 percent of the time.

In some embodiments, a likelihood value may be unrelated to an actual likelihood of a particular outcome (or combination of outcomes) occurring, even if the actual likelihood is known or is ascertainable. For example, assume that wagers are placed on the outcome of a single coin toss, and five wagers of $4 each are placed on "heads" and ten wagers of $1 each are placed on "tails". A likelihood value of, e.g., 66.7 percent (or 0.667, or ⅔ or an odds ratio of 2/1 (odds in favor of heads)) may be assigned to the outcome "heads" based, e.g., on the currency amount wagered on "heads" ($5\times4=\$20$) as a percentage of the total currency amount wagered ($(5\times4)+(10\times1)=\$30$). A likelihood value of, e.g., 33.3 percent may be assigned to the outcome "heads" based, e.g., on the number of wagers placed on "heads" (five wagers) as a percentage of the total number of wagers placed (fifteen wagers). Both of these example likelihood values (66.7 and 33 percent) are unrelated to the actual likelihood of the outcome "heads" occurring (50 percent). A likelihood value of, e.g., five wagers may be assigned to the outcome "heads", reflecting the number of wagers placed on "heads". A likelihood value of, e.g., $10 may be assigned to the outcome "tails", reflecting the currency amount wagered on the outcome "tails".

In an event such as a horse race, unlike in a coin toss, the actual likelihood of a particular outcome (or combination of outcomes) occurring may generally not be known in advance. Therefore, likelihood values associated with outcomes of the event may generally not reflect actual likelihoods in any respect, may include, reflect, or be based on, e.g., user activities, such as wagering by users.

In some embodiments, an odds ratio may include a direct relationship to an actual or estimated probability of an outcome of an event occurring, where an odds ratio for an outcome occurring may be given by a probability of the outcome occurring divided by a probability of the outcome not occurring. An odds ratio for an outcome not occurring may be given by a probability of the outcome not occurring divided by a probability of the outcome occurring. Odds ratios may or may not reflect actual odds ratios in any respect, and may include, reflect, or be based on, e.g., user activities, such as wagering by users. For example, an odds ratio in favor of a coin toss coming up "heads" that is based on user activities, e.g., wagers placed by users, may not correspond to an actual odds ratio in favor of a coin toss coming up "heads" determined by the actual likelihood of the coin toss coming up "heads" (e.g., 1 to 1). A possible outcome that (for whatever reason, due to actual probability or, e.g., user activities, such as wagering by users) is 70% likely may have an odds ratio of 7-3, or 3-7, depending on how determined or how presented to users. As another example, a possible outcome that is 1 percent likely may have an odds ratio of 1-99, or 99-1.

Incentivizing Users to Place Wagers Following Distribution of Information; Premiums Referring to FIG. 2, in some embodiments, first information about a set of possible outcomes of an event is provided (202) to users. In some embodiments, second information is received (204). The second information may be based on at least first wagers placed by the users. In some embodiments, the second information may include the first wagers. In some embodiments, receiving second information may include accepting the first wagers from the users. In some embodiments, the first wagers may be placed by the users following provision of the first information.

In some embodiments, incentives may be used to entice a user to place a wager (e.g., a first wager) after being provided with the first information.

In some embodiments, prior to the first information being provided to the users, a premium may be assessed to the users as compensation for the first information. For example, users may be asked to pay a price for information prior to the information being provided. In some implementations, the premium assessed to the users may include a price of a wager (e.g., a price of one of first wagers placed (or to be placed) by the users). In some implementations, the premium assessed to the users may include a wager credit. The wager credit may be redeemed by placing a future wager (e.g., a first wager). In some implementations, the wager credit may expire if the wager credit has not been redeemed by an expiration date.

In some embodiments, a premium may include a value that may be assessed, e.g., to a user in relationship to a potential user activity, e.g., placing a wager. In some implementations, the value may include an amount, fee, or price assessed to a user, for, e.g., placing a wager. In some implementations. the value may be measured in currency, credits, complimentary benefits ("comps"), or some other medium of exchange. In some implementations, the value may include the amount of a wager, e.g., an increased wager amount. In some implementations, the value may include a payout amount, e.g., a reduced payout amount. In some implementations, a user being assessed a premium may be told that, e.g., a payout amount has decreased from $1500 to $1250. In some implementations, the value may include likelihood values, e.g., reduced likelihood values. In some implementations, a user being assessed a premium may be told that, e.g., a likelihood value has decreased from 2 to 1 to 3 to 1 odds. In some implementations, a premium may include a value assessed for a wager, or may include an additional value assessed in addition to an original value assessed for the wager, or an additional value separate from the value assessed for a wager.

In some embodiments, a higher premium may be "higher" value that may be assessed. When the higher value includes an amount or fee, the amount or fee is higher. When the higher value includes likelihood values, the likelihood values may be reduced or increased. For example, if the likelihood values include probabilities, the probabilities may be reduced, whereas if the likelihood values include odds, the odds may be increased.

In some embodiments, a lower premium may be a "lower" value that may be assessed. When the lower value includes an amount or fee, the amount or fee is lower. When the higher value includes likelihood values, the likelihood values may be increased or reduced. For example, if the likelihood values include probabilities, the probabilities may be increased, whereas if the likelihood values include odds, the odds may be reduced.

In some embodiments, assessing may include presenting a user with a value. Presenting a user with a value may include, e.g., charging a user with the value, offering the value to a user, updating a value to a user, assigning the value to a user, or associating a value with a user. For example, assessing a premium (e.g., $5) to a user may include charging the user with the premium (e.g., charging the user $5).

In some embodiments, a wager credit may include a credit that may be redeemed by, e.g., a user of a wagering system by placing a future wager with, e.g., the system. In an implementation, the wager credit can only be redeemed in this manner. In an implementation, the wager credit may expire, e.g., after an expiration time or date. In some implementations, a user may purchase wager credits, a user may be awarded wager credits, or a user may be charged wager credits (e.g., by a wagering system).

In some embodiments, other incentives may be used (before or after providing a user with first information) to entice a user to place a wager (e.g., a first wager) after being provided with the first information.

In some embodiments, prior to providing the first information to the users, one or more indications may be received from the users. In some implementations, the one or more indications may be indicative of an intent (by the users) to place a first wager.

In some embodiments, after providing the first information to the users, a reward may be provided to the users in return for the users placing the first wagers. In some implementations, a reward may be the opposite of a premium. In some implementations, a reward may be assessed to the users. In some implementations, providing a reward may include waiving a penalty for not placing the first wagers. In some implementations, providing a reward may include reducing a premium of a future wager (e.g., a first wager).

In some embodiments, after providing the first information, a premium may be assessed to any user that does not place a first wager. In some implementations, the premium may include a price of one of the first wagers.

In some embodiments, after providing the first information, one or more users of the users may be provided with an option not to place a first wager.

In some embodiments, prior to providing the first information, one or more users of the users may be provided with an option of placing a first wager without receiving the first information.

Generation of Wagers

In some embodiments, wagers (or information about wagers) may be generated by, e.g., a wagering system. In some embodiments, generated wagers do not originate from users. In some embodiments, generated wagers do not originate from users in real-time or in the present day, but rather may be generated based at least in part on wagers placed by users in the past.

In some embodiments, internal processing of, e.g., a wagering system, may generate wagers. In some embodiments, generated wagers may originate internally to a wagering system. In some embodiments, a wagering system may process stored information, e.g., wagers that were placed by users in the recent or distant past, to generate wagers. In some embodiments, generating a wager may include generating a wager based in part on a prior wager placed by a user, or generating a wager independent of a prior wager placed by a user.

In some embodiments, artificially intelligent entities such as “bots” can be programmed to simulate human behavior in certain situations and may generate, or be used to generate, wagers. Hybrid artificial intelligence systems and techniques may be implemented to generate wagers.

Referring to FIG. 2, in some embodiments, first information about a set of possible outcomes of an event is provided (202) to users. In some embodiments, second information is received (204). The second information may be based on at least first wagers placed by the users. In some embodiments, a first set of likelihood values corresponding to the set of possible outcomes is determined (206) using the second information.

In some embodiments, additional first wagers may be generated. In some implementations, the second information may be based on the additional first wagers as well as on the first wagers placed by the users. Therefore, since in some embodiments the first set of likelihood values is determined using the second information, then the additional first wagers may impact the determination of the first set of likelihood values.

In some embodiments, the additional first wagers may be generated using, e.g., computer programs, parameters input by one or more administrators (e.g., wagering system administrators, such as computer network administrators, information technology professionals, computer programmers, and so on).

In some embodiments, the additional first wagers may be generated using the first information provided to the users.

In some embodiments, the additional first wagers may be generated using data about wagers previously accepted, e.g., by the wagering system. In some implementations, generating additional first wagers using data about wagers previously accepted may include retrieving a wager profile. In some implementations, a wager profile may include a distribution of wagers accepted from one or more users (e.g., of the wagering system) in one or more previous rounds of wagering. In some implementations, additional first wagers may be generated using, e.g., a wager profile, a distribution of wagers, wagers from the distribution of wagers, or trends observed from the wager profile.

In some embodiments, a round of wagering may include a time period during which wagering occurs. In some implementations, rounds of wagering will not overlap in time with one another. In some implementations, a round of wagering may overlap in time with another round of wagering, so that part of or the entire round of wagering occurs simultaneously with the other round.

In some embodiments, pseudo-wagers may be generated from, e.g., internal processing. In some embodiments, pseudo-wagers may be used to supplement actual wagering by users (e.g., of a wagering system) to create an appearance of wagering activity at least somewhat at variance with the actual wagering. In some embodiments, pseudo-wagers may include apparent wagers that do not originate from users of the system but rather are generated by a wagering system to affect an appearance of wagering by users of the system. In some embodiments, from the perspective of a user of the wagering system, the pseudo-wagers (and, e.g., any information or likelihood values determined using the pseudo-wagers) may appear as though they are wagers from other users of the wagering system.

In some embodiments, a wagering system may create an appearance of a wagering environment in which a plurality of users are participating and wagering, when in fact the wagering system is generating part of, or even nearly all of, the wagers.

One purpose of creating such an appearance of wagering may be to create excitement and interest around a particular event or game for a users or users. For example, a wagering system (or, e.g., a casino using or administering the wagering system) may have introduced a new game that to date has had limited popularity or user participation. The wagering system may want to promote the game to users and thus may, e.g., generate wagers to create an appearance of wagering by users so that new users may be attracted to a game or event and may keep wagering on possible outcomes of a game or an event.

A user may be aware that she is, e.g., “playing against a computer” (or the system), or might be completely unaware and might believe that the other wagers originated from users and were not, e.g., generated by the wagering system.

Another purpose of creating an appearance of wagering may be to influence user activities (e.g., wagering) in certain directions, e.g., away from or toward certain possible outcomes. In some embodiments, a wagering system may not be obligated to divulge aspects of its wagering and thus may have great latitude to, e.g., generate wagers (e.g., pseudo-wagers) and use these wagers to enhance aspects of a wagering environment. In some embodiments, wagers may be generated to attempt to exploit expected biases of users of the wagering system. For example, it may be known to the wagering system (based, e.g., on historical experience, or mining of historical data) that a user (e.g., a married male between the ages of 30 and 40 who makes under $60,000 annually and who lives in the Northeastern United States; a single female who lives in the suburbs and votes Democratic, and so on) will tend to wager in a certain fashion when a certain set of likelihood values corresponding to a set of possible outcomes is configured in a particular way. In some embodiments, a wagering system may generate wagers to determine a set of likelihood values configured in this particular way, with the hope of exploiting this expected bias of the user (e.g., perhaps motivating the user to wager on a particular possible outcome).

Expected Biases of Uses: Example Embodiments

Figure 3:
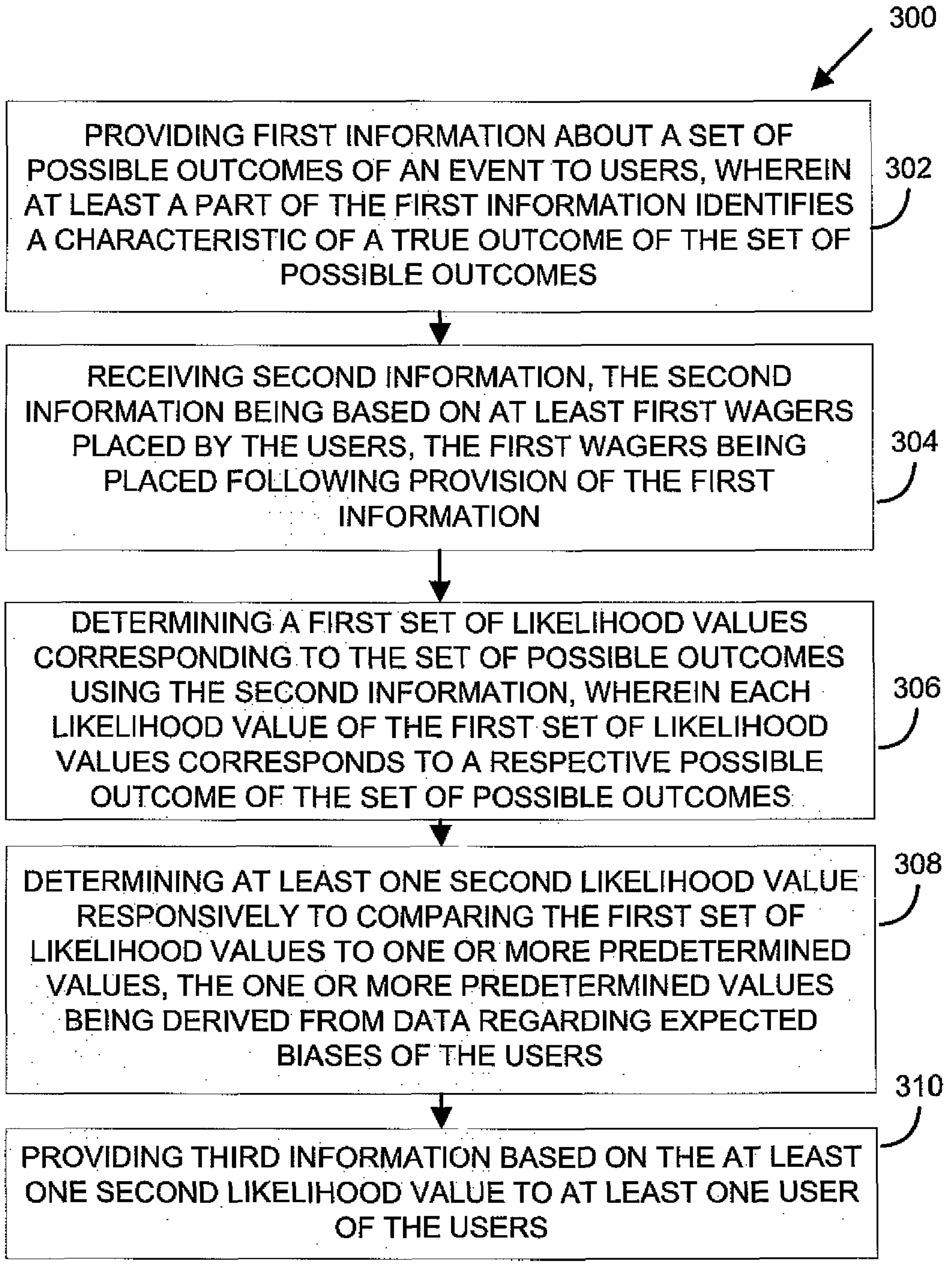

FIG. 3 illustrates an example process 300 that may be implemented on the example apparatus 100 of FIG. 1. For example, in some embodiments, one or more servers 102 of the plurality of servers 102-1 to 102-M and/or one or more devices 114 of the plurality of devices 114-1 to 114-P may perform one or more steps of the process 300.

According to the process 300, in some embodiments, first information about a set of possible outcomes of an event is provided (302) to users. At least a part of the first information may identify a characteristic of a true outcome of the set of possible outcomes.

In some embodiments, second information is received (304). The second information may be based on at least first wagers placed by the users. The first wagers may be placed by the users following provision of the first information. In some embodiments, the second information may include the first wagers.

In some embodiments, a first set of likelihood values corresponding to the set of possible outcomes is determined (306) using the second information. In some embodiments, the first set of likelihood values may be determined using first wagers placed by users following provision of the first information. Each likelihood value of the first set of likelihood values may correspond to a respective possible outcome of the set of possible outcomes.

In some embodiments, at least one second likelihood value is determined (308) responsively to comparing the first set of likelihood values to one or more predetermined values. The one or more predetermined values may be derived from data regarding expected biases of the users.

In some embodiments, third information based on the at least one second likelihood value is provided (310) to at least one user of the users. In some embodiments, the third information may include the at least one second likelihood value. In some embodiments, at least one second likelihood value may be provided to at least one user of the users.

Figure 4:
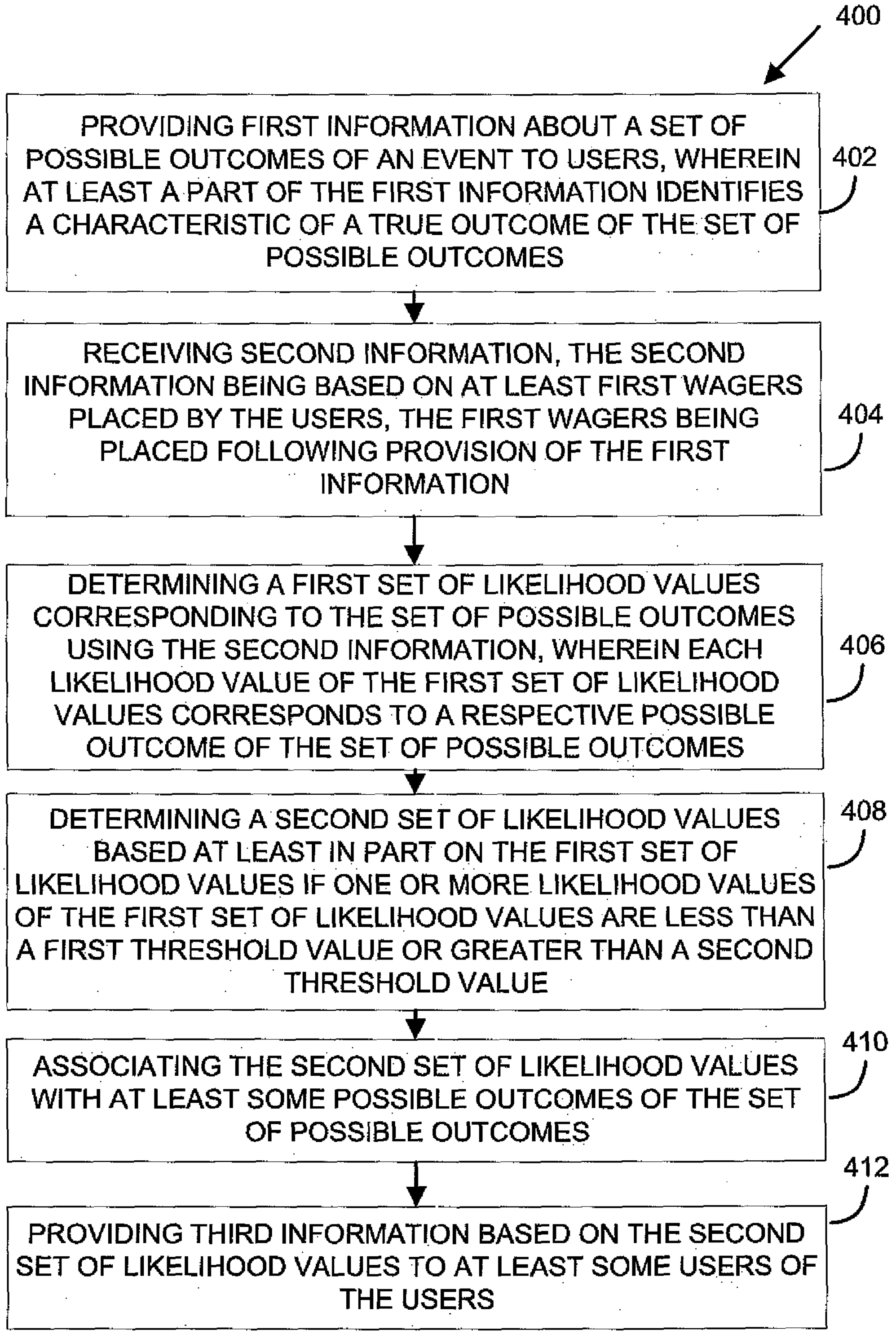

FIG. 4 illustrates an example process 400 that may be implemented on the example apparatus 100 of FIG. 1. For example, in some embodiments, one or more servers 102 of the plurality of servers 102-1 to 102-M and/or one or more devices 114 of the plurality of devices 114-1 to 114-P may perform one or more steps of the process 400.

As in the example process 300 of FIG. 3, according to the process 400, in some embodiments, first information about a set of possible outcomes of an event is provided (402) to users, second information is received (404), and a first set of likelihood values corresponding to the set of possible outcomes is determined (406) using the second information.

In some embodiments, a second set of likelihood values is determined (408) based at least in part on the first set of likelihood values if one or more likelihood values of the first set of likelihood values are less than a first threshold value or greater than a second threshold value.

In some embodiments, the second set of likelihood values is associated (410) with at least some possible outcomes of the set of possible outcomes.

In some embodiments, third information based on the second set of likelihood values is provided (412) to at least some users of the users.

In another example process, in some embodiments, data may be made available that defines outcomes of an event. In some embodiments, the data may indicate a feature of a true outcome of the event.

In some embodiments, second data relating to wagers may be processed. In some embodiments, the wagers may be accepted following the data being made available.

In some embodiments, odds may be developed for the outcomes from the second data.

In some embodiments, second odds may be developed if some of the odds exceed or fall below assigned levels.

In some embodiments, the second odds may be related to the outcomes.

In some embodiments, third data may be developed. In some embodiments, the third data may be based at least on the second odds.

In some embodiments, the third data may be made available.

Predetermined Values; Threshold Values; Expected Biases of Users; Long Shot and Favorite Biases; Determining at Least One Second Likelihood Value Referring to FIG. 3, in some embodiments, at least one second likelihood value is determined (308) responsively to comparing the first set of likelihood values to one or more predetermined values. The one or more predetermined values may be derived from data regarding expected biases of the users.

Referring to FIG. 4, in some embodiments, a second set of likelihood values is determined (408) based at least in part on the first set of likelihood values if one or more likelihood values of the first set of likelihood values are less than a first threshold value or greater than a second threshold value. In some embodiments, the first threshold value and the second threshold value may be determined using data regarding expected biases of the users.

In some embodiments, a predetermined value may include a value determined beforehand. In some embodiments, a predetermined value may include a threshold value.

In some embodiments, a threshold value may include a likelihood value such as, e.g., a probability (e.g., 95 percent (0.95, 95/100), or 5 percent (0.05, 5/100)), odds, a currency amount (e.g., a currency amount of wagers placed on a respective possible outcome), a payout amount, a number of wagers (e.g., a number of wagers placed on a respective possible outcome), or a combination of any of these, that, e.g., may be used for comparison with other likelihood values. The threshold value may be predetermined, e.g., prior to a comparison with other likelihood values.

In some embodiments, predetermined value(s) (such as, e.g., threshold value(s)) may be derived from data regarding expected biases of user(s) of, e.g., a wagering system. In some embodiments, data regarding expected biases may include data regarding one or more biases that one or more users of, e.g., a wagering system, are expected to share. Examples of biases include, e.g., a bias toward undervaluing very likely outcomes, or a bias toward overvaluing very unlikely outcomes.

It should be understood that data regarding expected biases of "users" may refer to one or more expected biases of all users, some users, or only one user. For example, it may be expected that all users of a wagering system will behave (or are likely to behave) in a certain way in a certain situation, e.g., in a wagering situation. For example, it may be expected that less than all users, or even only one user will behave (or be likely to behave) in a certain way in a certain situation. For example, it may be expected that all users of a particular type or category of user (e.g., users in a certain demographic group) will behave (or are likely to behave) in a certain way, or that less than all users (or even only one user) of the particular type or category of user will behave (or be likely to behave) in that certain way.

Expected biases, may encompass a vast range of biases. Some biases may be, e.g., well-known and documented in psychological and scientific literature. Examples of such biases include, e.g., long shot and favorite biases (described in more detail below). Other underlying biases may exist that may not have been identified, or widely identified yet, but that may be detectable through mining of accumulated historical data. Still other biases may be the subject of proposed theories but might not have been studied in detail or proven yet by empirical evidence.

In some embodiments, the data regarding expected biases of the users are based on at least some historical experience with the wagering system. In some embodiments, historical experience may include data or information on things that happened or occurred in the past. In some embodiments, historical experience with a wagering system may refer to any prior experience with the wagering system. This prior experience may include accumulated and stored historical data of user activities, e.g., wagering, in the wagering system in certain situations that provide an indication of where and when biases of the users may be expected to manifest themselves.

In some embodiments, the data regarding expected biases of the users are based on at least some historical experience apart from (or outside of) the wagering system. In some embodiments, the historical experience apart from the wagering system may include actual or theoretical wagering results. In some embodiments, theoretical wagering results may include, e.g., academic research on wagering, or results from established studies. In some embodiments, actual wagering results may include actual wagers made in wagering environments apart from the wagering system, e.g., in other (perhaps competing) wagering systems.

In some embodiments, information received and/or provided by a wagering system may be accumulated and stored. The stored information may be analyzed over time (e.g., months or years) for possible trends in, e.g., user behavior. In some embodiments, the wagering system may gather public and/or private information about users of the wagering system, such as information about or relating to a user's gender, race, age, date of birth, place of birth, citizenship, national origin, religion or religious beliefs, political party, voting history, marital status, family status, children, relatives, friends, relationships, sexual orientation, health status, height, weight, foreign language abilities, personal income, household income, assets, credit history, credit score, insurance claims history, traffic record, criminal record, litigation history, marital status, employment, other experience (e.g., military service or other forms of service), educational experience, grades, honors, awards, residence, value of residence, country, region of the country, hobbies, interests, personality, attitudes, psychological profile, favorite sporting teams, favorite celebrities or public figures, skills, abilities, lifestyle, memberships, affiliations, automobile, automobile color, habits (e.g., does the user drink alcohol or smoke), purchasing histories (such as shopping and spending patterns), online history (e.g., Internet or World Wide Web surfing histories and patterns), wagering history with the wagering system or other wagering systems, gambling history with the wagering system or other wagering systems, a gaming (or e.g., gambling) score, a gaming ((or e.g., gambling) report, past use of complimentary benefits (e.g., comps), event preferences, gaming preferences, wagering preferences, demographic information, or any combination of these. In some embodiments, information about users may be used to determine, e.g., information to be provided to users, wagers to be offered to users, games to be offered to users, possible outcomes of events to be offered to users, likelihood values to be provided to users, and so on. Information about one or more users may be used to build statistical models (e.g., regression models) to, e.g., predict behavior of the one or more users or of other users of, e.g., the wagering system.

In some embodiments, a user may be asked (or required) to provide at least some of the above information as a condition of being permitted to use (e.g., place wagers with) a wagering system. In some embodiments, a user may be asked (or required) to waive her or his rights to object to storage, analysis, or use of the information by a wagering system as a condition of being permitted to use (e.g., place wagers with) the wagering system.

For example, analysis of historical data (e.g., wagers compared with information about or relating to users) may demonstrate that a middle-aged suburban white woman who has a college education and lives in the southeastern United States may be predisposed toward placing wagers in lottery games on lottery numbers that include her birthday. In some embodiments, a wagering system may draw upon this data to identify users meeting these criteria (e.g., users "A" and "B") and may assess a higher premium to users for making wagers predicted by expected biases. For example, the wagering system may assess a higher premium to user A for wagers on lottery number combinations that include user A's birthday, and may assess a higher premium to user B for wagers on lottery number combinations that include user B's birthday. In some implementations, a wagering system may increase a premium with each subsequent wager predicted by expected biases and made by a user (e.g., users A and B).

For example, analysis of historical data may demonstrate that an individual under age 40 who gambles on a Tuesday following a three day weekend, and after the individual's home team won in a basketball game, may be predisposed to wager on the color black in a game of Roulette.

For example, analysis of historical data may demonstrate that divorced men born in California with at least one child and a credit score below 650 who own a red automobile may be predisposed to double down on certain hands in Blackjack in certain situations, or go "all in" in a game of Texas Hold 'Em in certain situations, for example, in certain situations in which, e.g., most users would not be predisposed behave in a similar manner.

For example, analysis of historical data may demonstrate that a Republican who occasionally smokes cigars, makes less than $50,000 a year, and speaks French may be predisposed to make trifecta wagers in a horse race in certain situations.

For example, analysis of historical data may demonstrate that certain individuals may be predisposed to behave in different ways depending on the game and depending on demographic information of the individuals.

In some embodiments, expected biases of the users may include a long shot bias or a favorite bias. In some embodiments, a long shot bias refers to a tendency, identified in psychological and statistical literature and research, of some individuals to overestimate the probability of a very unlikely possible outcome occurring. For example, if informed that a possible outcome of an event has a one in twenty (1/20) chance of occurring, an individual may exhibit a tendency to act as though the possible outcome is more likely to occur than the one in twenty (1/20) chance indicates. The individual may behave as though the possible outcome has a one in ten (1/10) chance of occurring, for example. These tendencies to act and behave may manifest themselves in a variety of ways. For example, in a pari-mutuel wagering system, a user may value a wager on a possible outcome more than a likelihood of that possible outcome occurring (e.g., the likelihood being determined on wagers made in the system) would indicate is the proper value of a wager associated with that possible outcome. In general, a user having a long shot bias may be predisposed toward overvaluing very unlikely outcomes.

In some embodiments, a favorite bias refers to a tendency, identified in psychological and statistical literature and research, of some individuals to underestimate the probability of a very likely possible outcome occurring. For example, if informed that a possible outcome of an event has a nineteen in twenty (19/20) chance of occurring, an individual may exhibit a tendency to act as though the possible outcome is less likely to occur that the nineteen in twenty (19/20) chance indicates. The individual may behave as though the possible outcome has a nine in ten (9/10) chance of occurring, for example. These tendencies to act and behave may manifest themselves in a variety of ways. For example, in a pari-mutuel wagering system, a user may value a wager on a possible outcome less than a likelihood of that possible outcome occurring (e.g., the likelihood being determined on wagers made in the system) would indicate is the proper value of a wager associated with that possible outcome. In general, a user having a favorite bias may be predisposed toward undervaluing very likely outcomes.

Referring to FIG. 4, in some embodiments, a second set of likelihood values is determined (408) based at least in part on the first set of likelihood values if one or more likelihood values of the first set of likelihood values are less than a first threshold value or greater than a second threshold value.

In some embodiments, the first and second threshold values may be determined using data regarding expected biases of the users. Data regarding expected biases of the users may include any theoretical, statistical, and/or experimental data regarding user biases on, e.g., extreme probabilities. In some embodiments, the expected biases of the users may include, e.g., underestimating a probability of an objectively likely outcome of an event occurring, overestimating a probability of an objectively unlikely outcome of the event occurring, overestimating a probability of the objectively likely outcome of the event not occurring, or underestimating a probability of the objectively unlikely outcome of the event not occurring.

For example, in some embodiments, experimental data may demonstrate that a user may be predisposed to underestimate a probability of a possible outcome (of an event) that is objectively likely to occur (e.g., a non-Joker card being randomly dealt from a deck of cards), or that a user may be predisposed to overestimate a probability of a possible outcome (of an event) that is objectively unlikely to occur (rolling double sixes with a pair of die). In some embodiments, this experimental data may be used to determine first and second threshold values.

In some embodiments, a possible outcome of an event is objectively likely to occur if the probability of the outcome of the event occurring (according to an objective, e.g., statistically based, measurement) is greater than some value X, where X may be, e.g., 90 percent, or 95 percent, and so on. In some embodiments, a possible outcome of an event is objectively unlikely to occur if the probability of the outcome of the event occurring (according to an objective, e.g., statistically based, measurement) is less than some value X, where X may be, e.g., 10 percent, or 5 percent, and so on.

Referring to FIG. 3, in some embodiments, at least one second likelihood value is determined (308) responsively to comparing the first set of likelihood values to one or more predetermined values. For example, the one or more predetermined values may include a 95 percent value, e.g., a 95 percent threshold value. According to the example, the first set of likelihood values may include a 99 percent likelihood value that corresponds to a respective possible outcome “A”. This may mean that the remaining possible outcomes of the set of possible outcomes (e.g., outcomes B, C, D, etc.) have a 1 percent likelihood between them. According to the example, the first set of likelihood values (including the 99 percent likelihood value for outcome A) is compared to the one or more predetermined values (e.g., the 95 percent value). The 99 percent likelihood value exceeds the 95 percent value, so, responsively to the comparison, at least one second likelihood value is determined.

In some embodiments, multiple possible outcomes may be grouped together in response to a comparison of the first set of likelihood values to one or more predetermined threshold values. In some embodiments, the at least one second likelihood value corresponds to two or more possible outcomes of the set of possible outcomes. According to the example, the at least one second likelihood value may correspond to two or more possible outcomes of the set of possible outcomes (e.g., two or more of outcomes B, C, D, etc.). In some embodiments, the two or more possible outcomes may be grouped together to produce a combined possible outcome. The at least one second likelihood value may be associated with the combined possible outcome.

In some embodiments, a combined possible outcome may include a possible outcome that results from two or more possible outcomes being grouped together. A likelihood value associated with the combined possible outcome may generally bear a relationship to the one or more likelihood values that respectively correspond (or corresponded) to the two or more possible outcomes that were grouped together.

Referring to FIG. 4, in some embodiments, a second set of likelihood values is determined (408) based at least in part on the first set of likelihood values if one or more likelihood values of the first set of likelihood values are less than a first threshold value or greater than a second threshold value. In some embodiments, the second set of likelihood values is not equal to the first set of likelihood values. That is, changes may have been to the first set of likelihood values in determining the second set of likelihood values. In some embodiments, the second set of likelihood values is equal to the first set of likelihood values. That is, no changes may have been made to the first set of likelihood values in determining the second set of likelihood values.

Referring to FIG. 4, in some embodiments, the second set of likelihood values is associated (410) with at least some possible outcomes of the set of possible outcomes. In some embodiments, the at least some possible outcomes of the set of possible outcomes may include combinations of one or more other possible outcomes of the set of possible outcomes. That is. the set of possible outcomes may include combinations of possible outcomes within the set. For example, in a horse race, “horse A wins” may be a possible outcome, “horse B comes in second place” may be a possible outcome, and “horse A wins and horse B comes in second” may be a possible outcome that is a combination of two possible outcomes.

Gaming Scores and Gaming Reports

In some embodiments, a gaming score (or, e.g., gambling score) corresponding to a particular user may be developed and maintained by one or more wagering systems. In some embodiments, a gaming report (or, e.g., gambling report) corresponding to a particular user may be developed and maintained by one or more wagering systems. Gaming scores and reports may be developed by wagering systems and/or e.g., other gambling monitoring and tracking organizations independent of wagering systems and may be used to monitor and track a user’s wagering history, gaming history, and overall gambling history. A gaming score (or scores) may provide a variety of information to a wagering system. For example, a gaming score may indicate whether a particular user has been successful (or unsuccessful) in making money from wagers, whether a user has displayed patterns of wagering that would indicate attempts by the user to get an edge on the wagering system (e.g., card counting by the user), how often a user has placed a wager in response to being provided with information, and so on. Gaming reports may provide more detailed information and analysis of a user's gambling history. For example, a gaming report may show that a user correctly guessed the winning poker hand in an online poker card game four months ago for a first wagering system, and that the same user placed a winning wager on a live horse race two months ago. A gaming report may show that a user received complimentary benefits from a casino five months ago but that the user did not gamble enough (or lose enough money) to offset the cost of the complimentary benefits. Gaming reports and/or scores may track how accurately the wagering system has used data regarding expected biases of users to a particular user's gambling behavior. For example, the gaming reports and/or scores may show that a wagering system has routinely correctly predicted the particular user's behavior when using data regarding expected biases, or that the particular user has confounded all attempts at predicting the user's behavior. The gaming reports and/or scores may track how often a user has wagered in a rational manner, e.g., in a manner that would be expected given the information (e.g., likelihood values) provided to the user. For example, gaming reports and/or scores may indicate that a certain percentage of the time a user wagers in an irrational manner. An example of an irrational move in Blackjack would be if a user was to ask to be dealt another card when the user's hand totals 16 and the dealer's card is a 2.

Opportunities to Wager; Derivative Wagering

Referring again to FIG. 3, in some embodiments, third information based on the at least one second likelihood value is provided (310) to at least one user of the users. In some embodiments, the third information may include the at least one second likelihood value. In some embodiments, at least one second likelihood value may be provided to at least one user of the users.

Referring again to FIG. 4, in some embodiments, third information based on the second set of likelihood values is provided (412) to at least some users of the users. In some embodiments, the third information may include the second set of likelihood values, e.g., rather than, or in addition to, information about the second set of likelihood values.

In some embodiments, providing the third information may include making the third information available to the public. In some embodiments, providing the third information may include outputting the third information as at least one of audio information or visual information. In some embodiments, outputting the third information may include outputting the visual information to at least one of a continuously updating ticker system, a user display interface, a portable device, or one or more sheets of paper. In some embodiments, outputting the third information may include outputting the audio information to at least one of a loudspeaker, or an audio speaker of a device.

In some embodiments, the at least some users are provided with an opportunity to wager based on the third information. In some embodiments, the opportunity to wager may be provided at a premium relative to another opportunity to wager based on the second information and the first set of likelihood values. An opportunity to wager based on third information may be more valuable to a user than an opportunity to wager based on the second information, because, e.g., the third information may reflect the second set of likelihood values-values that may have been determined by taking into account long shot or favorite biases of users.

In some embodiments, an opportunity to wager may include a chance to place a wager on a possible outcome. In some embodiments, an opportunity to wager may generally be provided to a user of a wagering system. In some embodiments, a user may be provided with information (such as, e.g., a likelihood value) along with the opportunity to wager. In some embodiments, an opportunity to wager may include actual placing of the wager with the wagering system.

In some embodiments, derivative wagering may be offered by the wagering system. In some embodiments, derivative wagering may include allowing users to wager on what users (e.g., other users) may do (e.g., possible activities of users) in response to expected bias adjustments (e.g., favorite or long shot bias adjustments) by the wagering system.

In some embodiments, second wagers relating to a second set of possible outcomes that may include possible activities of the at least one user (to whom the at least one second likelihood value was provided). In some embodiments, the possible activities may be responsive to the at least one second likelihood value provided (310 in FIG. 3) to the at least one user. In some embodiments, the possible activities may include wagering by the at least one user on at least one possible outcomes of the set of possible outcomes. The at least one possible outcome may be associated with the at least one second likelihood value.

In some embodiments, possible activities of one or more users may include any activities that may be undertaken by one or more users. In some embodiments, users may, e.g., wager (or place a wager, or change a wager), in response to being provided with, e.g., an opportunity to wager and information (e.g., a likelihood value). In some embodiments, possible activities may include, e.g., a user doing nothing (e.g., not wagering), a user placing a wager on a possible outcome A, a user placing a wager on a possible outcome B, a user placing a wager on grouped possible outcomes B and C, and so on. In some embodiments, a set of possible outcomes may include possible activities of users, or relate to possible activities of users. For example, a possible outcome (that, e.g., other users may place a derivative wager on) may be "a user places a wager on X", or "the user places no wagers".

Long Shot and Favorite Bias: Other Example Embodiments

Figure 5:
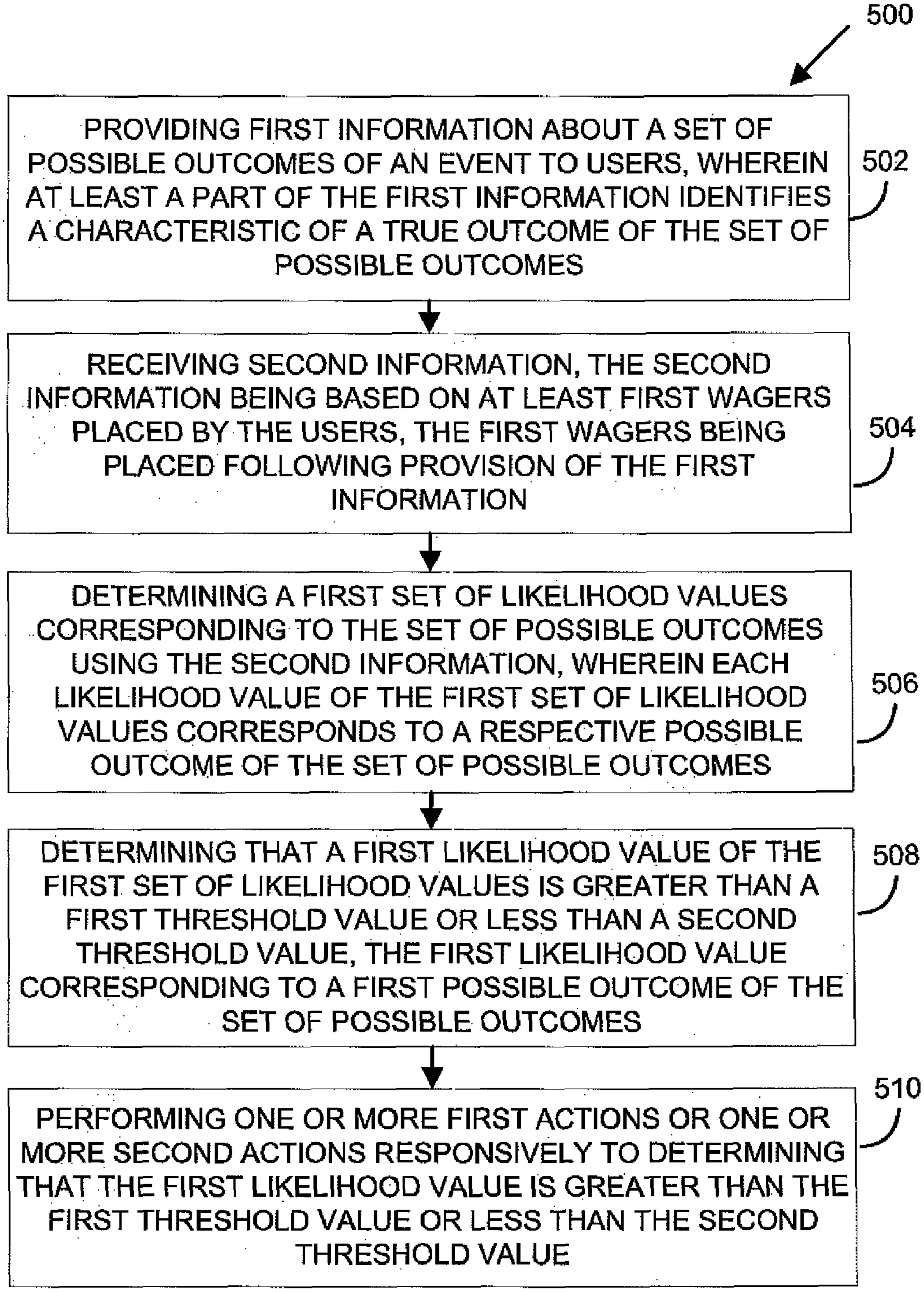

FIG. 5 illustrates an example process 500 that may be implemented on the example apparatus 100 of FIG. 1. For example, in some embodiments, one or more servers 102 of the plurality of servers 102-1 to 102-M and/or one or more devices 114 of the plurality of devices 114-1 to 114-P may perform one or more steps of the process 500.

According to the process 500, in some embodiments, first information about a set of possible outcomes of an event is provided (502) to users. At least a part of the first information may identify a characteristic of a true outcome of the set of possible outcomes. In some embodiments, not all users may be provided with the first information.

For example, the event may include a playing card being dealt. According to the example, a true outcome of the set of possible outcomes may be that "the next card to be dealt will be the ten of diamonds ". According to the example, a characteristic of this true outcome identified by at least a part of the first information may be that "the suit of the next card to be dealt will not be hearts and the number of the next card to be dealt will be higher than five".

According to the process 500, in some embodiments, second information is received (504). The second information may be based on at least first wagers placed by the users. The first wagers may be placed by the users following provision of the first information. In some embodiments, the second information may include the first wagers.

Continuing with the above example, the second information may include first wagers placed on each possible outcomes of the set of possible outcomes, e.g., five first wagers were placed on the possible outcome "the next card to be dealt will be the seven of spades", 37 first wagers were placed on the possible outcome "the suit of the next card to be dealt will be a club", no first wagers were placed on the possible outcome "the next card to be dealt will be the three of diamonds, four first wagers were placed on the possible outcome "the next card to be dealt will be the nine of clubs", and so on. Since the first wagers were placed by the users following provision of the first information, the first wagers may, e.g., reflect knowledge of the first information by the users. According to the example, consistent with the characteristic of the true outcome identified by the first information, users placed no first wagers on cards numbered five or lower or on cards that were of the suit hearts.

According to the process 500, in some embodiments, a first set of likelihood values corresponding to the set of possible outcomes is determined (506) using the second information. In some embodiments, the first set of likelihood values may be determined using first wagers placed by users following provision of the first information. Each likelihood value of the first set of likelihood values may correspond to a respective possible outcome of the set of possible outcomes.

Continuing with the above example, the second information may include a set of numbers of first wagers. Each number of first wagers (e.g., four first wagers) of the set of numbers of first wagers may correspond to a respective possible outcome (e.g., the possible outcome "the next card to be dealt will be the nine of clubs") of the set of possible outcomes. This set of numbers of first wagers may be used to determine the first set of likelihood values (e.g., probabilities, odds, and so on). According to the example, a likelihood value of 98 percent may be determined for a particular respective possible outcome (e.g., "the suit of the next card to be dealt will be a club or a diamond"), a likelihood value of 2 percent may be determined for a particular respective possible outcome (e.g., "the suit of the next card to be dealt will be a spade"), and a likelihood value of 20 percent may be determined for a particular possible outcome (e.g., "the number of the next card to be dealt will be a six or a seven").

According to the process 500, in some embodiments, a first likelihood value of the first set of likelihood values is determined (508) to be greater than a first threshold value or less than a second threshold value. The first likelihood value may correspond to a first possible outcome of the set of possible outcomes. As described herein, in some embodiments, the first threshold value and the second threshold value may determined using, and/or derived from, data regarding expected biases of users.

Continuing with the above example, a first threshold value may be, e.g., 95 percent, while a second threshold value may be, e.g., 5 percent. According to the example, a likelihood value (e.g., a first likelihood value) of 98 percent that corresponds to a respective possible outcome (a first possible outcome) "the suit of the next card to be dealt will be a club or a diamond" will be determined to be greater than the first threshold value of 95 percent, but not less than the second threshold value of 5 percent. According to the example, a likelihood value (e.g., a first likelihood value) of 2 percent that corresponds to a respective possible outcome (a first possible outcome) "the suit of the next card to be dealt will be a spade" will be less than the second threshold value of 5 percent, but not greater than the first threshold value of 95 percent.

According to the process 500, in some embodiments, one or more first actions or one or more second actions are performed (510) responsively to determining that the first likelihood value is greater than the first threshold value or less than the second threshold value.

In some embodiments, the first and second actions may include any of vast variety of actions that may be performed, e.g., by a wagering system. Any first action of the one or more first actions and any second action of the one or more second actions are not necessarily different from one another in some or all respects. In some embodiments, one or more first actions may overlap with one or more second actions. In some embodiments, one or more first actions may be different from one or more second actions.

In some embodiments, if the first likelihood value is greater than the first threshold value, the one or more first actions are performed. In some embodiments, if the first likelihood value is less than the second threshold value, the one or more first actions are performed.

In some embodiments, if the first likelihood value is less than the second threshold value, the one or more second actions are performed. In some embodiments, if the first likelihood value is greater than the first threshold value, the one or more second actions are performed.

In some embodiments, an underlying bias such as favorite bias may be exploited by, e.g., a wagering system.

In some embodiments, if the first likelihood value is greater than the first threshold value, the one or more first actions are performed. In some embodiments, performing the one or more first actions may include (and/or the one or more first actions themselves may include) determining a second likelihood value. In some embodiments, the second likelihood value may be less than the first likelihood value and greater than or equal to the first threshold value. In some embodiments, e.g., performing the one or more first actions may include associating the second likelihood value with the first possible outcome. In some embodiments, e.g., performing the one or more first actions may include providing one or more users of the users with the second likelihood value and an opportunity to wager on the first possible outcome. In some embodiments, one or more of the users may be provided with the opportunity to wager at a lower premium than would be provided if the opportunity to wager had been based on the second information and the first likelihood value.

In some embodiments, performing the one or more first actions may include (and/or the one or more first actions themselves may include) providing one or more of the users with an opportunity to wager at a lower premium than would be provided if the opportunity to wager had been based on the second information and the first likelihood value. In some embodiments, providing the opportunity to wager at, e.g., a lower premium does not require determination of a second likelihood value. In some embodiments, the opportunity to wager may be provided at a higher premium than would be provided if the opportunity to wager had been based on the second information and the first likelihood value.

Continuing with the above example, a likelihood value (e.g., a first likelihood value) of 98 percent that corresponds to a respective possible outcome (a first possible outcome) "the suit of the next card to be dealt will be a club or a diamond" will be determined to be greater than the first threshold value of 95 percent, so that, e.g., the one or more first actions are performed. According to the example, a second likelihood value of, e.g., 97 percent may be determined that is less than the first likelihood value of 98 percent and greater than the first threshold value of 95 percent (e.g., $98\%>97\%\geqq95\%$). According to the example, the second likelihood value of 97 percent may be associated with the first possible outcome "the suit of the next card to be dealt will be a club or a diamond". According to the example, one or more users of the users may be provided with the second likelihood value of 97 percent and an opportunity to wager on the first possible outcome, e.g., to place a wager that "the suit of the next card to be dealt will be a club or a diamond". In this way, an underlying favorite bias of a user (e.g., undervaluing favorites) may be exploited by presenting the user with a lower likelihood value so that the user may be more inclined to place a wager than the user would be with a likelihood value determined, e.g., solely by the first wagers placed by users.

In some embodiments, an underlying bias such as long shot bias may be exploited by, e.g., a wagering system.

In some embodiments, if the first likelihood value is less than the second threshold value, the one or more second actions are performed. In some embodiments, performing the one or more second actions may include (and/or the one or more second actions themselves may include) determining a second likelihood value. In some embodiments, the second likelihood value may be greater than the first likelihood value and less than or equal to the second threshold value. In some embodiments, e.g., performing the one or more second actions may include associating the second likelihood value with the first possible outcome. In some embodiments, e.g., performing the one or more second actions may include providing one or more users of the users with the second likelihood value and an opportunity to wager on the first possible outcome. In some embodiments, one or more of the users may be provided with the opportunity to wager at a higher premium than would be provided if the opportunity to wager had been based on the second information and the first likelihood value.

In some embodiments, performing the one or more second actions may include (and/or the one or more second actions themselves may include) providing one or more of the users with an opportunity to wager at a higher premium than would be provided if the opportunity to wager had been based on the second information and the first likelihood value. In some embodiments, providing the opportunity to wager does not require determination of a second likelihood value. In some embodiments, the opportunity to wager may be provided at a lower premium than would be provided if the opportunity to wager had been based on the second information and the first likelihood value.

Continuing with the above example, a likelihood value (e.g., a first likelihood value) of 2 percent that corresponds to a respective possible outcome (a first possible outcome) "the suit of the next card to be dealt will be a spade" will be determined to be less than the second threshold value of 5 percent, so that, e.g., the one or more second actions are performed. According to the example, a second likelihood value of, e.g., 3 percent may be determined that is greater than the first likelihood value of 2 percent and less than the second threshold value of 5 percent (e.g., 5%≧3%>2%). According to the example, the second likelihood value of 3 percent may be associated with the first possible outcome "the suit of the next card to be dealt will be a spade". According to the example, one or more users of the users may be provided with the second likelihood value of 3 percent and an opportunity to wager on the first possible outcome, e.g., to place a wager that "the suit of the next card to be dealt will be a spade". In this way, an underlying long shot bias (e.g., overvaluing long shots) of a user may be exploited by presenting the user with a higher likelihood value so that the user may be more inclined to place a wager than the user would be with a likelihood value determined, e.g., solely by the first wagers placed by users.

In some embodiments, an underlying bias such as favorite bias and long shot bias may be exploited by, e.g., a wagering system, by, e.g., grouping or combining possible outcomes.

In some embodiments, if the first likelihood value is greater than the first threshold value, the one or more first actions are performed. In some embodiments, performing the one or more first actions may include (and/or the one or more first actions themselves may include) grouping one or more possible outcomes of the set of possible outcomes other than the first possible outcome together to produce a combined possible outcome. In some embodiments, e.g., performing the one or more first actions may include determining a second likelihood value. In some embodiments, e.g., performing the one or more first actions may include associating the second likelihood value with the combined possible outcome. In some embodiments, e.g., performing the one or more first actions may include providing one or more users of the users with the second likelihood value and an opportunity to wager on the combined possible outcome.

In some embodiments, determining the second likelihood value may include adding together one or more likelihood values of the first set of likelihood values that correspond to the one or more possible outcomes that were grouped together to produce the combined possible outcome. In some embodiments, at least one user may be provided with separate opportunities to wager on respective possible outcomes of the one or more possible outcomes. In some embodiments, the separate opportunities to wager may be based on the second information and the first set of likelihood values. In some embodiments, the separate opportunities to wager may be provided at respective separate premiums. In some embodiments, the one or more users may be provided with the opportunity to wager on the combined possible outcome at a higher premium than a sum of the respective separate premiums. Thus, one or more users may be assessed a higher premium for wagering on the combined possible outcome than, e.g., may have otherwise been the case prior to the grouping of the one or more possible outcomes together.

In some embodiments, grouping the one or more possible outcomes together to produce the combined possible outcome, and/or providing the opportunity to wager on the combined possible outcome at, e.g., a higher premium, do not require determination of a second likelihood value.

Continuing with the above example, a likelihood value (e.g., a first likelihood value) of 98 percent that corresponds to a respective possible outcome (a first possible outcome) "the suit of the next card to be dealt will be a club or a diamond" will be determined to be greater than the first threshold value of 95 percent, so that, e.g., the one or more first actions are performed. The first possible outcome has a very high likelihood value, so other possible outcomes that do not overlap with the first possible outcome will have very low likelihood values. According to the example, one or more possible outcomes other than the first possible outcome (e.g., outcomes such as "the next card to be dealt will be the seven of spades" and "the next card to be dealt will be the ten of spades") may be grouped together to produce a combined possible outcome (e.g., "the next card to be dealt will be the seven of spades or the ten of spades"). According to the example, a second likelihood value of, e.g., 0.5 percent may be determined. According to the example, the second likelihood value of 0.5 percent may be associated with the combined possible outcome "the next card to be dealt will be the seven of spades or the ten of spades". According to the example, one or more users of the users may be provided with the second likelihood value of 0.5 percent and an opportunity to wager on the combined possible outcome, e.g., to place a wager that "the next card to be dealt will be the seven of spades or the ten of spades". In this way, an underlying long shot bias of a user (e.g., overvaluing long shots) may be exploited by presenting the user with, e.g., a higher likelihood value so that the user may be more inclined to place a wager than the user would be with a likelihood value determined, e.g., solely by the first wagers placed by users.

In some embodiments, derivative wagering may be offered by the wagering system. In some embodiments, derivative wagering may include allowing users to wager on what users (e.g., other users) may do (e.g., possible activities of users) in response to expected bias adjustments (e.g., favorite or long shot bias adjustments) by the wagering system.

Referring to FIG. 5, according to the process 500, in some embodiments, a first set of likelihood values corresponding to the set of possible outcomes is determined (506) using the second information. In some embodiments, the first set of likelihood values may be determined using first wagers placed by users following provision of the first information. Each likelihood value of the first set of likelihood values may correspond to a respective possible outcome of the set of possible outcomes. According to the process 500, in some embodiments, a first likelihood value of the first set of likelihood values is determined (508) to be greater than a first threshold value or less than a second threshold value. The first likelihood value may correspond to a first possible outcome of the set of possible outcomes. According to the process 500, in some embodiments, one or more first actions or one or more second actions are performed (510) responsively to determining that the first likelihood value is greater than the first threshold value or less than the second threshold value.

In some embodiments, the one or more first actions or one or more second actions may share common features. In some embodiments, performing the one or more first actions or the one or more second actions may include (or the one or more first actions or the one or more second actions themselves may include determining a second likelihood value. In some embodiments, e.g., performing the one or more first actions or the one or more second actions may include associating the second likelihood value with the first possible outcome. In some embodiments, e.g., performing the one or more first actions or the one or more second actions may include providing one or more users of the users with the second likelihood value and an opportunity to wager on the first possible outcome. In some embodiments, e.g., performing the one or more first actions or the one or more second actions may include providing other users with a second opportunity to wager on possible activities of the one or more users with respect to the opportunity to wager and the first possible outcome. For example, other users may wager on the potential responses of the one or more users to being provided with an opportunity to wager on the first possible outcome, given a second likelihood value that may, e.g., differ from the first likelihood value determined (as part of the first set of likelihood values) using the second information. For example, other users may be permitted to place wagers relating to how one or more users may respond after being provided with likelihood value(s) (or information that may be based on likelihood value(s)) that may have been determined, e.g., based on expected biases of users (such as favorite bias or long shot bias).

In some embodiments, a second set of likelihood values may be determined. In some embodiments, the second set of likelihood values may be associated with the second opportunity to wager. In some embodiments, the second set of likelihood values may be updated as a first time approaches. In some embodiments, the second opportunity to wager may terminate at the first time, e.g., the second opportunity to wager may no longer be provided to the other users beginning on or after the first time.

For example, a likelihood value (of a second set of likelihood values) of 12 percent may be determined for a particular respective possible outcome (e.g., "no user of the one or more users will place a wager on the first possible outcome after being provided with the opportunity to wager"), a likelihood value of 6 percent may be determined for a particular respective possible outcome (e.g., "user A of the one or more users will place a wager on the first possible outcome after being provided with the opportunity to wager"), and a likelihood value of 80 percent may be determined for a particular possible outcome (e.g., "Only one user of the one or more users will fail to place a wager on the first possible outcome after being provided with the opportunity to wager").

In some embodiments, performing the one or more first actions or the one or more second actions may include (or the one or more first actions or the one or more second actions themselves may include grouping one or more possible outcomes of the set of possible outcomes other than the first possible outcome together to produce a combined possible outcome. In some embodiments, e.g., performing the one or more first actions or the one or more second actions may include determining a second likelihood value. In some embodiments, e.g., performing the one or more first actions or the one or more second actions may include associating the second likelihood value with the combined possible outcome. In some embodiments, e.g., performing the one or more first actions or the one or more second actions may include providing one or more users of the users with the second likelihood value and an opportunity to wager on the combined possible outcome. In some embodiments, e.g., performing the one or more first actions or the one or more second actions may include providing other users with a second opportunity to wager on possible activities of the one or more users with respect to the opportunity to wager and the combined possible outcome. For example, other users may wager on the potential responses of the one or more users to being provided with an opportunity to wager on the combined possible outcome.

The Monty Hall Paradox

The Monty Hall paradox takes its name from the host of the television game show "Let's Make A Deal". In one example of the paradox, a game show contestant attempts to win a car by selecting one of three doors. The car is behind one of the doors, while each of the remaining two doors has a goat behind them. The contestant has a 1 in 3 chance of correctly selecting the door that has the car behind it. In an example with doors A, B, and C, the contestant chooses door A. The "Monty Hall" character then opens one of the two doors B or C (say door C) to reveal a goat ("Monty Hall" knows which door the car is behind), and then asks the contestant whether the contestant would like to switch their choice of doors from door A to the door that "Monty Hall" did not open (say door B). Experience has shown that many individuals when confronted with this paradox that it makes no difference in terms of the chance of winning the car whether the contestant switches doors or not, believing (mistakenly) that the contestant has a 1 in 2 chance of winning the car if the contestant does not switch from door A and that the contestant has a 1 in 2 chance of winning if the contestant does switch from door A to the door that "Monty Hall" did not open (say door B). The correct answer is that the contestant improves their odds of winning the car by switching doors from door A to the door that "Monty Hall" did not open (say door B). In fact, according to the example, ⅔ of the time, the contestant will win the car by switching doors. This seeming unintuitive result is explained by the requirement that Monty Hall knows which door the car is behind and must reveal to the contestant a door that has a goat behind it. This means that ⅔ of the time, the car will be behind one of the two doors not initially selected by the contestant (⅓ of the time the car will be behind the door initially selected), and that in each situation (given the requirements of the paradox), "Monty Hall" would be forced to reveal to the contestant the door that has the goat behind it, with the remaining unopened door having a car behind it.

FIRST EXAMPLE

3 Doors

For example, the car will be behind door A ⅓ of the time, behind door B ⅓ of the time, and behind door C ⅓ of the time. The contestant always selects door A initially.

If the car is behind door A (⅓ of the time), since "Monty Hall" must open a door with a goat behind it, "Monty Hall" will open either door B or door C, revealing a goat. If the contestant switches from door A to door B or door C, the contestant will find a goat and will lose the car.

If the car is behind door B (⅓ of the time), since "Monty Hall" must open the door with the goat behind it, "Monty Hall" must open door C, revealing a goat. If the contestant switches from door A to door B (the only other unopened door to select), the contestant will win the car.

If the car is behind door C (the remaining ⅓ of the time), since "Monty Hall" must open the door with the goat behind it, "Monty Hall" must open door B, revealing a goat. If the contestant switches from door A to door C (the only other unopened door to select), the contestant will win the car.

Thus, ⅔ of the time that the contestant switches from door A (i.e., when the car is behind door B or door C), the contestant wins the car. The remaining ⅓ of the time (when the car is behind door A), the contestant loses by switching from door A (the door with the car behind it). If the contestant did not switch doors from door A, the contestant would only win the car ⅓ of the time (when the car is behind door A). Thus, it is to the contestant's advantage to switch doors (⅔ versus ⅓ probability of winning the car).

Note that, e.g., (contrary to the stated requirements of the above version of the paradox) if "Monty Hall" did not know the location of the car and was permitted to open either one of the two doors not initially selected by the contestant irrespective of whether a goat was behind the door opened, then the contestant would only win the car ½ of the time by switching. Thus, it would make no difference whether the contestant switched doors or not.

The Monty Hall paradox may be extended to one car behind N doors. In that case, if "Monty Hall" is still constrained by the requirements of this version of the paradox to knowing the location of the car and being forced to reveal that one or more doors (from 1 doors on up to N−2 doors) other than the door initially selected by the contestant have goat(s) behind them, then it is still to the contestant's advantage to switch doors to one of the door(s) not opened by "Monty Hall".

SECOND EXAMPLE

4 Doors; One Door Opened Taking N=4 doors (doors A, B, C, D) as an example, first assuming that "Monty Hall" opens one door.

For example, the car will be behind door A ¼ of the time, behind door B ¼ of the time, behind door C ¼ of the time, and behind door D ¼ of the time. The contestant always selects door A initially.

If the car is behind door A (¼ of the time), since "Monty Hall" must open a door with a goat behind it, "Monty Hall" will open one of door B, door C or door D, revealing a goat. If the contestant switches from door A to door B, door C, or door D, the contestant will find a goat and will lose the car.

If the car is behind door B (¼ of the time), since "Monty Hall" must open a door with a goat behind it, "Monty Hall" must open door C or door D, revealing a goat. If the contestant switches from door A to door B (⅛ of the time, ½ of ¼ is ⅛), the contestant will win the car. If the contestant switches from door A to door C or door D (i.e., whichever door with the goat behind it that "Monty Hall" does not open) (⅛ of the time), the contestant will find a goat and lose the car.

If the car is behind door C (¼ of the time), since "Monty Hall" must open a door with a goat behind it, "Monty Hall" must open door B or door D, revealing a goat. If the contestant switches from door A to door C (⅛ of the time, ½ of ¼ is ⅛), the contestant will win the car. If the contestant switches from door A to door B or door D (i.e., whichever door with the goat behind it that "Monty Hall" does not open) (⅛ of the time), the contestant will find a goat and lose the car.

If the car is behind door D (the remaining ¼ of the time), since "Monty Hall" must open a door with a goat behind it, "Monty Hall" must open door B or door C, revealing a goat. If the contestant switches from door A to door D (⅛ of the time, ½ of ¼ is ⅛), the contestant will win the car. If the contestant switches from door A to door B or door C (i.e., whichever door with the goat behind it that "Monty Hall" does not open) (⅛ of the time), the contestant will find a goat and lose the car.

Thus, ⅜ of the time that the contestant switches from door A (i.e., ⅛ of the time the car is behind door B and the contestant does not switch to door C or D, ⅛ of the time the car is behind door C and the contestant does not switch to door B or D, and ⅛ of the time the car is behind door D and the contestant does not switch to door B or C), the contestant wins the car. The remaining ⅝ of the time that the contestant switches from door A (i.e., ¼ of the time the car is behind door A, ⅛ of the time the car is behind door B and the contestant switches to door C or D, ⅛ of the time the car is behind door C and the contestant switches to door B or D, and ⅛ of the time the car is behind door D and the contestant switches to door B or C) the contestant loses the car. If the contestant did not switch doors from door A, the contestant would only win the car ¼ of the time (when the car is behind door A). Thus, it is to the contestant's advantage to switch doors (⅜ versus ¼ probability of winning the car).

THIRD EXAMPLE

4 Doors; Two Doors Opened

Taking N=4 doors (doors A, B, C, D) as an example, now assuming that "Monty Hall" opens two doors.

For example, the car will be behind door A ¼ of the time, behind door B ¼ of the time, behind door C ¼ of the time, and behind door D ¼ of the time. The contestant always selects door A initially.

If the car is behind door A (¼ of the time), since "Monty Hall" must open two doors, each with a goat behind it, "Monty Hall" will open doors B and C, doors B and D, or doors C and D, revealing a goat behind each of the two opened doors. If the contestant switches from door A to door B, door C, or door D, the contestant will find a goat and will lose the car.

If the car is behind door B (¼ of the time), since "Monty Hall" must open two doors, each with a goat behind it, "Monty Hall" must open doors C and D, revealing a goat behind each of the two doors. If the contestant switches from door A to door B (the only other unopened door to select), the contestant will win the car.

If the car is behind door C (¼ of the time), since "Monty Hall" must open two doors, each with a goat behind it, "Monty Hall" must open doors B and D, revealing a goat behind each of the two doors. If the contestant switches from door A to door C (the only other unopened door to select), the contestant will win the car.

If the car is behind door D (the remaining ¼ of the time), since "Monty Hall" must open two doors, each with a goat behind it, "Monty Hall" must open doors B and C, revealing a goat behind each of the two doors. If the contestant switches from door A to door D (the only other unopened door to select), the contestant will win the car.

Thus, ¾ of the time that the contestant switches from door A (i.e., when the car is behind door B, door C, or door D), the contestant wins the car. The remaining ¼ of the time (when the car is behind door A), the contestant loses by switching from door A (the door with the car behind it). If the contestant did not switch doors from door A, the contestant would only win the car ¼ of the time (when the car is behind door A). Thus, it is to the contestant's advantage to switch doors (¾ versus ¼ probability of winning the car).

The Monty Hall Paradox: Example Embodiments

Figure 6:
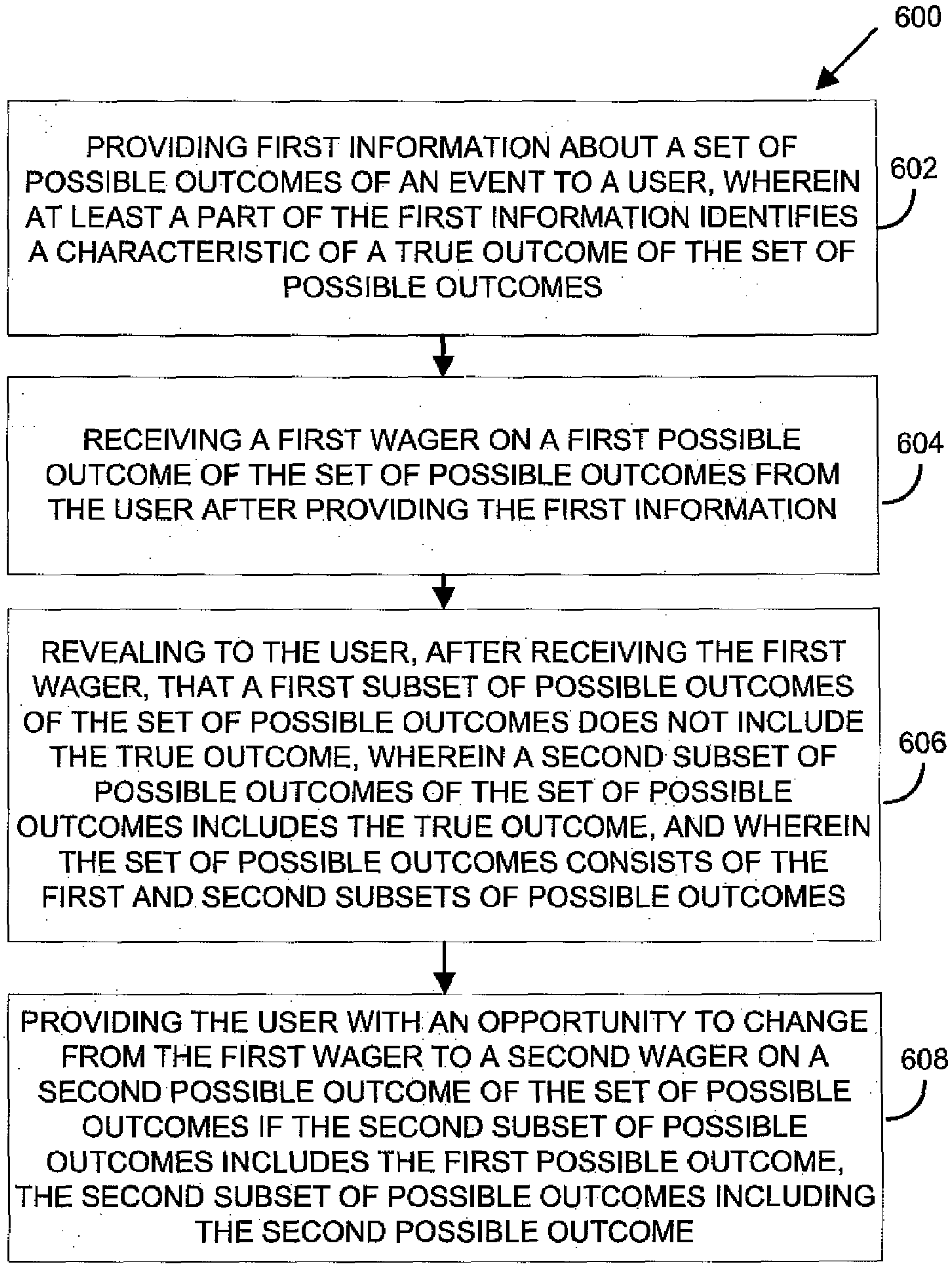

FIG. 6 illustrates an example process 600 that may be implemented on the example apparatus 100 of FIG. 1. For example, in some embodiments, one or more servers 102 of the plurality of servers 102-1 to 102-M and/or one or more devices 114 of the plurality of devices 114-1 to 114-P may perform one or more steps of the process 600.

According to the process 600, in some embodiments, first information about a set of possible outcomes of an event is provided (602) to a user. At least a part of the first information may identify a characteristic of a true outcome of the set of possible outcomes.

For example, the event may include a horse race. A set of possible outcomes may include possible outcomes "horse A wins the race" (outcome A), "horse B wins the race" (outcome B), "horse C wins the race" (outcome C), "horse D wins the race" (outcome D), and "horse E wins the race" (outcome E). According to the example, a true outcome of the set of possible outcomes may be, e.g., that "horse C wins the race" (outcome C). According to the example, a characteristic of this true outcome identified by at least a part of the first information may be, e.g., that "horse C will not come in second or third place", or that "the winner of the horse race placed second in two races last month", or that "the winner of the horse race is a brown horse"). Assume, according to the example, that possible outcome C is the true outcome. Of course, in other example scenarios, e.g., possible outcomes A, B, D, or E could be the true outcome.

According to the process 600, in some embodiments, a first wager is received (604) on a first possible outcome of the set of possible outcomes. The first wager may be received from the user after the first information is provided to the user. The first wager may be placed by the users following provision of the first information.

Continuing with the above example, a first wager is received on a first possible outcome "X" of the set of possible outcomes after the first information is provided to the user, so the user's first wager may reflect knowledge by the user of this first information. The first possible outcome "X" could be any one of the possible outcomes A, B, C, D, or E. The first possible outcome "X" could in fact be a true outcome (here outcome C), although the user generally would not know this.

According to the process 600, in some embodiments, it is revealed (606) to the user, after receiving the first wager, that a first subset of possible outcomes of the set of possible outcomes does not include the true outcome. In some embodiments, a second subset of possible outcomes of the set of possible outcomes includes the true outcome. In some embodiments, the set of possible outcomes consists of the first and second subsets of possible outcomes. In some embodiments, the set of possible outcomes may include other possible outcomes than the first and second subsets of possible outcomes.

In some embodiments, a subset of possible outcomes may be defined such that all possible outcomes of the subset of possible outcomes are included in a set of possible outcomes and no possible outcomes of the subset of possible outcomes are not included in the set of possible outcomes, i.e., the subset of possible outcomes is wholly contained by the set of possible outcomes.

In some embodiments, revealing, e.g., information to, e.g., a user may include providing information to a user. In some embodiments, revealing may include informing, e.g., a user, of something, e.g., a fact. In some embodiments, revealing something, e.g., information, to a user in no way requires activity on the part of the user. It should be understood that whether or not a user is even capable of understanding the something that is being revealed (or provided, or identified) is not required for infringement of, or interpretation of, e.g., claims that include the term "reveal" (or the terms "provide" or "identify"). In some embodiments, revealing (or providing, or identifying) something to a user need not imply that the user necessarily is informed of the something, rather, revealing means that the user has been provided with information. However, most objectively knowledgeable individuals to who something, e.g., a plain fact, is revealed may understand the something, e.g., the plain fact.

Continuing with the above example, it is revealed to the user that a first subset of possible outcomes (e.g., here outcome B ("horse B wins the race") and outcome E ("horse E wins the race")) does not include the true outcome (here outcome C ("horse C wins the race")). According to the example, a second subset of possible outcomes (e.g., here outcome A ("horse A wins the race"), outcome C, and outcome D ("horse D wins the race") includes the true outcome (here outcome C). According to the example, the set of possible outcomes (outcomes A, B, C, D, E) consists of the first and second subsets of possible outcomes (here outcomes B and E, and outcomes A, C, and D, respectively).

According to the process 600, in some embodiments, the user is provided (608) with an opportunity to change from the first wager to a second wager on a second possible outcome of the set of possible outcomes if the second subset of possible outcomes includes the first possible outcome. In some embodiments, the second subset of possible outcomes includes the second possible outcome. Generally, the second subset of possible outcomes may include the second possible outcome since a user would be unlikely to change to a second wager on an outcome that was revealed to a user to not be a true outcome.

Continuing with the above example, the user is provided with an opportunity to change from the first wager (on the first possible outcome, outcome "X") to a second wager on a second possible outcome (outcome "Y"; unknown, could be any one of the second subset of possible outcomes, here outcomes A, C, and D), if the second subset of possible outcomes (here outcomes A, C, and D) includes the first possible outcome (outcome "X"). That is, the user is provided with the opportunity to change if the user's first wager on first possible outcome "X" was not a wager on outcome B or outcome E (outcomes B and E are in the first subset of possible outcomes, which was revealed to the user not to include the true outcome)—which is equivalent here to the first possible outcome being included in the second subset of possible outcomes—so that the user did not, e.g., already lose the first wager. According to the example, the second subset of possible outcomes (outcomes A, C, and D) includes the second possible outcome "Y", so that "Y" could be the true outcome (here outcome C) or the non-true outcomes (here outcomes A or D).

In some embodiments, the user loses the first wager if the first subset of possible outcomes includes the first possible outcome. For example, according to the process 600, in some embodiments, it has been revealed (606) to the user, after receiving the first wager, that the first subset of possible outcomes of the set of possible outcomes does not include the true outcome. Therefore, if the first subset of possible outcomes includes the first possible outcome (on which the user placed the first wager), then, in some embodiments, the user loses the first wager. In some embodiments, a user may be, e.g., asked to go double or nothing in response to it being revealed that the first subset of possible outcomes includes the first possible outcome.

Continuing with the example, the user loses the first wager if the first subset of possible outcomes (here outcomes B and E) includes the first possible outcome "X", since the first subset of possible outcomes was revealed to the user to not include the true outcome (here outcome C).

In some embodiments, the first subset of possible outcomes does not include the first possible outcome and the second subset of possible outcomes includes the first possible outcome, such that the user is provided with the opportunity to change from the first wager to the second wager (on the second possible outcome). In some embodiments, e.g., a wagering system may never reveal a first subset of possible outcomes that includes the first possible outcome (thus a user may never automatically lose the first wager upon reveal of the first subset of possible outcomes) and thus the second subset of possible outcomes would include the first possible outcome and the user may always be provided with an opportunity to change from the first wager to the second wager (on the second possible outcome).

In some embodiments, revealing (e.g., 606 in FIG. 6) to the user that a first subset of possible outcomes of the set of possible outcomes does not include the true outcome may include developing second information such that the second information, when combined with other information, permits at least a deductive inference that the first subset of possible outcomes does not include the true outcome, and, e.g., providing the second information to the user. In other words, for example, in some embodiments, a wagering system may not tell a user outright that, e.g., the possible outcomes of the first subset of possible outcomes are not true outcome(s). Rather, in some embodiments, a wagering system may provide second information that when combined with other information leads to such a conclusion. In some embodiments, the other information may include at least a portion of the first information provided (e.g., 602 in FIG. 6) to the user.

In some embodiments, a deductive inference may include a logical inference, logical reasoning, and/or derivation of a true conclusion for two or more true premises.

In some embodiments, second information may include, e.g., that characteristic M is not a characteristic of a true outcome N, and, e.g., other information may include, e.g., that possible outcome P has characteristic M; therefore the second information combined with the other information leads to the conclusion that possible outcome P is not a true outcome N.

Continuing with the above example about the event that includes a horse race, revealing to the user that the first subset of possible outcomes (here outcomes B and E) does not include the true outcome (here outcome C) may include developing second information and other information. According to the example, the second information may be, e.g., that "no horse over 15 years old will win the horse race." According to the example, the other information may be, e.g., that horse "B" and "E" are the only horses in the race over 15 years old. Thus, according to the example, the second information, when combined with the other information, permits at least a deductive inference that possible outcomes B ("horse B wins the race") and E ("horse E wins the race") are not a true outcome.

In some embodiments, a user may be expected to place a value on changing from the first wager to the second wager. In some embodiments, a premium may be assessed to the user for changing from the first wager to the second wager. In some embodiments, a premium may be assessed to the user for failing to change from the first wager to the second wager.

In some embodiments, a user may be permitted to choose additional possible outcomes to be revealed as not being true outcome(s). In some embodiments, after the user is provided (e.g., 608 in FIG. 6) with the opportunity to change from a first wager on a first possible outcome to a second wager on a second possible outcome, the user may be provided with an opportunity to select one or more possible outcomes from the second subset of possible outcomes to be revealed to the user as not including the true outcome. In some embodiments, the more possible outcomes that are revealed as not being true outcome(s), the more a user may be, e.g., asked to pay. In some embodiments, a premium may be assessed to the user for the opportunity to select. In some embodiments, a size of the premium may depend on how many possible outcomes are included in the one or more possible outcomes to be revealed to the user as not including the true outcome.

In some embodiments, an opportunity to select may include a chance to choose, e.g., a possible outcome. In some embodiments, an opportunity to select may generally be provided to a user of a wagering system. In some embodiments, a user may be provided with information (such as, e.g., a likelihood value) along with an opportunity to select.

Continuing with the above example, a user who has been provided with the opportunity to change from a first wager on a first possible outcome "X" to a second wager on a second possible outcome "Y", may be provided with an opportunity to select one or more possible outcomes from the second subset of possible outcomes (e.g., A, C, D) to be revealed to the user as not including the true outcome. According to the example, the true outcome is C ("horse C wins the race") so only one or more of possible outcomes (and non-true outcomes) A and D may be revealed to the user.

In some embodiments, a system such as a wagering system may offer to pay a payout amount at least for successful wager on a true outcome. In some embodiments, the payout amount may be decreased, e.g., from a first round of wagering to a second round of wagering.

In some embodiments, a payout amount may include an amount to be divided at least among users placing successful wagers on what turns out to be a true outcome. In some embodiments, a payout amount may include, for example, currency (e.g., paid out to a user), wagering system credits, opportunities to wager, adjusted (e.g., reduced) prices of wagers, adjusted (e.g., reduced) premiums, adjusted (e.g., increased) opportunities to receive and/or access information, and adjusted (e.g., increased) likelihood values. In some embodiments, adjusting may include changing, altering, varying, reducing, or increasing, or any combination of these.

In some embodiments, derivative wagering may be offered by the wagering system. In some embodiments, derivative wagering may include allowing users to wager on what users (e.g., other users) may do (e.g., possible activities of users) in response to expected bias adjustments (e.g., favorite or long shot bias adjustments) by the wagering system, or, e.g., in response to information being provided, or revealed, to users. In some embodiments, one or more users may be provided with an opportunity to wager on possible activity of the user with respect to a second subset of possible outcomes. For example, in some embodiments, the one or more users may be provided with the opportunity to wager once it has been revealed (e.g., 606 in FIG. 6) to the user that a first subset of possible outcomes of the set of possible outcomes does not include the true outcome, and/or once the user has been provided (e.g., 608 in FIG. 6) with the opportunity to change from a first wager on a first possible outcome to a second wager on a second possible outcome.

In some embodiments, an underlying bias such as favorite bias or long shot bias may be exploited by, e.g., a wagering system. In some embodiments, this underlying bias may be combined with, or included as part of, embodiments in which a Monty Hall paradox or paradoxes is exploited by, e.g., a wagering system.

In some embodiments, a first set of likelihood values corresponding to the set of possible outcomes may be determined using at least the first wager. Each likelihood value of the first set of likelihood values may correspond to a respective possible outcome of the set of possible outcomes. For example, in some embodiments, the first wager received from the user may be, e.g., combined with other wagers received from, e.g., other users to determine a first set of likelihood values.

Continuing with the above example about the event that includes a horse race, the set of possible outcomes may include, e.g., possible outcomes "horse A wins the race" (outcome A), "horse B wins the race" (outcome B), "horse C wins the race" (outcome C), "horse D wins the race" (outcome D), and "horse E wins the race" (outcome E). According to the example, a first set of likelihood values corresponding to this set of possible outcomes may be determined using at least the first wager placed by the user on the first possible outcome "X". According to the example, an example first set of likelihood values (0.02 (outcome A), 0.07 (outcome B), 0.27 (outcome C), 0.51 (outcome D), and 0.13 (outcome E)) may be determined so that each likelihood value of the first set of likelihood values corresponds to a respective possible outcome of the set of possible outcomes, e.g., likelihood value 0.27 corresponds to respective possible outcome C. According to the example, another example first set of likelihood values may be (0.2 (outcome A), 0.2 (outcome B), 0.2 (outcome C), 0.2 (outcome D), and 0.2 (outcome E)).

In some embodiments, a second set of likelihood values corresponding to the second subset of possible outcomes may be determined after it is revealed to the user that the first subset of possible outcomes does not include a true outcome. Each likelihood value of the second set of likelihood values may correspond to a respective possible outcome of the second subset of possible outcomes. In some embodiments, the second set of likelihood values may be provided to the user. In some embodiments, a premium may be assessed to the user for the second set of likelihood values being provided to the user. In some embodiments, the second set of likelihood values may be determined responsively to comparing the first set of likelihood values (or one or more likelihood values of the set of likelihood values) to one or more predetermined values. In some embodiments, the one or more predetermined values may be derived from data regarding expected biases (e.g., long shot bias or favorite bias) of one or more users.

In some embodiments. the second set of likelihood values may be determined for the second subset of possible outcomes, e.g., according to the relative sizes of the likelihood values of the first set of likelihood values corresponding to the possible outcomes of the second subset of possible outcomes.

In some embodiments, one or more likelihood values corresponding to one or more possible outcomes of the second subset of possible outcomes may, e.g., be further determined based on these likelihood values by exploiting underlying expected biases of users, e.g., a long shot bias or a favorite bias.

Continuing with the example, after it is revealed (e.g., 606 in FIG. 6) to the user that the first subset of possible outcomes (here outcomes B and E) do not include a true outcome (here outcome C), a second set of likelihood values corresponding to the second subset of possible outcomes (here outcomes A, C, and D) may be determined. For example, a second set of likelihood values may be determined that, e.g., takes into account that it was revealed to the user that outcomes B and E (from the first subset of possible outcomes) do not include a true outcome. According to the example, such a second set of likelihood values may be determined for the remaining outcomes (here outcomes A, C, and D), e.g., according to the relative sizes of the likelihood values of the first set of likelihood values for those remaining outcomes. For example, if the likelihood values from the first set of likelihood values for outcomes A, C, and D were (0.02 (outcome A), 0.27 (outcome C), and 0.51 (outcome D)), then a second set of likelihood values determined according to the relative sizes for the outcomes A, C, and D would be (0.025[=0.02/(0.02+0.27+0.51)], 0.3375[=0.27/0.8], and 0.6375[=0.51/0.8]). As another example, if the likelihood values from the first set of likelihood values for outcomes A, C, and D were (0.2 (outcome A), 0.2 (outcome C), and 0.2 (outcome D), then a second set of likelihood values determined according to the relative sizes for these outcomes would be (0.33, 0.33, and 0.33).

In some embodiments, the second set of likelihood values may be determined responsively to comparing the first set of likelihood values (or one or more likelihood values of the set of likelihood values) (e.g., (0.02 (outcome A), 0.27 (outcome C), and 0.51 (outcome D))) to one or more predetermined values, e.g., a threshold value of, e.g., 5 percent. According to the example, a likelihood value of 0.02 for outcome A is less than a threshold value of 5 percent (0.05) so a likelihood value for outcome A may be determined that is, e.g., greater than the likelihood value of 0.02 and less than or equal to the threshold value of 0.05.

The Monty Hall Paradox: Revealing Potentially Less Information: Example Embodiments In some embodiments, rather than revealing to a user that a first subset of possible outcomes of a set of possible outcomes of an event does not include a true outcome, potentially less information may be revealed to the user. In some embodiments, for example, it may be revealed to a user that a first subset of possible outcomes of a set of possible outcomes is unlikely to include a true outcome, is at least substantially unlikely to include a true outcome, and so on.

Failure to, e.g., reveal all information to the user may vary the Monty Hall paradox somewhat because in some situations (depending on how much information is revealed to a user, e.g., how unlikely one or more possible outcomes are to include a true outcome) it may not be to a user's advantage to switch from, e.g., a wager on one possible outcome to a wager on another possible outcome.

In some embodiments, a wagering system may not 100 percent reveal to a user that a first subset of possible outcomes of a set of possible outcomes of an event does not include a true outcome, but may effectively reveal this information by revealing to a user that the first subset of possible outcomes is, e.g., 90, 95, or 99 percent likely to not include a true outcome—in which event it may generally be nearly equally as advantageous for a user to change from a wager on one possible outcome to a wager on another possible outcome.

Figure 7:
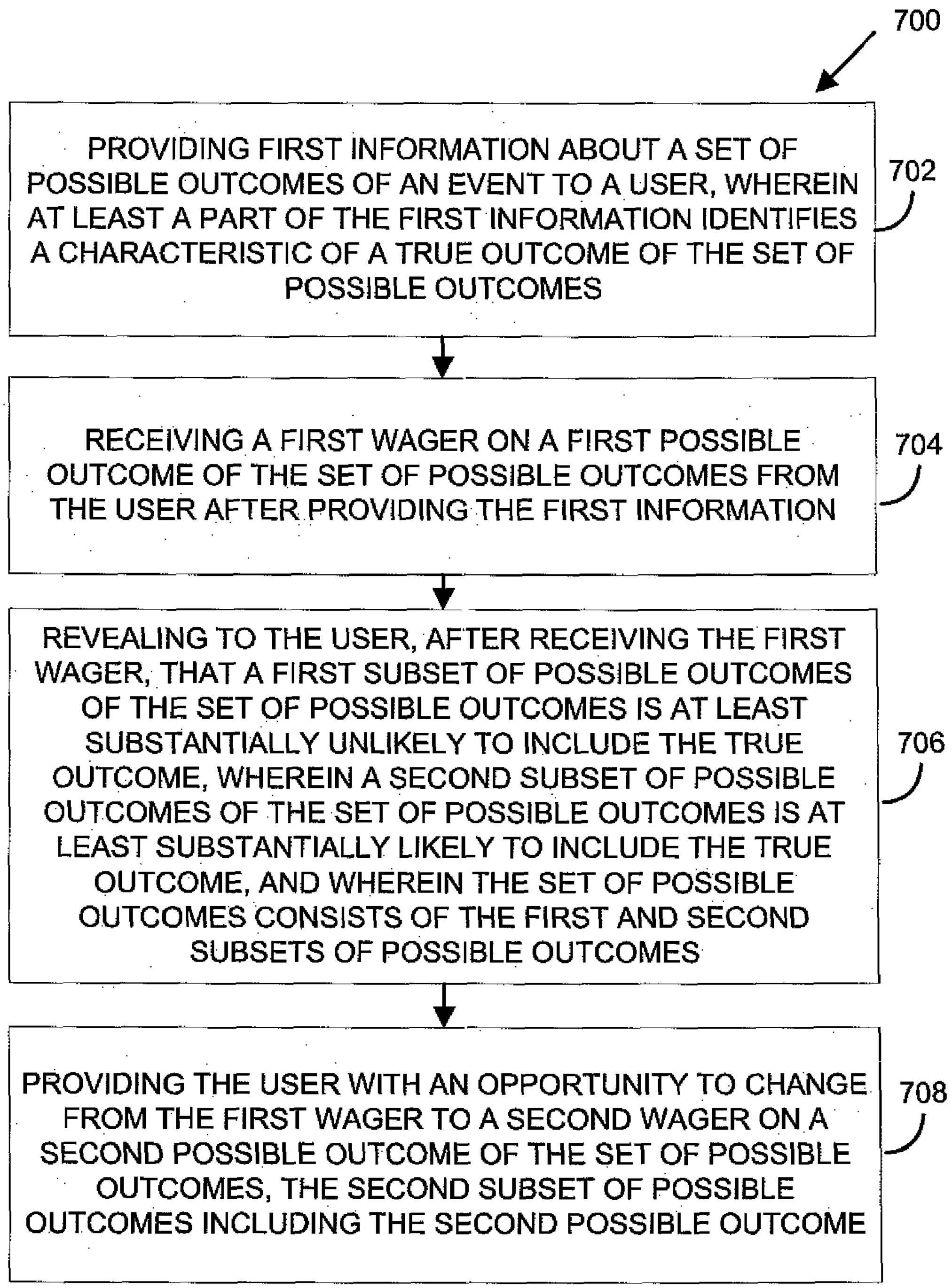

FIG. 7 illustrates an example process 700 that may be implemented on the example apparatus 100 of FIG. 1. For example, in some embodiments, one or more servers 102 of the plurality of servers 102-1 to 102-M and/or one or more devices 114 of the plurality of devices 114-1 to 114-P may perform one or more steps of the process 700.

As in the example process 600 of FIG. 6, according to the process 700, in some embodiments, first information about a set of possible outcomes of an event is provided (702) to a user, and a first wager is received (704) on a first possible outcome of the set of possible outcomes. At least a part of the first information may identify a characteristic of a true outcome of the set of possible outcomes. The first wager may be received from the user after the first information is provided to the user. The first wager may be placed by the users following provision of the first information.

According to the process 700, in some embodiments, it is revealed (706) to the user, after receiving the first wager, that a first subset of possible outcomes of the set of possible outcomes is at least substantially unlikely to include the true outcome. In some embodiments, a second subset of possible outcomes of the set of possible outcomes is at least substantially likely to include the true outcome. In some embodiments, the set of possible outcomes consists of the first and second subsets of possible outcomes. In some embodiments, the set of possible outcomes may include other possible outcomes than the first and second subsets of possible outcomes.

In some embodiments, substantially unlikely may include being significantly unlikely. In some embodiments, substantially unlikely may include, e.g., a less than 25 percent likelihood. In some embodiments, substantially unlikely may include, e.g., a less than 5, 10, or 15 percent likelihood. In some embodiments, a less than 50 percent likelihood may be considered, e.g., likely but not substantially likely. In some embodiments, substantially likely may include being significantly likely. In some embodiments, substantially likely may include, e.g., a greater than 75 percent likelihood. In some embodiments, substantially likely may include, e.g., a greater than 85, 90, or 95 percent likelihood. In some embodiments, a greater than 50 percent likelihood may be considered, e.g., likely but not substantially likely. In some embodiments, at least substantially unlikely may include a 0 percent likelihood, while in some embodiments, at least substantially likely may include a 100 percent likelihood.

Continuing with the above example of the event that includes a horse race, it is revealed to the user that a first subset of possible outcomes (e.g., here outcome B ("horse B wins the race") and outcome E ("horse E wins the race")) is substantially unlikely to include (as opposed to "does not include") the true outcome. According to the example (since the set of possible outcomes consists of the first and second subsets of possible outcomes), the second subset of possible outcomes (here outcomes A, C, D is substantially likely to include (rather than "includes") the true outcome. For example, assume that outcome C is the true outcome 95 percent of the time and that outcome B is the true outcome 5 percent of the time. In such a case, 19 times out of 20, the true outcome will not be in the first subset of possible outcomes, but the true outcome will be in the second subset of possible outcomes. As another example, assume that (1) outcome A is the true outcome 30 percent of the time, outcome C is the true outcome 40 percent of the time, and outcome D is the true outcome 20 percent of the time, and (2) outcome B is the true outcome 5 percent of the time and outcome E is the true outcome 5 percent of the time. In such a case, 90 (30+40+20) percent of the time, the first subset of possible outcomes (here outcomes B and E) does not include the true outcome (so that the first subset is substantially unlikely to include the true outcome) but the true outcome will be in the second subset of possible outcomes (so that the second subset is substantially likely to include the true outcome). Ten percent (5+5) of the time, the first subset of possible outcomes will include the true outcome, and the second subset will not.

According to the process 700, in some embodiments, the user is provided (708) with an opportunity to change from the first wager to a second wager on a second possible outcome of the set of possible outcomes. In some embodiments, the second subset of possible outcomes includes the second possible outcome.

In some embodiments, revealing (706) to the user that the first subset of possible outcomes is at least substantially unlikely to include the true outcome, means that a first wager received (704) on a first possible outcome of the set of possible outcomes is not necessarily a losing wager even if the first possible outcome is included in the first subset of possible outcomes because there is at least a possibility that the true outcome is in the first subset of possible outcomes. The user may be extremely likely to lose with a first wager on a first possible outcome that is included in the first subset of possible outcomes, but the user is not assured of losing the first wager. Thus, in some embodiments, the user may always be provided with an opportunity to change from the first wager to the second wager, since the user may not definitely have lost the first wager. This is opposed to, e.g., a situation in which it was revealed (e.g., 606 in FIG. 6) to a user that a first subset of possible outcomes did not include a true outcome. In such a situation, a first wager on a first possible outcome may be a losing wager if the first possible outcome is included in the first subset of possible outcomes (and thus is not a true outcome). In some embodiments, providing (e.g., 708 in FIG. 7) the opportunity to change from a first wager to a second wager is not contingent on whether the second subset of possible outcomes includes the first possible outcome, the opportunity to change may always be provided.

A user who placed a first wager on a first possible outcome may value an opportunity to change from the first wager to a second wager on a second possible outcome, particularly if the user is aware of a proper course to take when faced with a Monty Hall paradox. Thus, in some embodiments, a user may be assessed a premium for changing from a first wager on a first possible outcome to a second wager on a second possible outcome and, e.g., a size of the premium assessed may differ depending on the situation.

In some embodiments, if the second subset of possible outcomes includes the first possible outcome, a premium is assessed to the user for changing from the first wager on the first possible outcome to the second wager on the second possible outcome. According to the process 700, in some embodiments, a second subset of possible outcomes of the set of possible outcomes is at least substantially likely to include the true outcome. Thus, if the first possible outcome is included in the second subset of possible outcomes, then a knowledgeable user may be aware that it may generally be statistically to the user's advantage to change the first wager to the second wager and a user may be generally be willing to be assessed a premium to do so.

In some embodiments, if the first subset of possible outcomes includes the first possible outcome, a premium is assessed to the user for changing from the first wager to the second wager. According to the process 700, in some embodiments, it is revealed (706) to the user, after receiving the first wager, that a first subset of possible outcomes of the set of possible outcomes is at least substantially unlikely to include the true outcome. Thus, if the first possible outcome is included in the first subset of possible outcomes, then the first possible outcome is at least substantially unlikely to be the true outcome and a user, e.g., to avoid losing the first wager, may generally be willing to be assessed a premium to change the first wager to the second wager.

In some embodiments, a different premium may be assessed to the user for changing from the first wager to the second wager depending on whether the second subset of possible outcomes includes the first possible outcome or the first subset of possible outcomes includes a first possible outcome. In some embodiments, a user may generally be likely to value changing from a first wager to a second wager in the latter situation more than in the former situation, since in the latter situation, the user may generally be far more likely to lose than in the former situation.

In some embodiments, revealing (e.g., 606 in FIG. 6) to the user, after receiving the first wager, that the first subset of possible outcomes of the set of possible outcomes is at least substantially unlikely to include the true outcome may include revealing to the user, after receiving the first wager, that the first subset of possible outcomes of the set of possible outcomes does not include the true outcome. Thus, in some embodiments, at least substantially unlikely may include a 0 percent likelihood.

In some embodiments, the second subset of possible outcomes of the set of possible outcomes being at least substantially likely to include the true outcome may include the second subset of possible outcomes of the set of possible outcomes including the true outcome. Thus, in some embodiments, at least substantially likely may include a 100 percent likelihood.

Poker Wagering: Example Embodiments

Referring to FIGS. 8-11, they are diagrams of example screenshots of an example poker wagering game according to some embodiments. The example poker wagering game of FIGS. 8-11 may be implemented on the example apparatus 100 of FIG. 1. For example, in some embodiments, one or more servers 102 of the plurality of servers 102-1 to 102-M and/or one or more devices 114 of the plurality of devices 114-1 to 114-P may implement the example poker wagering game, while, e.g., one or more device 114 may provide a user interface similar to that shown in the example screenshots of FIGS. 8-11.

Figure 8:
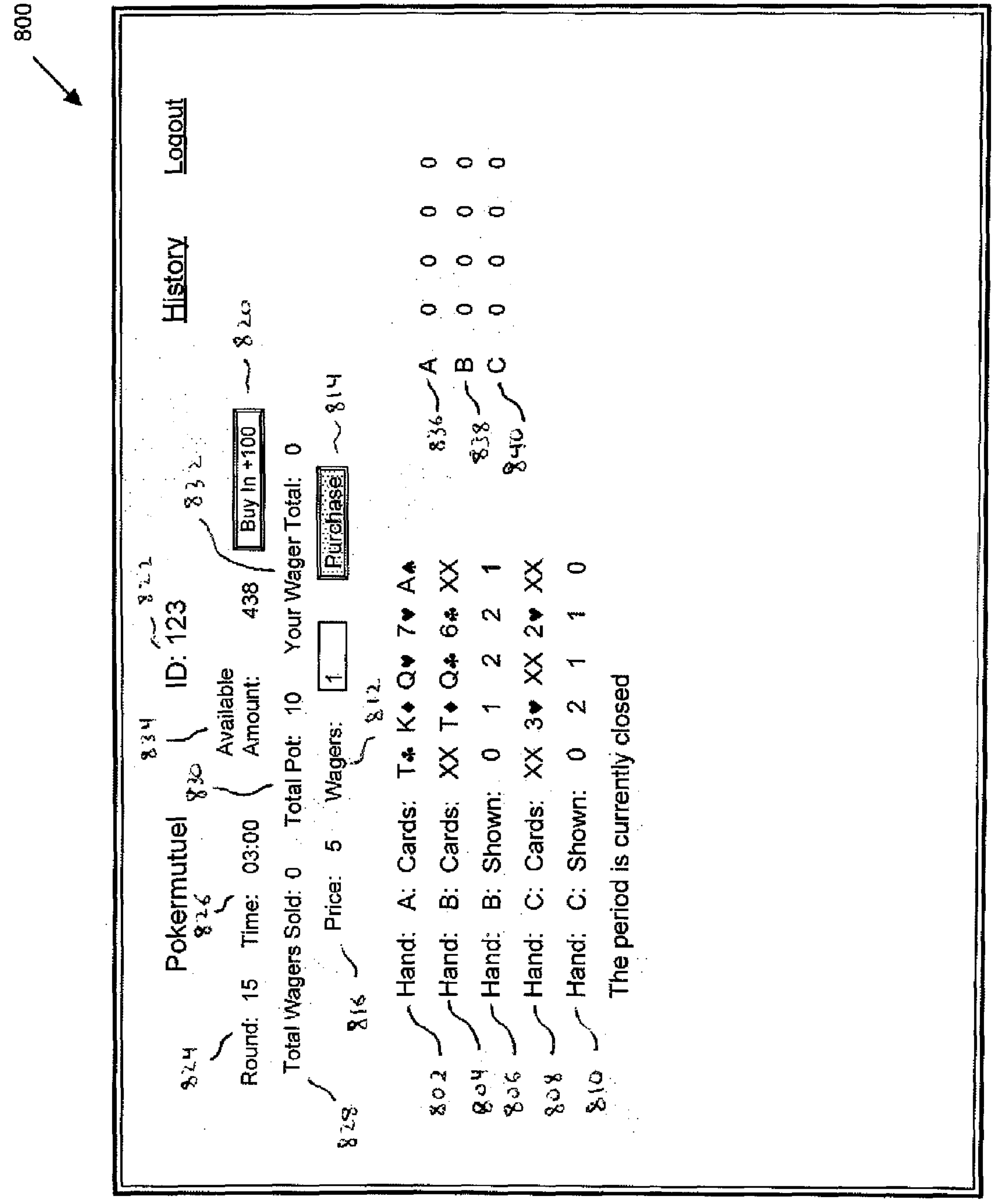
FIGS. 8-11 are diagrams of example screenshots according to some embodiments.

Referring to FIG. 8, an example screenshot 800 shows a user interface for a poker wagering environment according to some embodiments. Hands of cards A, B, and C are displayed at the lower right of the screenshot. Each hand of cards is a five card Poker hand. In some embodiments, more than three hands of cards are displayed. In some embodiments, a hand of cards may include less than, or more than, five cards.

It will be understood that displaying a "card" may refer to, e.g., a depicting a face of a playing card or (as in the case of FIGS. 8-11) to showing symbols (e.g., here rank (or number) and suit) that uniquely identify a particular card.

The screenshot 800 is shown to a user (e.g., "user A") who is viewing the hands of cards A, B, and C and who may be placing wagers on which hand of cards is a winning hand. In some embodiments, users place wagers on which of the hands of cards (here A, B, and C) is a winning hand, by, e.g., purchasing wagers.

In some embodiments, a user may login to play the poker wagering game, by entering, a username (e.g., an e-mail address) and a password. A user may be assigned a user ID and a round of wagering may begin. In screenshot 800, for example, the user's ID is 123 ("ID: 123" 822) the round is 15 ("Round: 15" 824) and three minutes are remaining in the round of wagering ("Time: 3:00" 826). In some embodiments, at the beginning of a round of wagering, and prior to any hands being revealed, users buy in by paying an ante to create a common pot to be distributed to the winners at the end of that round, when the winning hand is revealed. For example, one the screenshot 800, the user A may click a "Buy In" button 820 to add, e.g., 100 units (e.g., $100 or 100 credits) to the common pot. Users may add to the common pot by purchasing wagers. In some embodiments, users who placed wagers on the winning hand, receive payout amounts from the common pot, after, e.g., an amount is subtracted for the wagering system. On the example screenshot 800, the user A may purchase wagers at a price 816 (here 5 units per wager) by entering the desired number of wagers (here 1) in a text box 812 and by clicking a "purchase" button 814. In some embodiments, the prices 816 of wagers may change during a round of wagering. For example, a price 816 of a wager may start out at a low value at the beginning of a round of wagering and then increase (e.g., rapidly) until the end of the round. In some embodiments, users may place wagers on any hand to win (and may place wagers on every hand to win, if so desired). The example screenshot 800 shows the total number of wagers sold in the round to all users ("Total Wagers Sold: 0" 828), the total size of the common pot ("Total Pot: 10" 830), the current available amount (e.g., of money or credits) that the user A has made available for wagering ("Available Amount: 438" 834), and the total amount the user A has wagered so far ("Your Wager Total: 0" 832).

In some embodiments, all cards of one (or more) of the Poker hands are displayed to all users playing the poker wagering game. These one or more hands may be referred to as "public hands", because, in some embodiments, information identifying all cards of the one or more hands is provided to all users of the poker wagering game.

In the example screenshot 800, only one "public hand" is shown, the hand of cards A ("Hand A"). A first line 802 of information for Hand A identifies the suits and ranks (or numbers) of the cards in Hand A, here the ten of clubs ("T♣"), the king of diamonds ("K♦"), the queen of hearts ("Q♥"), the seven of hearts ("7♥"), and the ace of spades ("A♠"). In some embodiments, all users see the cards of the public hand. Hand A.

In some embodiments, one hand of cards may be added in which no cards of the hand of cards are shown to any user playing the poker wagering game.

In some embodiments, one or more cards of one or more other Poker hands may be displayed to different users of the poker wagering game. For example, for Poker hands other than the public hand(s), different cards of the hands may be revealed to different users, so that, e.g., at least two users may see different cards for the same Poker hand. In some embodiments, every user may see one or more cards from every hand, but no user may see all cards from any hand, except the public hand(s). In some embodiments, the cards that are displayed for Poker hands other than the public hand(s) may be, e.g., randomly selected.

In the example screenshot 800, a first line 804 of information for Hand B identifies the suits and ranks (or numbers) for those cards of Hand B that are shown to user A (here the ten of diamonds ("T♦"), the queen of clubs ("Q♣"), and the six of clubs ("6♣")), and displays an "XX" for the two cards (here the first and fifth cards) of Hand B that are not (e.g., so far) shown the user A. A second line 806 of information for Hand B identifies, for each card of the Hand B, how many users have been shown that particular card (including user A). For example, the queen of clubs (Q♣) has been shown to two users (including user A), the ten of diamonds (T♦) has been shown to one user (here, user A), and the fifth card ("XX") of Hand B has been shown to one user (but not user A). The first card ("XX") of Hand B has (e.g., so far) not been shown to any users.

Similarly, a first line 808 of information for Hand C identifies the suits and ranks (or numbers) for those cards of Hand C that are shown to user A (here the 3 of hearts ("3♥") and the 2 of hearts ("2♥")) and displays an "XX" for the three cards (here the first, third, and fifth cards) of Hand C that are not (e.g., so far) shown to the user A. A second line 810 of information for Hand C identifies, for each card of the Hand C, how may users have been shown that particular card (including user A). For example, the 3 of hearts (3♥) has been shown to 2 users (including user A), the two of hearts (2♥) has been shown to one user (here, user A), and the third card ("XX") of Hand C has been shown to one user (but not user A), The first and fifth cards ("XX") of Hand B have (e.g., so far) not been shown to any users.

Information on wagers placed by users is presented in the three lines 836, 838, 840 (with each line corresponding to a respective Hand A, B, and C), shown in the middle of the screenshot 800. No wagers have been placed at this point in the round of wagering, so all values are zero.

In some embodiments, e.g., the identification of cards of Poker hands, the numbers of users who have been shown different cards of Poker hands, and information regarding wagers placed by other users, may allow a user to carefully analyze the hands, what other users are being shown, and what other users are wagering. The information provided to a user may allow the user to strategize in purchasing wagers, to make assessments of which hand is the winning hand, and to determine through observation of the wagering of other users which hand(s) the other users might think is the winning hand. The information provided to a user may allow a user to employ bluffing strategies, for example, a user may place wagers on a hand that the user does not think is the winning hand (e.g., early in a round of wagering) in order to influence the wagering of other users, e.g., to cause users to wager on hands other than the winning hand.

In some embodiments, information regarding past performance of users in e.g., the poker wagering game may be tracked, e.g., on a user by user basis. In some embodiments, information regarding past performance of users may be provided to other users. For example, a user playing the poker wagering game may have information about the past performance of other users, e.g., currently playing the wagering game. A user may purposely lose rounds of wagering to influence information regarding the user's past performance so as to, e.g., influence the wagering of other users.

In some embodiments, the status of all sales of wagers to users may be updated in real time.

In some embodiments, a user may be permitted to pay for additional information, such as additional cards of one or more hands being displayed to the user, or which cards have been shown to which other user, or which users have placed which wagers.

In some embodiments, users may be permitted to select which cards they see in particular hands. In some embodiments, cards may be displayed to users in a sequence so that a user A, by watching the information that identifies for each card of a particular hand, how may users have been shown that particular card, the user A may know what cards have been shown to the users before the user A in the sequence and may observe wagering behavior of these users.

Figure 9:
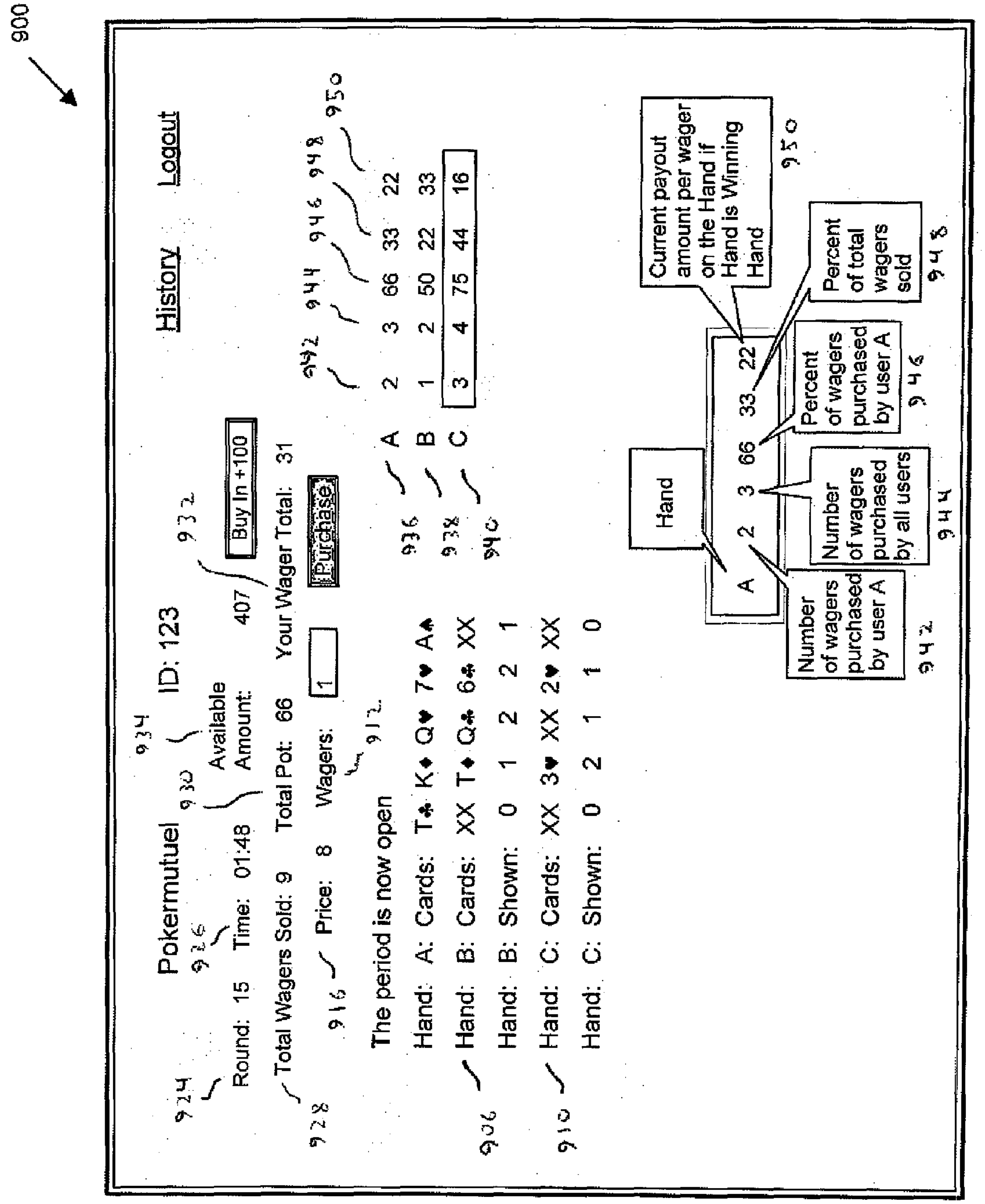

Referring to FIG. 9, an example screenshot 900 shows the user interface for a poker wagering environment according to some embodiments.

The example screenshot 900 shows that at this point in the round of wagering ("Round: 15" 924) wagering is still open, the remaining time in the round of wagering is 1:48 (926), the total number of wagers sold in the round to all users is 9 (928), the total size of the common pot has increased to 66 units (930), the current available amount (e.g., of money or credits) that the user A has made available for wagering has decreased to 407 units (e.g., $407 or 407 credits) (934), and the total amount the user A has wagered so far is 31 units (e.g., $31 or 31 credits) (932). The current price of a wager has increased as the round of wagering has progressed from 5 units to 8 units (916).

The hands displayed in the lower right corner of the example screenshot 900 have not changed, i.e., no additional cards of Hands B or C have been displayed. The lines 906, 910 of information for respective Hands B and C have not changed, so the numbers of users that have been shown particular cards of the Hands B and C have not changed since FIG. 8.

Information on wagers placed by users is presented in the three lines 936, 938, 940 (with each line corresponding to a respective Hand A, B, and C), shown in the middle of the screenshot 900. Each line 936, 938, 940 includes five values corresponding to the Hand. A first column 942 identifies the number of wagers on a Hand purchased by the user A, a second column 944 identifies the number of wagers on a Hand purchased by all users, a third column 946 identifies the percent of wagers on a Hand purchased by the user A, a fourth column 948 identifies the percent of total wagers on all Hands sold to all users that are wagers on the Hand, and a fifth column 950 identifies the current payout amount per wager on the Hand if the Hand is a winning hand.

For example, for the Hand A (line 936), the user A purchased two wagers on Hand A, all users purchased three wagers on Hand A, 66 percent (⅔) of the wager on Hand A have been purchased by the user A, 33 percent (⅓) of all wagers sold to users are wagers on Hand A, and the current payout amount per wager on Hand A if Hand A is a winning hand is 22 units (assuming the entire current pot of 66 is divided among the winning wagers).

In some embodiments, the user may click on one of the lines 936, 938, 940 to select a particular Hand on which to purchase a wager. On the screenshot 900, Hand C is selected and highlighted. and the user A may purchase wagers at the price 916 (here 8 units per wager) by entering the desired number of wagers (here 1) in the text box 912 and by clicking the "purchase" button 914.

Figure 10:
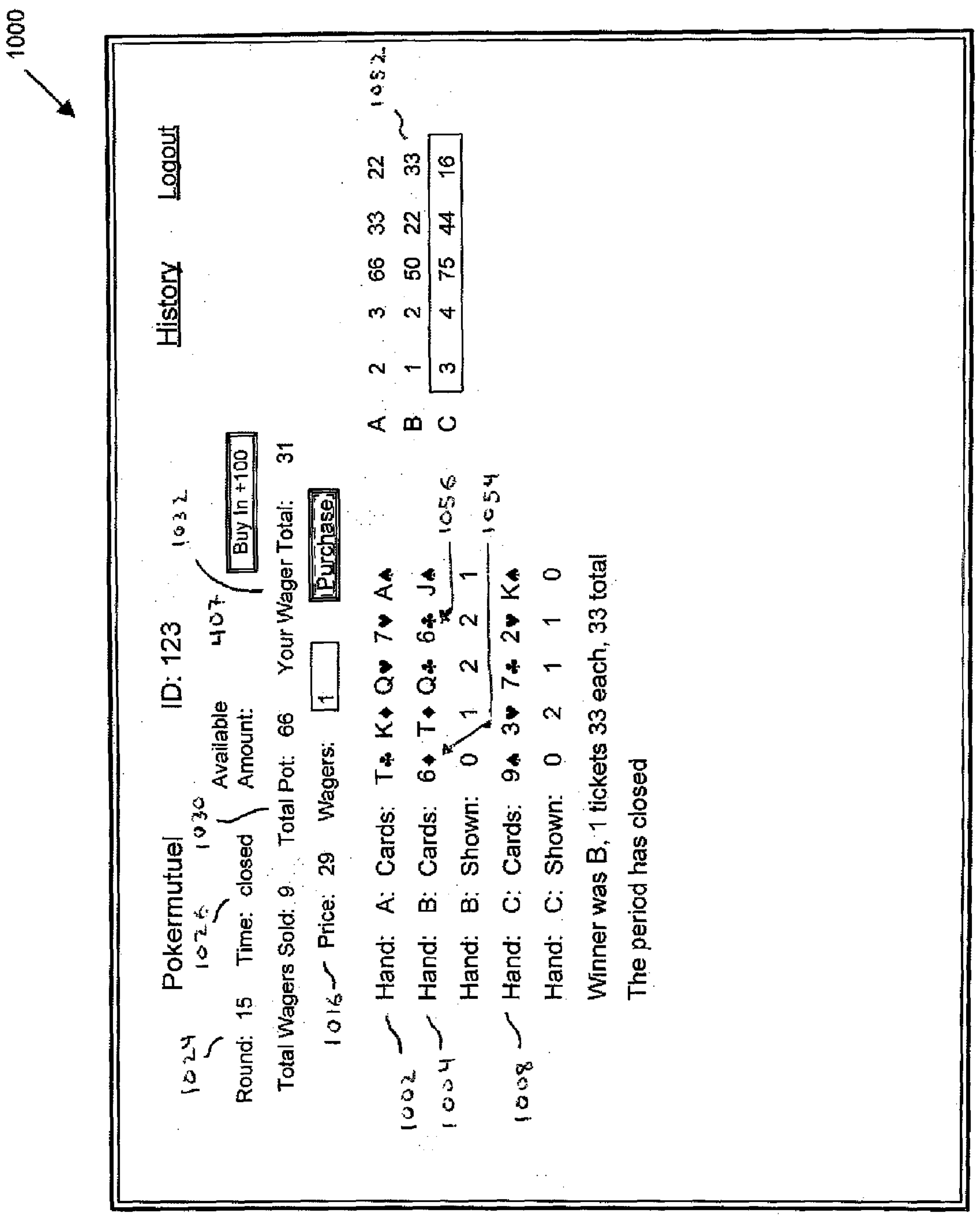

Referring to FIG. 10, an example screenshot 1000 shows the user interface for a poker wagering environment according to some embodiments.

The example screenshot 1000 shows that at this point in the round of wagering ("Round: 15" 1024), the round of wagering has ended, and wagering is closed ("Time: Closed" 1026), and the current price of a wager has increased as the round of wagering has progressed from 5 units (816 in FIG. 8) to 29 units (1016).

Since the round of wagering has ended, and wagering is closed, the cards of all the Hands A, B, and C are identified (lines 1002, 1004, 1008) so that any cards that were not previously shown to the user A are now displayed (and any cards not already shown to the other user(s) are shown to those user(s)). The winning hand is Hand B, which includes one pair of sixes, the six of clubs ("6♣") (1054) and the (now revealed) six of diamonds ("6♦") (1056).

Two wagers were purchased on the Hand B, one by the user A, and one by another user, so the two users split the total common pot of 66 units (1030) and won 33 units (e.g., $33 or 33 credits) (1052) each, assuming no amount of the pot is reserved for, e.g., the wagering system. User A wagered a total amount of 31 units ("Your Wager Total: 31" 1032), so user A had a net gain of 2 units in this round.

Figure 11:
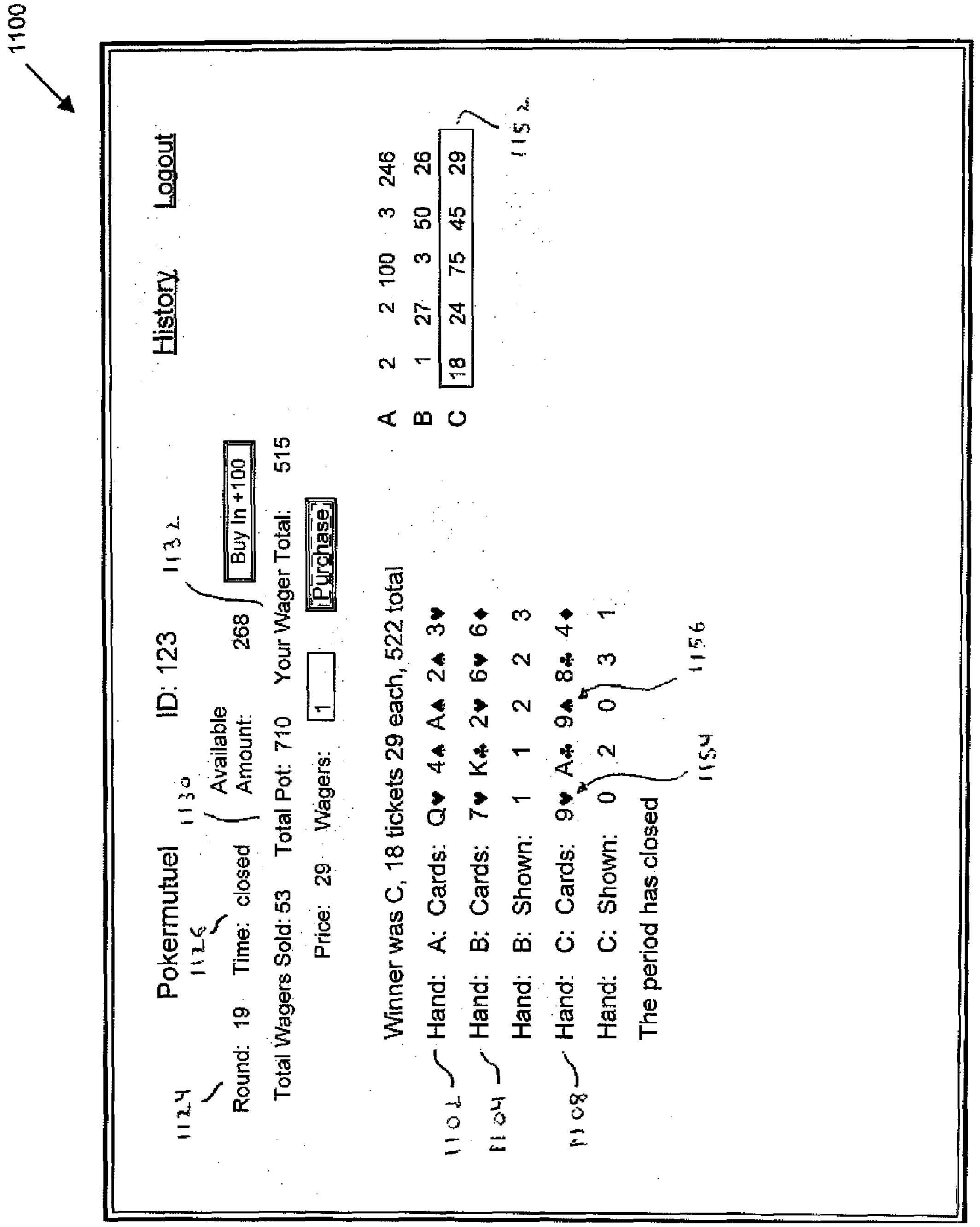

Referring to FIG. 11, an example screenshot 1100 shows the user interface for a poker wagering environment according to some embodiments.

The example screenshot 1100 shows another, later round of wagering ("Round: 19" 1124), in which the round of wagering has ended, and wagering is closed ("Time: Closed" 1126). There is a total common pot of 710 units (e.g., $710 or 710 credits) (1130).

Since the round of wagering has ended, and wagering is closed, the cards of all the Hands A, B, and C are identified (lines 1102, 1104, 1108) so that any cards that were not previously shown to the user A are now displayed (and any cards not already shown to the other user(s) are shown to those user(s)). The winning hand is Hand C, which includes one pair of nines, the nine of hearts ("9♥") (1154) and the nine of spades ("9♠") (1156), where both cards were not previously shown to any users. Hand C beats Hand B which has one pair of sixes.

The screenshot 1100 shows that 24 wagers were purchased on the Hand C, with 18 wagers on Hand C being purchased by the user A. The common pot of 710 units (1130) is divided among the 24 wagers giving a payout amount of 29 units (1152) per wager, assuming no amount of the pot is reserved for, e.g., the wagering system. Thus, user A wins 522 units (29 units*18 wagers). User A wagered a total amount of 515 units ("Your Wager Total: 515" 1132), so user A had a net gain of 7 units in this round.

In some embodiments, the common pot of the poker wagering game may be increased by a random amount during, e.g., each round of wagering, so that an additional element of uncertainty may be added to the wagering. For example, during some rounds, nothing may be added to the common pot. In other rounds, a large number of units (e.g., randomly determined) may be added to the pot.

Although FIGS. 8-11 show example embodiments of a traditional poker wagering game (e.g., in which five card poker hands are compared to one another and the highest ranked card is the winning card). and example embodiments of the game are described above, e.g., with reference to FIGS. 8-11, the concepts may be applied to other games and kinds of poker such as seven card stud, Texas Hold'em, and so on.

Various concepts of the poker wagering game may be applied to other events or games in which, e.g., pari-mutuel wagering is used. For example, concepts may be applied to an event such as a horse race, a sporting event, and so on. For example, wagers may be sold in one or more rounds of wagering during the event and may prices of wagers may increase throughout the event.

Although the example embodiments of the poker wagering game described above use pari-mutuel wagering, the game may be structured as a non-pari-mutuel game. For example, in some embodiments, a poker wagering game may be structured as a market in which a user initially received shares on all hands of cards, but then could buy and sell the shares as cards are revealed.

In other embodiments, the poker wagering game could involve wagering on events, e.g., live events. For example, an event could be a real live poker game played by real players, with the live poker game being displayed on a screen. In some embodiments, users could purchase wagers on which player in the poker game has the winning hand and the users could observe the betting of the real players in the real live poker game while placing their wagers. In some embodiments, certain cards of certain hands would be shown to the users. In some embodiments, different users may be shown different information, e.g., one user may see two cards of live player A's hand, while another user may see three cards of live player B's hand, and so on.

Figure 12:
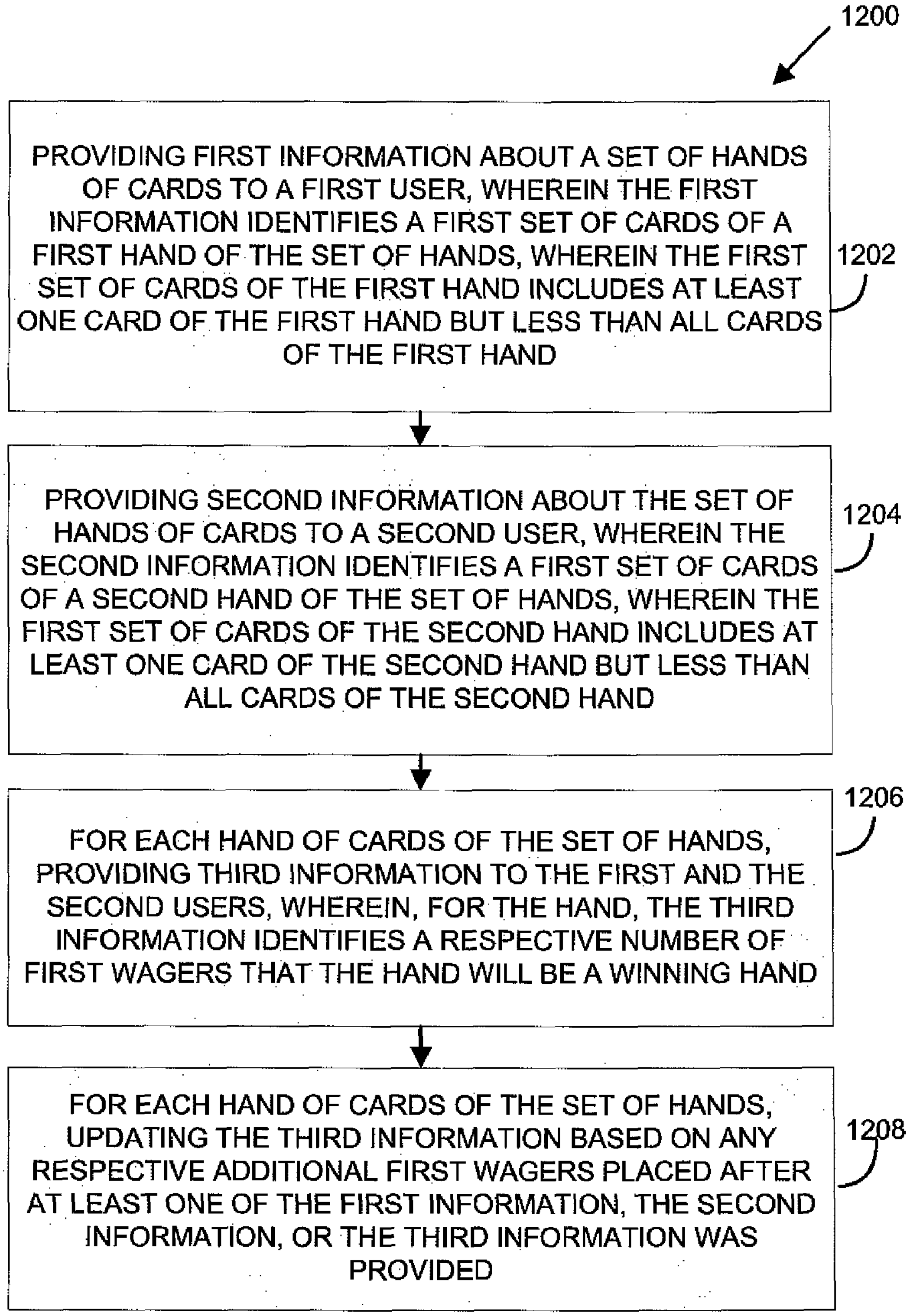
FIGS. 12-13 are flow diagrams of example processes according to some embodiments.

FIG. 12 illustrates an example process 1200 that may be implemented on the example apparatus 100 of FIG. 1. For example, in some embodiments, one or more servers 102 of the plurality of servers 102-1 to 102-M and/or one or more devices 114 of the plurality of devices 114-1 to 114-P may perform one or more steps of the process 1200.

According to the process 1200, in some embodiments, first information about a set of hands of cards is provided (1202) to a first user. The first information may identify a first set of cards of a first hand of the set of hands. The first set of cards of the first hand includes at least one card of the first hand but less than all cards of the first hand.

In some embodiments, a hand, or hand of cards, includes one or more cards, or includes of visual representation of one or more cards. For example, a poker hand may consist of 5 cards.

In some embodiments, identifying a card (e.g., of a hand) to, e.g., a user, may include showing a physical card to a user, displaying a visual representation of a card or characteristics of a card (such as at least one of a card's number (or rank, e.g., tens, kings, etc.), a card's suit (spades, hearts, etc.), a card's color (e.g., red, black), on a display such as a user interface, or otherwise revealing a card or characteristic(s) of a card to a user. Symbols may be used to identify a card, or characteristics of a card, e.g., "3♥" may generally identify the 3 of hearts, while "10♠" or "T♠" may generally identify the 10 of spades.

In some embodiments, all cards of a hand of cards means all of the cards making up the hand of cards, or all of the cards that the hand of cards consists of. In some embodiments, a set of cards of a hand of cards may include one or more of the cards making up the hand of cards. In some embodiments, a set of cards of a hand of cards may include one card, two cards, etc., or, e.g., all of cards of the hand of cards.

In some embodiments, a winning hand (or winning hand of cards) is a hand of cards that wins in a particular event. In some embodiments, a winning hand may be a true outcome of an event. For example, in Poker, a winning hand may include a hand that outranks all other hands.

In some embodiments, cards identified in a particular hand may be, e.g., randomly determined. For example, in some embodiments, the first set of cards of the first hand (identified by first information provided to the first user) may be randomly determined. In some embodiments, cards identified in a particular hand may be, e.g., determined based on biases, e.g., on data regarding biases. For example, in some embodiments, the first set of cards of the first hand (identified by first information provided to the first user) may be determined using data regarding biases of at least one of the first user, or of other users. For example, a user (e.g., of a particular demographic group) may be more likely (based on data regarding biases) to place a wager on a particular hand to be the winning hand when the 10 of diamonds is identified as being part of the particular hand.

According to the process 1200, in some embodiments, second information about the set of hands of cards is provided (1204) to a second user. The second information may identify a first set of cards of a second hand of the set of hands. The first set of cards of the second hand includes at least one card of the second hand but less than all cards of the second hand.

In some embodiments, the first and the second hands of cards each include the same number of cards, with every card of the first hand being a different card than every card of the second hand. In some embodiments, the first and the second hands of cards respectively include first and second poker hands. In some embodiments, the first and second poker hands each include 5 cards, with every card of the 5 cards of the first hand being a different card than every card of the 5 cards of the second hand.

According to the process 1200, in some embodiments, for each hand of cards of the set of hands, third information is provided (1206) to the first and the second users. For the hand, the third information identifies a respective number of first wagers that the hand will be a winning hand.

According to the process 1200, in some embodiments, for each hand of cards of the set of hands, the third information is updated (1208) based on any respective additional first wagers placed after at least one of the first information, the second information, or the third information was provided.

In some embodiments, wagers on whether particular hands of cards of the set of hands are the winning hand may be generated by, e.g., a wagering system. Generation of wagers is described in more detail above. In some embodiments, for example, a wagering system may create an appearance of a wagering environment in which a plurality of users are participating and wagering, when in fact the wagering system is generating part of, or even nearly all of, the wagers. In some embodiments, for example, a wagering system may want to promote a game or event, such as, e.g., a poker wagering game, to users and thus may, e.g., generate wagers to create an appearance of wagering by users so that new users may be attracted to the game or event and may keep wagering on possible outcomes of a game or an event. A user may be aware that she is, e.g., "playing against a computer", or might be completely unaware and might believe that the other wagers originated from users and were not, e.g., generated by the wagering system.

In some embodiments, at least some first wagers of the first wagers are generated using at least one of computer programs or parameters input by one or more administrators, e.g., of a wagering system.

In some embodiments, pseudo-wagers may be generated from internal processing. In some embodiments, the pseudo-wagers may be used to supplement actual wagering by at least the first and the second users to create an appearance of wagering activity in the third information at least somewhat at variance with the actual wagering.

In some embodiments, different information may be provided to different users on the same hand of cards, so that, e.g., for a given hand of cards, one user may not (or may) be shown the same cards of the hand as those cards shown to another user.

In some embodiments, the first information provided to the first user may also identify a second set of cards of the second hand. In some embodiments, the second set of cards of the second hand may include at least one card that is different from the first set of cards of the second hand (identified by the second information provided to the second user).

In some embodiments, the second information provided to the second user may also identify a second set of cards of the first hand. In some embodiments, the second set of cards of the first hand may include at least one card that is different from the first set of cards of the first hand (identified by the first information provided to first user).

In some embodiments, fourth information (e.g., apart from the second information) may be provided that identifies a second set of cards of the first hand to at least one or the second user or a third user. The second set of cards of the first hand may include at least one card that is different from the first set of cards of the first hand.

In some embodiments, for each wager of the first wagers and the additional first wagers, a premium may be assessed for the wager, e.g., during a round of wagering. In some embodiments, for each wager of the first wagers and the additional first wagers, the premium assessed for the wager may increase during the round of wagering, as, e.g., more information (e.g., first, second, and/or third information) is provided and/or updated and provided.

In some embodiments, fourth information is provided to the first user and the second user. The fourth information may identify all cards of a third hand of the set of hands. In some embodiments, providing (e.g., 1202 in FIG. 12) the first information to the first user may include providing the first information about the set of hands of cards to the first user. The first information may identify all cards of a third hand of the set of hands. In some embodiments, providing (e.g., 1204 in FIG. 12) the second information to the second user may include providing the second information about the set of hands of cards to the second user. The second information may identify all cards of a third hand of the set of hands. In some embodiments, when all cards of a hand are identified to, e.g., all users who are placing wagers on a particular event, the hand is referred to as a public hand.

In some embodiments, information may be provided to a user that includes likelihood values (e.g., probabilities) regarding whether a particular hand or hands of cards (where not all of the cards have been identified to the user) beats (e.g., is ranked higher than) a hand of cards in which all of the cards in the hand have been identified to the user (and other users, e.g., all other users), e.g., a public hand. For example, two out of five cards of a particular hand may be identified to a user along with, e.g., a probability that the particular hand beats the public hand, with the probability being a conditional probability based on the two cards that have been revealed. That is, the probability that the particular hand will beat the public hand, given that the particular hand will include these two cards.

In some embodiments, a user may place wagers on whether a particular hand or hands of cards (where not all of the cards have been identified to the user) beats (e.g., is ranked higher than) a hand of cards in which all of the cards in the hand have been identified to the user (and other users, e.g., all other users), e.g., a public hand.

In some embodiments, for each card of the first hand and the second hand, fourth information (e.g., different from the above fourth information) may be provided to the first user and the second user. The fourth information may identify a respective number of users to whom the card was identified.

In some embodiments, for each card of the first hand and the second hand, the fourth information may be updated so that the fourth information identifies an updated respective number of users to whom the card was identified. In some embodiments, for each card of the first hand and the second hand, the updated number respective number of users is equal to the respective number of users if the card was not identified to a number of users other than the respective number of users.

In some embodiments, for each card of the first hand and the second hand, if the card was not identified to any users, the respective number of users to whom the card was identified is zero.

In some embodiments, concepts described above relating to the Monty Hall paradox may be exploited in wagering on hands of cards, e.g., poker hands.

In some embodiments, a wager may be received from the first user after the third information is updated. In some embodiments, the wager is that a first selected hand of the set of hands is the winning hand. The wager may include one of the additional first wagers.

In some embodiments, it is revealed to the first user, after receiving the wager, that a first subset of hands of the set of hands does not include the winning hand. In some embodiments, a second subset of hands of the set of hands includes the winning hand. In some embodiments, the set of hands consists of the first and second subsets of hands.

In some embodiments, the first user is provided with an opportunity to change from the wager to a second wager if the second subset of hands includes the first selected hand. In some embodiments, the second subset of hands includes a second selected hand. In some embodiments, the second wager is that the second selected hand is the winning hand.

In some embodiments, concepts described above relating to underlying user biases, e.g., long shot or favorite biases, may be exploited in wagering on hands of cards, e.g., poker hands.

In some embodiments, a first set of likelihood values corresponding to the set of hands is determined using the first wagers. In some embodiments, each likelihood value of the first set of likelihood values may correspond to a respective hand of the set of hands.

In some embodiments, at least one second likelihood value is determined responsively to comparing the first set of likelihood values to one or more predetermined values. In some embodiments, the at least one second likelihood value is provided to at least the first user. In some embodiments, the one or more predetermined values are derived from data regarding expected biases of users. In some embodiments, the users may include the first and second users. In some embodiments, the users may include prior users of, e.g., a wagering system. In some embodiments, the expected biases of the users may include at least one of a long shot bias or a favorite bias. In some embodiments, the at least one second likelihood value is provided to at least the first user.

In some embodiments, fourth information (e.g., different from the above fourth information) may be received. In some embodiments, the fourth information may be based on at least the first wagers.

In some embodiments, a first set of likelihood values corresponding to the set of hands is determined using the fourth information. In some embodiments, each likelihood value of the first set of likelihood values may correspond to a respective hand of the set of hands.

In some embodiments, a second set of likelihood values is determined based at least in part on the first set of likelihood values if one or more likelihood values of the first set of likelihood values are less than a first threshold value or greater than a second threshold value.

In some embodiments, the second set of likelihood values may be associated with at least some hands of the set of hands. In some embodiments, fifth information based on the second set of likelihood values may be provided to at least the first user.

In some embodiments, all or part of the first information, the second information, the third information, the fourth information (with various possibilities for what the fourth information may include being described above), and/or the fifth information may be provided to one or more users other than the first user and/or the second user (as well as to the first user and/or the second user).

Figure 13:
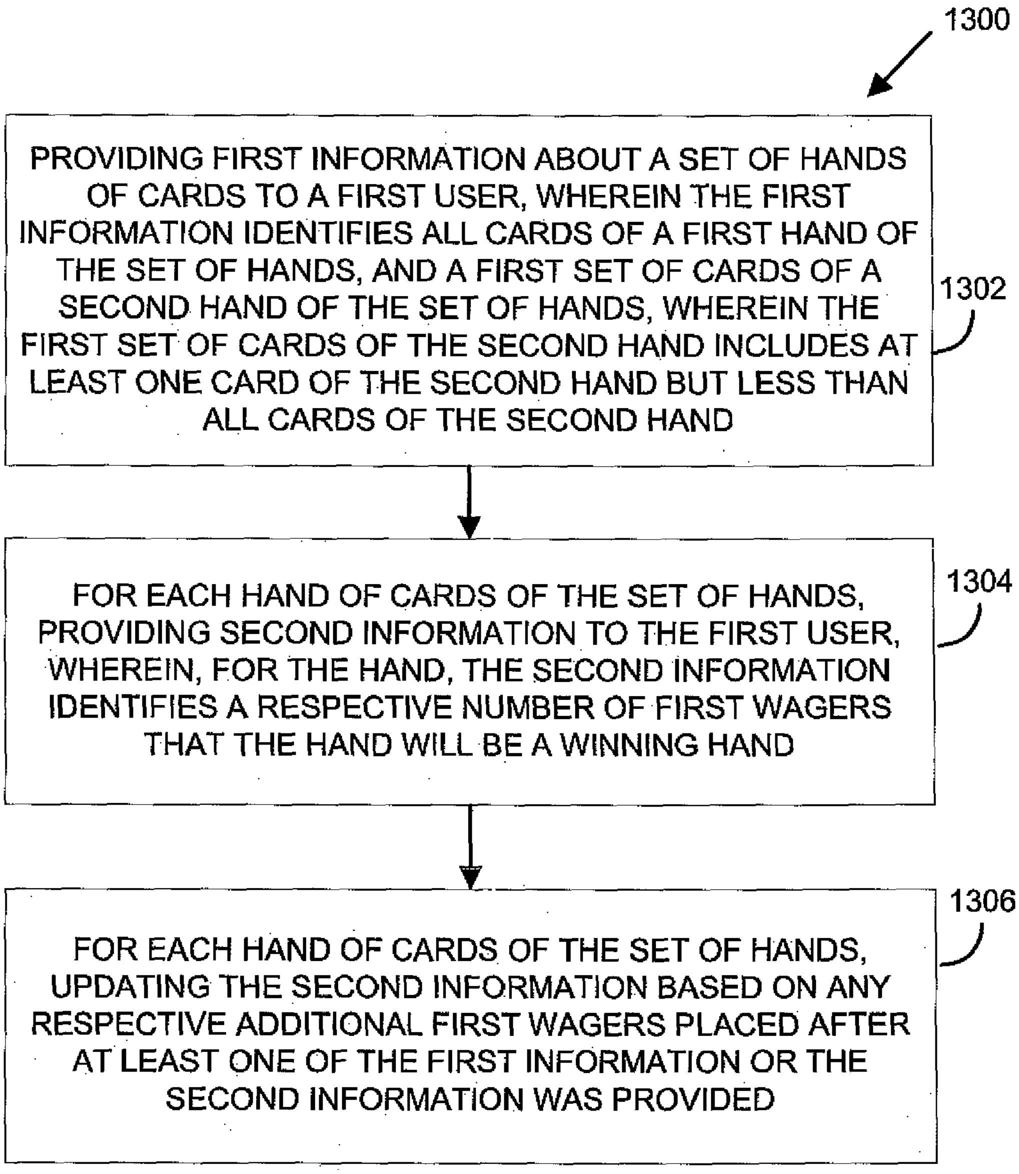

FIG. 13 illustrates an example process 1300 that may be implemented on the example apparatus 100 of FIG. 1. For example, in some embodiments, one or more servers 102 of the plurality of servers 102-1 to 102-M and/or one or more devices 114 of the plurality of devices 114-1 to 114-P may perform one or more steps of the process 1300.

According to the process 1300, in some embodiments, first information about a set of hands of cards is provided (1302) to a first user. The first information may identify all cards of a first hand of the set of hands. The first information may also identify a first set of cards of a second hand of the set of hands. The first set of cards of the second hand includes at least one card of the second hand but less than all cards of the second hand.

According to the process 1300, in some embodiments, for each hand of cards of the set of hands, second information is provided (1304) to the first user. For the hand, the second information identifies a respective number of first wagers that the hand will be a winning hand.

According to the process 1300, in some embodiments, for each hand of cards of the set of hands, the second information is updated (1306) based on any respective additional first wagers placed after at least one of the first information or the second information was provided to the first user.

In some embodiments, all or part of the first information and/or the second information may be provided to one or more users other than the first user.

Further Embodiments

The following should be interpreted as further embodiments and not as claims.

A1. A method, the method comprising:
- providing first information about a set of possible outcomes of an event to users, wherein at least a part of the first information identifies a characteristic of a true outcome of the set of possible outcomes;
- receiving second information, the second information being based on at least first wagers placed by the users, the first wagers being placed following provision of the first information;
- determining a first set of likelihood values corresponding to the set of possible outcomes using the second information, wherein each likelihood value of the first set of likelihood values corresponds to a respective possible outcome of the set of possible outcomes;
- determining a second set of likelihood values based at least in part on the first set of likelihood values if one or more likelihood values of the first set of likelihood values are less than a first threshold value or greater than a second threshold value;
- associating the second set of likelihood values with at least some possible outcomes of the set of possible outcomes; and providing third information based on the second set of likelihood values to at least some users of the users.

A2. The method of claim A1, wherein the users comprise users of a wagering system.

A3. The method of claim A2, wherein the wagering system comprises a pari-mutuel wagering system.

A4. The method of claim A1, wherein the method is performed by one or more servers, the one or more servers configured to communicate with one or more devices via a communications network; and wherein the first information is provided, and the third information is provided, by the one or more servers via the one or more devices.

A5. The method of claim A4, wherein the one or more devices comprise one or more mobile gaming devices.

A6. The method of claim A1, wherein the second information comprises the first wagers.

A7. The method of claim A1, wherein receiving second information comprises:

accepting the first wagers from the users.

A8. The method of claim A1, wherein the event comprises a pari-mutuel game.

A9. The method of claim A8, wherein the pari-mutuel game comprises at least one of a card game, a slot game, a lottery game, a casino game, a race, or a sporting event.

A10. The method of claim A1, wherein the event comprises a non-pari-mutuel game.

A11. The method of claim A1, wherein the event comprises an intermediate outcome of an otherwise broader event.

A12. The method of claim A11, wherein the otherwise broader event comprises at least one of a card game, a lottery game, or a race; and wherein the event respectively comprises at least one of the next card to be drawn in the card game, the next ball to be drawn in the lottery game, or the race participant that is leading in the race at a point prior to an end of the race.

A13. The method of claim A1, wherein the event comprises an event related to at least one of a card game, a slot game, a lottery game, a casino game, a race, or a sporting event.

A14. The method of claim A1, wherein the first information comprises one or more pieces of information.

A15. The method of claim A14, wherein the one or more pieces of information respectively identify at least one of the characteristic of the true outcome, a second characteristic of the true outcome, or one or more other characteristics of one or more other true outcomes of the set of possible outcomes.

A16. The method of claim A14, wherein providing the first information comprises:

providing at least one of the one or more pieces of information to the users.

A17. The method of claim A16, wherein providing at least one of the one or more pieces of information comprises:

providing a piece of information of the one or more pieces of information to at least one user of the users; and providing another piece of information of the one or more pieces of information to at least one other user;

wherein the piece of information is different from the another piece of information.

A18. The method of claim A16, wherein providing at least one of the one or more pieces of information comprises:

providing a different piece of information of the one or more pieces of information to each user of the users.

A19. The method of claim A16, wherein providing at least one of the one or more pieces of information comprises:

providing the same piece of information of the one or more pieces of information to each user of the users.

A20. The method of claim A1, wherein not every user to whom the first information is provided places a first wager of the first wagers.

A21. The method of claim A1, wherein determining the first set of likelihood values corresponding to the set of possible outcomes using the second information comprises:

determining total amounts of first wagers on possible outcomes of the set of possible outcomes from the second information; and determining the first set of likelihood values using the total amounts of first wagers.

A22. The method of claim A21, wherein the total amounts of first wagers comprise at least one of a number of first wagers or a currency amount of first wagers.

A23. The method of claim A21, wherein the first set of likelihood values comprises at least one of a set of probabilities, a set of odds, a set of currency amounts, or a set of numbers of first wagers.

A24. The method of claim A21, wherein each likelihood value of the first set of likelihood values comprises at least one of a probability, odds, a currency amount of first wagers placed on the respective possible outcome, or a number of first wagers placed on the respective possible outcome.

A25. The method of claim A1, wherein the event comprises a card game, and the first information comprises at least one of a number of a card, a suit of the card, or a color of the card.

A26. The method of claim A1, wherein the event comprises a horse race, and the first information comprises at least one of a color of a horse, an age of the horse, a number of the horse, or a breed of the horse.

A27. The method of claim A1, wherein the characteristic of the true outcome comprises a positive indication of the true outcome.

A28. The method of claim A27, wherein the event comprises a card game, and the characteristic of the true outcome comprises at least one of a color of a winning card of the card game, a suit of the winning card, a number of the winning card, a range of numbers comprising the number of the winning card, or an identity of the next card to be drawn.

A29. The method of claim A27, wherein the event comprises a horse race, and the characteristic of the true outcome comprises at least one of a color of a winning horse of the horse race, an age of the winning horse, a number of the winning horse, or a breed of the winning horse.

A30. The method of claim A1, wherein the characteristic of the true outcome comprises a negative indication of the true outcome.

A31. The method of claim A30, wherein the event comprises a card game, and the characteristic of the true outcome comprises at least one of a color that is not a color of the winning card of the card game, a suit that is not a suit of the winning card, a number that is not a number of the winning card, a range of numbers that do not comprise the number of the winning card, or a number that is not a number of the next card to be drawn.

A32. The method of claim A1, wherein the characteristic of the true outcome comprises information regarding whether one or more possible outcomes of the set of possible outcomes are not the true outcome.

A33. The method of claim A1, wherein the characteristic of the true outcome comprises information regarding whether one or more possible outcomes of the set of possible outcomes may be the true outcome.

A34. The method of claim A33, wherein the event comprises a card game, and the characteristic of the true outcome comprises at least one of a likelihood that a color is a color of a winning card of the card game, a likelihood that a suit is a suit of the winning card, a likelihood that a number is a number of the winning card, or a likelihood that a range of numbers comprises a number of the winning card.

A35. The method of claim A1, further comprising:

prior to providing the first information, assessing a premium to the users as compensation for the first information.

A36. The method of claim A35, wherein the premium comprises a price of one of the first wagers.

A37. The method of claim A35, wherein the premium comprises a wager credit, the wager credit being redeemed by placing a future wager.

A38. The method of claim A37, wherein the wager credit expires if the wager credit has not been redeemed by an expiration date.

A39. The method of claim A1, further comprising:

prior to providing the first information, receiving one or more indications from the users, the one or more indications being indicative of an intent to place a first wager.

A40. The method of claim A1, further comprising:

after providing the first information, providing a reward to the users in return for the users placing the first wagers.

A41. The method of claim A40, wherein providing a reward comprises:

waiving a penalty for not placing the first wagers.

A42. The method of claim A40, wherein providing a reward comprises:

reducing a premium of a future wager.

A43. The method of claim A1, further comprising:

after providing the first information, assessing a premium to any user that does not place the first wager.

A44. The method of claim A43, wherein the premium comprises a price of one of the first wagers.

A45. The method of claim A1, further comprising:

after providing the first information, providing one or more users of the users with an option not to place the first wager.

A46. The method of claim A1, further comprising:

prior to providing the first information, providing one or more users of the users with an option of placing the first wager without receiving the first information.

A47. The method of claim A1, further comprising:

generating additional first wagers; and wherein the second information is based on the additional first wagers as well as on the first wagers placed by the users.

A48. The method of claim A47, wherein generating the additional first wagers comprises:

generating the additional first wagers using at least one of computer programs or parameters input by one or more administrators.

A49. The method of claim A47, wherein generating the additional first wagers comprises:

generating the additional first wagers using the first information.

A50. The method of claim A47, wherein generating the additional first wagers comprises:

generating the additional first wagers using data about wagers previously accepted.

A51. The method of claim A50, wherein generating the additional first wagers using data about wagers previously accepted comprises:

retrieving a wager profile, the wager profile comprising a distribution of wagers accepted from one or more users in one or more previous rounds of wagering; and generating the additional first wagers using at least one of the wager profile, the distribution of wagers, wagers from the distribution of wagers, or trends observed from the wager profile.

A52. The method of claim A1, further comprising:

generating pseudo-wagers from internal processing;

using the pseudo-wagers to supplement actual wagering by the users to create an appearance of wagering activity at least somewhat at variance with the actual wagering;

A53. The method of claim A1, wherein at least one user of the users comprises a non-human entity participating on behalf of at least one of a human individual or an organization.

A54. The method of claim A1, wherein the at least some possible outcomes of the set of possible outcomes comprise combinations of one or more other possible outcomes of the set of possible outcomes.

A55. The method of claim A1, wherein the first set of likelihood values is equal to the second set of likelihood values.

A56. The method of claim A1, wherein the first set of likelihood values is not equal to the second set of likelihood values.

A57. The method of claim A1, further comprising:

providing the at least some users with an opportunity to wager based on the third information, the opportunity to wager being provided at a premium relative to another opportunity to wager based on the second information and the first set of likelihood values.

A58. The method of claim A1, wherein the third information comprises the second set of likelihood values.

A59. The method of claim A2, wherein at least some other users of the wagering system do not receive the first information.

A60. The method of claim A2, wherein providing the first information comprises:

making the first information available to all users of the wagering system.

A61. The method of claim A1, wherein providing the first information comprises:

making the first information available to the public.

A62. The method of claim A1, wherein providing the first information comprises:

outputting the first information as at least one of audio information or visual information.

A63. The method of claim A62, wherein outputting the first information comprises:

outputting the visual information to at least one of a continuously updating ticker system, a user display interface, a portable device, or one or more sheets of paper.

A64. The method of claim A62, wherein outputting the first information comprises:

outputting the audio information to at least one of a loudspeaker, or an audio speaker of a device.

A65. The method of claim A1, wherein providing the third information comprises:

making the third information available to the public.

A66. The method of claim A1, wherein providing the third information comprises:

outputting the third information as at least one of audio information or visual information.

A67. The method of claim A66, wherein outputting the third information comprises:

outputting the visual information to at least one of a continuously updating ticker system, a user display interface, a portable device, or one or more sheets of paper.

A68. The method of claim A66, wherein outputting the third information comprises:

outputting the audio information to at least one of a loudspeaker, or an audio speaker of a device.

B1. A system, comprising:

one or more servers, the one or more servers configured to communicate with one or more devices via a communications network, the one or more servers comprising:

means for providing first information about a set of possible outcomes of an event to users, wherein at least a part of the first information identifies a characteristic of a true outcome of the set of possible outcomes;

means for receiving second information, the second information being based on at least first wagers placed by the users, the first wagers being placed following provision of the first information;

means for determining a first set of likelihood values corresponding to the set of possible outcomes using the second information, wherein each likelihood value of the first set of likelihood values corresponds to a respective possible outcome of the set of possible outcomes;

means for determining a second set of likelihood values based at least in part on the first set of likelihood values if one or more likelihood values of the first set of likelihood values are less than a first threshold value or greater than a second threshold value;

means for associating the second set of likelihood values with at least some possible outcomes of the set of possible outcomes; and means for providing third information based on the second set of likelihood values to at least some users of the users.

B2. The system of claim B1, further comprising:

the one or more devices, the one or more devices being configured to provide the first information to the users.

C1. A system, comprising:

one or more servers, the one or more servers configured to communicate with one or more devices via a communications network, the one or more servers comprising:

memory configured to store instructions for execution; and one or more processing devices configured to execute the instructions, the instructions for causing the one or more processing devices to perform the method of any of claims A1 through A68.

C2. The system of claim C1, further comprising:

the one or more devices, the one or more devices being configured to provide the first information to the users.

D1. One or more computer-readable media storing executable instructions, the instructions for causing one or more processing devices to perform the method of any of claims A1 through A68.

E1. A system, comprising:

one or more servers, the one or more servers configured to communicate with one or more devices via a communications network, the one or more servers comprising:

a first apparatus configured to make available data that defines outcomes of an event, the data indicating a feature of a true outcome of the event;

a second apparatus configured to process second data relating to wagers, the wagers being accepted following the data being made available;

a third apparatus configured to develop odds for the outcomes from the second data;

a fourth apparatus configured to develop second odds if some of the odds exceed or fall below assigned levels;

a fifth apparatus configured to relate the second odds to the outcomes;

a sixth apparatus configured to develop third data, the third data based at least on the second odds; and a seventh apparatus configured to make available the third data.

E2. The system of claim E2, further comprising:

the one or more devices, the one or more devices being configured to receive the first wagers from the users and forward the first wagers to the one or more servers for processing.

F1. A method, the method comprising:

causing first information about a set of possible outcomes of an event to be provided to users, wherein at least a part of the first information identifies a characteristic of a true outcome of the set of possible outcomes;

receiving second information, the second information being based on at least first wagers placed by the users, the first wagers being placed following provision of the first information;

determining a first set of likelihood values corresponding to the set of possible outcomes using the second information, wherein each likelihood value of the first set of likelihood values corresponds to a respective possible outcome of the set of possible outcomes;

determining a second set of likelihood values based at least in part on the first set of likelihood values if one or more likelihood values of the first set of likelihood values are less than a first threshold value or greater than a second threshold value;

associating the second set of likelihood values with at least some possible outcomes of the set of possible outcomes; and causing third information based on the second set of likelihood values to be provided to at least some users of the users.

F2. The method of claim F1, wherein the users comprise users of a wagering system.

F3. The method of claim F2, wherein the wagering system comprises a pari-mutuel wagering system.

F4. The method of claim F2, wherein the one or more devices comprise one or more mobile gaming devices.

G1. A system, comprising:

one or more servers, the one or more servers configured to communicate with one or more devices via a communications network, the one or more servers comprising:

means for causing first information about a set of possible outcomes of an event to be provided to users, wherein at least a part of the first information identifies a characteristic of a true outcome of the set of possible outcomes;

means for receiving second information, the second information being based on at least first wagers placed by the users, the first wagers being placed following provision of the first information;

means for determining a first set of likelihood values corresponding to the set of possible outcomes using the second information, wherein each likelihood value of the first set of likelihood values corresponds to a respective possible outcome of the set of possible outcomes;

means for determining a second set of likelihood values based at least in part on the first set of likelihood values if one or more likelihood values of the first set of likelihood values are less than a first threshold value or greater than a second threshold value;

means for associating the second set of likelihood values with at least some possible outcomes of the set of possible outcomes; and means for causing third information based on the second set of likelihood values to be provided to at least some users of the users.

H1. A system, comprising:

one or more servers, the one or more servers configured to communicate with one or more devices via a communications network, the one or more servers comprising:

memory configured to store instructions for execution; and one or more processing devices configured to execute the instructions, the instructions for causing the one or more processing devices to perform the method of claim F1.

I1. One or more computer-readable media storing executable instructions, the instructions for causing one or more processing devices to perform the method of claim F1.

J1. A method, comprising:

providing first information about a set of possible outcomes of an event to users, wherein at least a part of the first information identifies a characteristic of a true outcome of the set of possible outcomes;

receiving second information, the second information being based on at least first wagers placed by the users, the first wagers being placed following provision of the first information;

determining a first set of likelihood values corresponding to the set of possible outcomes using the second information, wherein each likelihood value of the first set of likelihood values corresponds to a respective possible outcome of the set of possible outcomes;

determining that a first likelihood value of the first set of likelihood values is greater than a first threshold value or less than a second threshold value, the first likelihood value corresponding to a first possible outcome of the set of possible outcomes; and performing one or more first actions or one or more second actions responsively to determining that the first likelihood value is greater than the first threshold value or less than the second threshold value.

J2. The method of claim J1, wherein the users comprise users of a wagering system.

J3. The method of claim J2, wherein the wagering system comprises a pari-mutuel wagering system.

J4. The method of claim J2, wherein the method is performed by one or more servers, the one or more servers configured to communicate with one or more devices via a communications network; and wherein the first information is provided by the one or more servers via the one or more devices.

J5. The method of claim J4, wherein the one or more devices comprise one or more mobile gaming devices.

J6. The method of claim J1, further comprising:

if the first likelihood value is greater than the first threshold value, performing the one or more first actions.

J7. The method of claim J1, further comprising:

if the first likelihood value is less than the second threshold value, performing the one or more second actions.

J8. The method of claim J6, wherein performing the one or more first actions comprises:

determining a second likelihood value, the second likelihood value being less than the first likelihood value and greater than or equal to the first threshold value;

associating the second likelihood value with the first possible outcome; and providing one or more users of the users with the second likelihood value and an opportunity to wager on the first possible outcome.

J9. The method of claim J8, wherein providing the one or more users with the opportunity to wager comprises:

providing the one or more users with the opportunity to wager at a lower premium than would be provided if the opportunity to wager had been based on the second information and the first likelihood value.

J10. The method of claim J6, wherein performing the one or more first actions comprises:

providing one or more users of the users with an opportunity to wager on the first possible outcome at a lower premium than would be provided if the opportunity to wager had been based on the second information and the first likelihood value.

J11. The method of claim J7, wherein performing the one or more second actions comprises:

determining a second likelihood value, the second likelihood value being greater than the first likelihood value and less than or equal to the second threshold value;

associating the second likelihood value with the first possible outcome; and providing one or more users of the users with the second likelihood value and an opportunity to wager on the first possible outcome.

J12. The method of claim J11, wherein providing the one or more users with the opportunity to wager comprises:

providing the one or more users with the opportunity to wager at a higher premium than would be provided if the opportunity to wager had been based on the second information and the first likelihood value.

J13. The method of claim J7, wherein performing the one or more second actions comprises:

providing one or more users of the users with an opportunity to wager on the first possible outcome at a higher premium than would be provided if the opportunity to wager had been based on the second information and the first likelihood value.

J14. The method of claim J6, wherein performing the one or more first actions comprises:

grouping one or more possible outcomes of the set of possible outcomes other than the first possible outcome together to produce a combined possible outcome;

determining a second likelihood value;

associating the second likelihood value with the combined possible outcome; and providing one or more users of the users with the second likelihood value and an opportunity to wager on the combined possible outcome.

J15. The method of claim J14, wherein determining the second likelihood value comprises:

adding together one or more likelihood values of the first set of likelihood values that correspond to the one or more possible outcomes.

J16. The method of claim J14, further comprising:

providing at least one user with separate opportunities to wager on respective possible outcomes of the one or more possible outcomes, the separate opportunities to wager being based on the second information and the first set of likelihood values.

J17. The method of claim J16, wherein the separate opportunities to wager are provided at respective separate premiums; and wherein providing the one or more users with the opportunity to wager comprises:

providing the one or more users with the opportunity to wager at a higher premium than a sum of the respective separate premiums.

J18. The method of claim J6, wherein performing the one or more first actions comprises:

grouping one or more possible outcomes of the set of possible outcomes other than the first possible outcome together to produce a combined possible outcome;

providing one or more users of the users with an opportunity to wager on the combined possible outcome; and providing at least one user with separate opportunities to wager on respective possible outcomes of the one or more possible outcomes, the separate opportunities to wager being based on the second information and the first set of likelihood values.

J19. The method of claim J18, wherein the separate opportunities to wager are provided at respective separate premiums; and wherein providing the one or more users with the opportunity to wager comprises:

providing the one or more users with the opportunity to wager at a higher premium than a sum of the respective separate premiums.

J20. The method of claim J1, wherein performing the one or more first actions or the one or more second actions comprises:

determining a second likelihood value;

associating the second likelihood value with the first possible outcome;

providing one or more users of the users with the second likelihood value and an opportunity to wager on the first possible outcome; and providing other users with a second opportunity to wager on possible activities of the one or more users with respect to the opportunity to wager and the first possible outcome.

J21. The method of claim J20, further comprising:

determining a second set of likelihood values;

associating the second set of likelihood values with the second opportunity to wager; and updating the second set of likelihood values as a first time approaches, the second opportunity to wager terminating at the first time.

J22. The method of claim J1, wherein performing the one or more first actions or the one or more second actions comprises:

grouping one or more possible outcomes of the set of possible outcomes other than the first possible outcome together to produce a combined possible outcome;

determining a second likelihood value;

associating the second likelihood value with the combined possible outcome;

providing one or more users of the users with the second likelihood value and an opportunity to wager on the combined possible outcome; and providing other users with a second opportunity to wager on possible activities of the one or more users with respect to the opportunity to wager and the combined possible outcome.

J23. The method of claim J1, further comprising:

determining the first and second threshold values using data regarding expected biases of the users, the biases comprising at least one of underestimating a probability of an objectively likely outcome of an event occurring, overestimating a probability of an objectively unlikely outcome of the event occurring, overestimating a probability of the objectively likely outcome of the event not occurring, or underestimating a probability of the objectively unlikely outcome of the event not occurring.

K1. A system, comprising:

one or more servers, the one or more servers configured to communicate with one or more devices via a communications network, the one or more servers comprising:

means for providing first information about a set of possible outcomes of an event to users, wherein at least a part of the first information identifies a characteristic of a true outcome of the set of possible outcomes;

means for receiving second information, the second information being based on at least first wagers placed by the users, the first wagers being placed following provision of the first information;

means for determining a first set of likelihood values corresponding to the set of possible outcomes using the second information, wherein each likelihood value of the first set of likelihood values corresponds to a respective possible outcome of the set of possible outcomes;

means for determining that a first likelihood value of the first set of likelihood values is greater than a first threshold value or less than a second threshold value, the first likelihood value corresponding to a first possible outcome of the set of possible outcomes; and means for performing one or more first actions or one or more second actions responsively to determining that the first likelihood value is greater than the first threshold value or less than the second threshold value.

K2. The system of claim K1, further comprising:

the one or more devices, the one or more devices being configured to provide the first information to the users.

L1. A system, comprising:

one or more servers, the one or more servers configured to communicate with one or more devices via a communications network, the one or more servers comprising:

memory configured to store instructions for execution; and one or more processing devices configured to execute the instructions, the instructions for causing the one or more processing devices to perform the method of any of claims J1 through J23.

M1. One or more computer-readable media storing executable instructions, the instructions for causing one or more processing devices to perform the method of any of claims J1 through J23.

N1. A method, the method comprising:

providing first information about a set of possible outcomes of an event to users, wherein at least a part of the first information identifies a characteristic of a true outcome of the set of possible outcomes;

determining a first set of likelihood values corresponding to the set of possible outcomes using first wagers placed by the users following provision of the first information, wherein each likelihood value of the first set of likelihood values corresponds to a respective possible outcome of the set of possible outcomes;

determining at least one second likelihood value responsively to comparing the first set of likelihood values to one or more predetermined values, the one or more predetermined values being derived from data regarding expected biases of the users; and providing the at least one second likelihood value to at least one user of the users.

N2. The method of claim N1, wherein the users comprise users of a wagering system.

N3. The method of claim N2, wherein the wagering system comprises a pari-mutuel wagering system.

N4. The method of claim N2, wherein the method is performed by one or more servers, the one or more servers configured to communicate with one or more devices via a communications network; and wherein the first information is provided by the one or more servers via the one or more devices.

N5. The method of claim N2, wherein the one or more devices comprise one or more mobile gaming devices.

N6. The method of claim N1, wherein the at least one second likelihood value corresponds to two or more possible outcomes of the set of possible outcomes.

N7. The method of claim N6, further comprising:

grouping the two or more possible outcomes together to produce a combined possible outcome; and associating the at least one second likelihood value with the combined possible outcome.

N8. The method of claim N1, further comprising:

accepting second wagers relating to a second set of possible outcomes that comprises possible activities of the at least one user, the possible activities being responsive to the at least one second likelihood value provided to the at least one user.

N9. The method of claim N8, wherein the possible activities comprise wagering by the at least one user on at least one possible outcome of the set of possible outcomes, the at least one possible outcome being associated with the at least one second likelihood value.

N11. The method of claim N1, wherein the expected biases of the users comprise at least one of a long shot bias or a favorite bias.

N11. The method of claim N2, wherein the data regarding expected biases of the users are based on at least some historical experience with the wagering system.

N12. The method of claim N2, wherein the data regarding expected biases of the users are based on at least some historical experience apart from the wagering system, the historical experience comprising actual or theoretical wagering results.

N13. The method of claim N12, wherein the theoretical wagering results comprise academic research on wagering, and wherein the actual wagering results comprise actual wagers made in wagering environments apart from the wagering system.

O1. A system, comprising:

one or more servers, the one or more servers configured to communicate with one or more devices via a communications network, the one or more servers comprising:

means for providing first information about a set of possible outcomes of an event to users, wherein at least a part of the first information identifies a characteristic of a true outcome of the set of possible outcomes;

means for determining a first set of likelihood values corresponding to the set of possible outcomes using first wagers placed by the users following provision of the first information, wherein each likelihood value of the first set of likelihood values corresponds to a respective possible outcome of the set of possible outcomes;

means for determining at least one second likelihood value responsively to comparing the first set of likelihood values to one or more predetermined values, the one or more predetermined values being derived from data regarding expected biases of the users; and means for providing the at least one second likelihood value to at least one user of the users.

O2. The system of claim O1, further comprising:

the one or more devices, the one or more devices being configured to provide the first information to the users.

P1. A system, comprising:

one or more servers, the one or more servers configured to communicate with one or more devices via a communications network, the one or more servers comprising:

memory configured to store instructions for execution; and one or more processing devices configured to execute the instructions, the instructions for causing the one or more processing devices to perform the method of any of claims N1 through N13.

Q1. One or more computer-readable media storing executable instructions, the instructions for causing one or more processing devices to perform the method of any of claims N1 through N13.

R1. A method, the method comprising:

providing first information about a set of possible outcomes of an event to users, wherein at least a part of the first information identifies a characteristic of a true outcome of the set of possible outcomes;

receiving second information, the second information being based on at least first wagers placed by the users, the first wagers being placed following provision of the first information;

determining a first set of likelihood values corresponding to the set of possible outcomes using the second information, wherein each likelihood value of the first set of likelihood values corresponds to a respective possible outcome of the set of possible outcomes;

determining at least one second likelihood value responsively to comparing the first set of likelihood values to one or more predetermined values, the one or more predetermined values being derived from data regarding expected biases of the users; and providing third information based on the at least one second likelihood value to at least one user of the users.

R2. The method of claim R1, wherein the users comprise users of a wagering system.

R3. The method of claim R2, wherein the wagering system comprises a pari-mutuel wagering system.

R4. The method of claim R2, wherein the method is performed by one or more servers, the one or more servers configured to communicate with one or more devices via a communications network; and wherein the first information is provided by the one or more servers via the one or more devices.

R5. The method of claim R2, wherein the one or more devices comprise one or more mobile gaming devices.

R6. The method of claim R1, wherein the second information comprises the first wagers.

R7. The method of claim R1, wherein the third information comprises the at least one second likelihood value.

S1. A system, comprising:

one or more servers, the one or more servers configured to communicate with one or more devices via a communications network, the one or more servers comprising:

means for providing first information about a set of possible outcomes of an event to users, wherein at least a part of the first information identifies a characteristic of a true outcome of the set of possible outcomes;

means for receiving second information, the second information being based on at least first wagers placed by the users, the first wagers being placed following provision of the first information;

means for determining a first set of likelihood values corresponding to the set of possible outcomes using the second information, wherein each likelihood value of the first set of likelihood values corresponds to a respective possible outcome of the set of possible outcomes;

means for determining at least one second likelihood value responsively to comparing the first set of likelihood values to one or more predetermined values, the one or more predetermined values being derived from data regarding expected biases of the users; and means for providing third information based on the at least one second likelihood value to at least one user of the users.

S2. The system of claim S1, further comprising:

the one or more devices, the one or more devices being configured to provide the first information to the users.

T1. A system, comprising:

one or more servers, the one or more servers configured to communicate with one or more devices via a communications network, the one or more servers comprising:

memory configured to store instructions for execution; and one or more processing devices configured to execute the instructions, the instructions for causing the one or more processing devices to perform the method of any of claims R1 through R7.

U1. One or more computer-readable media storing executable instructions, the instructions for causing one or more processing devices to perform the method of any of claims R1 through R7.

V1. A method, the method comprising:

providing first information about a set of possible outcomes of an event to a user, wherein at least a part of the first information identifies a characteristic of a true outcome of the set of possible outcomes;

receiving a first wager on a first possible outcome of the set of possible outcomes from the user after providing the first information;

revealing to the user, after receiving the first wager, that a first subset of possible outcomes of the set of possible outcomes does not comprise the true outcome, wherein a second subset of possible outcomes of the set of possible outcomes comprises the true outcome, and wherein the set of possible outcomes consists of the first and second subsets of possible outcomes; and providing the user with an opportunity to change from the first wager to a second wager on a second possible outcome of the set of possible outcomes if the second subset of possible outcomes comprises the first possible outcome, the second subset of possible outcomes comprising the second possible outcome.

V2. The method of claim V1, wherein the user comprises a user of a wagering system.

V3. The method of claim V2, wherein the wagering system comprises a pari-mutuel wagering system.

V4. The method of claim V2, wherein the method is performed by one or more servers, the one or more servers configured to communicate with one or more devices via a communications network; and wherein the first information is provided by the one or more servers via the one or more devices.

V5. The method of claim V4, wherein the one or more devices comprise one or more mobile gaming devices.

V6. The method of claim V1, wherein the user loses the first wager if the first subset of possible outcomes comprises the first possible outcome.

V7. The method of claim V1, wherein the first subset of possible outcomes does not comprise the first possible outcome and the second subset of possible outcomes comprises the first possible outcome, such that the user is provided with the opportunity to change from the first wager to the second wager.

V8. The method of claim V1, wherein revealing to the user that the first subset of possible outcomes does not comprise the true outcome comprises:

developing second information such that the second information, when combined with other information, permits at least a deductive inference that the first subset of possible outcomes does not comprise the true outcome;

providing the second information to the user.

V9. The method of claim V8, wherein the other information comprises at least a portion of the first information.

V10. The method of claim V1, further comprising:

assessing a premium to the user, the premium being assessed for changing from the first wager to the second wager.

V11. The method of claim V1, further comprising:

assessing a premium to the user, the premium being assessed for failing to change from the first wager to the second wager.

V12. The method of claim V1, further comprising:

providing the user, after providing the user with the opportunity to change, with an opportunity to select one or more possible outcomes from the second subset of possible outcomes to be revealed to the user as not comprising the true outcome.

V13. The method of claim V12, further comprising:

assessing a premium to the user for the opportunity to select, wherein a size of the premium depends on how many possible outcomes are included in the one or more possible outcomes.

V14. The method of claim V1, further comprising:

offering to pay a payout amount at least for successful wagers on the true outcome;

decreasing the payout amount from a first round of wagering to a second round of wagering.

V15. The method of claim V1, further comprising:

providing one or more users with an opportunity to wager on possible activity of the user with respect to the second subset of possible outcomes.

V16. The method of claim V1, further comprising:

determining a first set of likelihood values corresponding to the set of possible outcomes using at least the first wager, wherein each likelihood value of the first set of likelihood values corresponds to a respective possible outcome of the set of possible outcomes;

determining a second set of likelihood values corresponding to the second subset of possible outcomes after revealing that the first subset of possible outcomes does not comprise a true outcome, wherein each likelihood value of the second set of likelihood values corresponds to a respective possible outcome of the second subset of possible outcomes;

providing the second set of likelihood values to the user.

V17. The method of claim V16, further comprising:

assessing a premium to the user for providing the second set of likelihood values to the user.

V18. The method of claim V16, wherein determining the second set of likelihood values further comprises:

determining the second set of likelihood values responsively to comparing the first set of likelihood values to one or more predetermined values, the one or more predetermined values being derived from data regarding expected biases of one or more users.

W1. A system, comprising:

one or more servers, the one or more servers configured to communicate with one or more devices via a communications network, the one or more servers comprising:

means for providing first information about a set of possible outcomes of an event to a user, wherein at least a part of the first information identifies a characteristic of a true outcome of the set of possible outcomes;

means for receiving a first wager on a first possible outcome of the set of possible outcomes from the user after providing the first information;

means for revealing to the user, after receiving the first wager, that a first subset of possible outcomes of the set of possible outcomes does not comprise the true outcome, wherein a second subset of possible outcomes of the set of possible outcomes comprises the true outcome, and wherein the set of possible outcomes consists of the first and second subsets of possible outcomes; and means for providing the user with an opportunity to change from the first wager to a second wager on a second possible outcome of the set of possible outcomes if the second subset of possible outcomes comprises the first possible outcome, the second subset of possible outcomes comprising the second possible outcome.

W2. The system of claim W1, further comprising:

a first device of the one or more devices, the first device being configured to provide the first information to the user.

X1. A system, comprising:

one or more servers, the one or more servers configured to communicate with one or more devices via a communications network, the one or more servers comprising:

memory configured to store instructions for execution; and one or more processing devices configured to execute the instructions, the instructions for causing the one or more processing devices to perform the method of any of claims V1 through V18.

Y1. One or more computer-readable media storing executable instructions, the instructions for causing one or more processing devices to perform the method of any of claims V1 through V18.

Z1. A method, the method comprising:

providing first information about a set of possible outcomes of an event to a user, wherein at least a part of the first information identifies a characteristic of a true outcome of the set of possible outcomes;

receiving a first wager on a first possible outcome of the set of possible outcomes from the user after providing the first information;

revealing to the user, after receiving the first wager, that a first subset of possible outcomes of the set of possible outcomes is at least substantially unlikely to comprise the true outcome, wherein a second subset of possible outcomes of the set of possible outcomes is at least substantially likely to comprise the true outcome, and wherein the set of possible outcomes consists of the first and second subsets of possible outcomes; and providing the user with an opportunity to change from the first wager to a second wager on a second possible outcome of the set of possible outcomes, the second subset of possible outcomes comprising the second possible outcome.

Z2. The method of claim Z1, wherein the user comprises a user of a wagering system.

Z3. The method of claim Z2, wherein the wagering system comprises a pari-mutuel wagering system.

Z4. The method of claim Z2, wherein the method is performed by one or more servers, the one or more servers configured to communicate with one or more devices via a communications network; and wherein the first information is provided by the one or more servers via the one or more devices.

Z5. The method of claim Z4, wherein the one or more devices comprise one or more mobile gaming devices.

Z6. The method of claim Z1, wherein substantially likely comprises a greater than 90 percent likelihood, and substantially unlikely comprises a less than 10 percent likelihood.

Z7. The method of claim Z1, further comprising:

if the second subset of possible outcomes comprises the first possible outcome, assessing a premium to the user for changing from the first wager to the second wager.

Z8. The method of claim Z1, further comprising:

if the first subset of possible outcomes comprises the first possible outcome, assessing a premium to the user for changing from the first wager to the second wager.

Z9. The method of claim Z1, further comprising:

assessing a different premium to the user for changing from the first wager to the second wager depending on whether the second subset of possible outcomes comprises the first possible outcome or the first subset of possible outcomes comprises the first possible outcome.

Z10. The method of claim Z1, wherein revealing to the user, after receiving the first wager, that the first subset of possible outcomes of the set of possible outcomes is at least substantially unlikely to comprise the true outcome comprises:

revealing to the user, after receiving the first wager, that the first subset of possible outcomes of the set of possible outcomes does not comprise the true outcome.

AA1. A system, comprising:

one or more servers, the one or more servers configured to communicate with one or more devices via a communications network, the one or more servers comprising:

means for providing first information about a set of possible outcomes of an event to a user, wherein at least a part of the first information identifies a characteristic of a true outcome of the set of possible outcomes;

means for receiving a first wager on a first possible outcome of the set of possible outcomes from the user after providing the first information;

means for revealing to the user, after receiving the first wager, that a first subset of possible outcomes of the set of possible outcomes is at least substantially unlikely to comprise the true outcome, wherein a second subset of possible outcomes of the set of possible outcomes is at least substantially likely to comprise the true outcome, and wherein the set of possible outcomes consists of the first and second subsets of possible outcomes; and means for providing the user with an opportunity to change from the first wager to a second wager on a second possible outcome of the set of possible outcomes, the second subset of possible outcomes comprising the second possible outcome.

AA2. The system of claim AA1, further comprising:

a first device of the one or more devices, the first device being configured to provide the first information to the user.

AB1. A system, comprising:

one or more servers, the one or more servers configured to communicate with one or more devices via a communications network, the one or more servers comprising:

memory configured to store instructions for execution; and one or more processing devices configured to execute the instructions, the instructions for causing the one or more processing devices to perform the method of any of claims Z1 through Z10.

AC1. One or more computer-readable media storing executable instructions, the instructions for causing one or more processing devices to perform the method of any of claims Z1 through Z10.

AD1. A method, the method comprising:

providing first information about a set of hands of cards to a first user, wherein the first information identifies a first set of cards of a first hand of the set of hands, wherein the first set of cards of the first hand comprises at least one card of the first hand but less than all cards of the first hand;

providing second information about the set of hands of cards to a second user, wherein the second information identifies a first set of cards of a second hand of the set of hands, wherein the first set of cards of the second hand comprises at least one card of the second hand but less than all cards of the second hand;

for each hand of cards of the set of hands, providing third information to the first and the second users, wherein, for the hand, the third information identifies a respective number of first wagers that the hand will be a winning hand; and for each hand of cards of the set of hands, updating the third information based on any respective additional first wagers placed after at least one of the first information, the second information, or the third information was provided.

AD2. The method of claim AD1, wherein the first user and the second user comprise respective first and second users of a wagering system.

AD3. The method of claim AD2, wherein the wagering system comprises a pari-mutuel wagering system.

AD4. The method of claim AD2, wherein the method is performed by one or more servers, the one or more servers configured to communicate with one or more devices via a communications network; and wherein the first information is provided by the one or more servers via the one or more devices.

AD5. The method of claim AD2, wherein the one or more devices comprise one or more mobile gaming devices.

AD6. The method of claim AD1, further comprising:

providing fourth information to the first user and the second user, wherein the fourth information identifies all cards of a third hand of the set of hands.

AD7. The method of claim AD1, wherein providing the first information comprises:

providing first information about the set of hands of cards to the first user, wherein the first information identifies all cards of a third hand of the set of hands.

AD8. The method of claim AD1, wherein providing the second information comprises:

providing second information about the set of hands of cards to the second user, wherein the second information identifies all cards of a third hand of the set of hands.

AD9. The method of claim AD1, further comprising:

for each wager of the first wagers and the additional first wagers, assessing a premium for the wager during a round of wagering.

AD10. The method of claim AD9, wherein the premium assessed for the wager increases during the round of wagering.

AD11. The method of claim AD1, further comprising:

for each card of the first hand and the second hand, providing the first user and the second user with fourth information, wherein the fourth information identifies a respective number of users to whom the card was identified.

AD12. The method of claim AD11, further comprising:

for each card of the first hand and the second hand, updating the fourth information so that the fourth information identifies an updated respective number of users to whom the card was identified.

AD13. The method of claim AD12, wherein for each card of the first hand and the second hand, the updated respective number of users is equal to the respective number of users if the card was not identified to a number of users other than the respective number of users.

AD14. The method of claim AD11, wherein for each card of the first hand and the second hand, if the card was not identified to any users, the respective number of users to whom the card was identified is zero.

AD15. The method of claim AD1, wherein the first information also identifies a second set of cards of the second hand, the second set of cards of the second hand comprising at least one card that is different from the first set of cards of the second hand; and wherein the second information also identifies a second set of cards of the first hand, the second set of cards of the first hand comprising at least one card that is different from the first set of cards of the first hand.

AD16. The method of claim AD1, further comprising:

providing fourth information identifying a second set of cards of the first hand to at least one of the second user or a third user, the second set of cards of the first hand comprising at least one card that is different from the first set of cards of the first hand.

AD17. The method of claim AD1, wherein the first and the second hands each comprise the same number of cards.

AD18. The method of claim AD17, wherein the first and the second hands each comprise five cards, and wherein the first and the second hands respectively comprise first and second poker hands.

AD19. The method of claim AD1, further comprising:

randomly determining the first set of cards of the first hand.

AD20. The method of claim AD1, further comprising:

determining the first set of cards of the first hand using data regarding biases of at least one of the first user or of other users.

AD21. The method of claim AD1, further comprising:
generating at least some first wagers of the first wagers using at least one of computer programs or parameters input by one or more administrators.

AD22. The method of claim AD1, further comprising:
generating pseudo-wagers from internal processing;
using the pseudo-wagers to supplement actual wagering by at least the first and the second users to create an appearance of wagering activity in the third information at least somewhat at variance with the actual wagering.

AD23. The method of claim AD1, further comprising:
receiving a wager from the first user after updating the third information, the wager being that a first selected hand of the set of hands is the winning hand, the wager comprising one of the additional first wagers;
revealing to the first user, after receiving the wager, that a first subset of hands of the set of hands does not comprise the winning hand, wherein a second subset of hands of the set of hands comprises the winning hand, and wherein the set of hands consists of the first and second subsets of hands; and
providing the first user with an opportunity to change from the wager to a second wager if the second subset of hands comprises the first selected hand, the second subset of hands comprising a second selected hand, the second wager being that the second selected hand is the winning hand.

AD24. The method of claim AD1, further comprising:
determining a first set of likelihood values corresponding to the set of hands using the first wagers, wherein each likelihood value of the first set of likelihood values corresponds to a respective hand of the set of hands;
determining at least one second likelihood value responsively to comparing the first set of likelihood values to one or more predetermined values, the one or more predetermined values being derived from data regarding expected biases of users; and
providing the at least one second likelihood value to at least the first user.

AD25. The method of claim AD24, wherein the expected biases of the users comprise at least one of a long shot bias or a favorite bias.

AD26. The method of claim AD1, further comprising:
receiving fourth information, the fourth information being based on at least the first wagers;
determining a first set of likelihood values corresponding to the set of hands using the fourth information, wherein each likelihood value of the first set of likelihood values corresponds to a respective hand of the set of hands;
determining a second set of likelihood values based at least in part on the first set of likelihood values if one or more likelihood values of the first set of likelihood values are less than a first threshold value or greater than a second threshold value;
associating the second set of likelihood values with at least some hands of the set of hands; and
providing fifth information based on the second set of likelihood values to at least the first user.

AE1. A system, comprising:
one or more servers, the one or more servers configured to communicate with one or more devices via a communications network, the one or more servers comprising:
means for providing first information about a set of hands of cards to a first user, wherein the first information identifies a first set of cards of a first hand of the set of hands, wherein the first set of cards of the first hand comprises at least one card of the first hand but less than all cards of the first hand;
means for providing second information about the set of hands of cards to a second user, wherein the second information identifies a first set of cards of a second hand of the set of hands, wherein the first set of cards of the second hand comprises at least one card of the second hand but less than all cards of the second hand;
means for providing, for each hand of cards of the set of hands, third information to the first and the second users, wherein, for the hand, the third information identifies a respective number of first wagers that the hand will be a winning hand; and
means for updating, for each hand of cards of the set of hands, the third information based on any respective additional first wagers placed after at least one of the first information, the second information, or the third information was provided.

AE2. The system of claim AE1, further comprising:
a first device of the one or more devices, the first device being configured to provide the first information to the first user; and
a second device of the one or more devices, the second device being configured to provide the second information to the second user.

AF1. A system, comprising:
one or more servers, the one or more servers configured to communicate with one or more devices via a communications network, the one or more servers comprising:
memory configured to store instructions for execution; and
one or more processing devices configured to execute the instructions, the instructions for causing the one or more processing devices to perform the method of any of claims AD1 through AD26.

AG1. One or more computer-readable media storing executable instructions, the instructions for causing one or more processing devices to perform the method of any of claims AD1 through AD26.

AH1. A method, the method comprising:
providing first information about a set of hands of cards to a first user, wherein the first information identifies all cards of a first hand of the set of hands, and a first set of cards of a second hand of the set of hands, wherein the first set of cards of the second hand comprises at least one card of the second hand but less than all cards of the second hand;
for each hand of the set of hands, providing second information to the first user, wherein, for the hand, the second information identifies a respective number of first wagers that the hand will be a winning hand; and
for each hand of cards of the set of hands, updating the second information based on any respective additional first wagers placed after at least one of the first information or the second information was provided.

AI1. A system, comprising:
one or more servers, the one or more servers configured to communicate with one or more devices via a communications network, the one or more servers comprising:
means for providing first information about a set of hands of cards to a first user, wherein the first information identifies all cards of a first hand of the set of hands, and a first set of cards of a second hand of the set of hands, wherein the first set of cards of the second hand comprises at least one card of the second hand but less than all cards of the second hand;

means for providing, for each hand of the set of hands, second information to the first user, wherein, for the hand, the second information identifies a respective number of first wagers that the hand will be a winning hand; and means for updating, for each hand of cards of the set of hands, the second information based on any respective additional first wagers placed after at least one of the first information or the second information was provided.

AI2. The system of claim AI1, further comprising:

a first device of the one or more devices, the first device being configured to provide the first information to the first user.

AJ1. A system, comprising:

one or more servers, the one or more servers configured to communicate with one or more devices via a communications network, the one or more servers comprising:

memory configured to store instructions for execution; and one or more processing devices configured to execute the instructions, the instructions for causing the one or more processing devices to perform the method of AH1.

AK1. One or more computer-readable media storing executable instructions, the instructions for causing one or more processing devices to perform the method of claim AH1.

What is claimed is:

1. A method, the method comprising:

providing first information about a set of possible outcomes of an event to users of one or more gaming devices, wherein at least a part of the first information identifies a characteristic of a true outcome of the set of possible outcomes, wherein the true outcome comprises at least one of:

an outcome that has actually occurred, and an outcome that will definitely occur;

receiving second information, the second information being based on at least first wagers placed by the users, the first wagers being placed following provision of the first information, wherein at least two of the first wagers are associated with at least one possible outcome of the set of possible outcomes;

determining, by one or more processors of one or more servers, a first set of likelihood values corresponding to the set of possible outcomes using the second information, wherein each likelihood value of the first set of likelihood values corresponds to a respective possible outcome of the set of possible outcomes, wherein the one or more servers are configured to communicate with the one or more gaming devices via a communications network;

determining, by the one or more processors, a second set of likelihood values based at least in part on the first set of likelihood values if one or more likelihood values of the first set of likelihood values are less than a first threshold value or greater than a second threshold value, wherein the first threshold value is different from the second threshold value, and wherein the first threshold value and the second threshold value are derived from user data regarding expected biases;

associating, by the one or more processors, the second set of likelihood values with at least two possible outcomes of the set of possible outcomes; and providing third information based on the second set of likelihood values to at least two users of the users.

2. The method of claim 1, wherein providing the first information comprises:

providing, by the one or more processors, the first information; and wherein receiving the second information comprises:

receiving, by the one or more processors, the second information; and wherein providing the third information comprises:

providing, by the one or more processors, the third information.

3. The method of claim 1, wherein the first information is provided, and the third information is provided, by the one or more servers via the one or more gaming devices.

4. The method of claim 3, wherein the one or more gaming devices comprise one or more mobile gaming devices.

5. The method of claim 1, wherein the second information comprises the first wagers.

6. The method of claim 1, wherein receiving the second information comprises:

accepting the first wagers from the users.

7. The method of claim 1, wherein the first information comprises one or more pieces of information.

8. The method of claim 7, wherein the one or more pieces of information respectively identify at least one of the characteristic of the true outcome, a second characteristic of the true outcome, or one or more other characteristics of one or more other true outcomes of the set of possible outcomes.

9. The method of claim 8, wherein providing the first information comprises:

providing at least one of the one or more pieces of information to the users.

10. The method of claim 9, wherein providing at least one of the one or more pieces of information comprises:

providing, by the one or more processors, a piece of information of the one or more pieces of information to at least one user of the users; and providing, by the one or more processors, another piece of information of the one or more pieces of information to at least one other user;

wherein the piece of information is different from the another piece of information.

11. The method of claim 9, wherein providing at least one of the one or more pieces of information comprises:

providing the same piece of information of the one or more pieces of information to each user of the users.

12. The method of claim 10, wherein providing at least one of the one or more pieces of information comprises:

providing, by the one or more processors, a different piece of information of the one or more pieces of information to each user of the users.

13. The method of claim 1, wherein determining the first set of likelihood values corresponding to the set of possible outcomes using the second information comprises:

determining, by the one or more processors, total amounts of first wagers on possible outcomes of the set of possible outcomes from the second information; and determining, by the one or more processors, the first set of likelihood values using the total amounts of first wagers.

14. The method of claim 13, wherein the total amounts of first wagers comprise at least one of a number of first wagers or a currency amount of first wagers.

15. The method of claim 13, wherein the first set of likelihood values comprises at least one of a set of probabilities, a set of odds, a set of currency amounts, or a set of numbers of first wagers.

16. The method of claim 13, wherein each likelihood value of the first set of likelihood values comprises at least one of a probability, odds, a currency amount of first wagers placed on the respective possible outcome, or a number of first wagers placed on the respective possible outcome.

17. The method of claim 1, wherein the event comprises a card game, and the first information comprises at least one of a number of a card, a suit of the card, or a color of the card.

18. The method of claim 1, wherein the characteristic of the true outcome comprises information regarding whether one or more possible outcomes of the set of possible outcomes are not the true outcome.

19. The method of claim 1, wherein the characteristic of the true outcome comprises information regarding whether one or more possible outcomes of the set of possible outcomes may be the true outcome.

20. The method of claim 19, wherein the event comprises a card game, and the characteristic of the true outcome comprises at least one of a likelihood that a color is a color of a winning card of the card game, a likelihood that a suit is a suit of the winning card, a likelihood that a number is a number of the winning card, or a likelihood that a range of numbers comprises a number of the winning card.

21. The method of claim 1, further comprising:

after providing the first information, providing a reward to the users in return for the users placing the first wagers.

22. The method of claim 21, wherein providing the reward comprises:

providing, by the one or more processors, the reward.

23. The method of claim 21, wherein providing a reward comprises:

waiving a penalty for not placing the first wagers.

24. The method of claim 21, wherein providing a reward comprises:

reducing a premium of a future wager.

25. The method of claim 1, further comprising:

after providing the first information, assessing a premium to any user that does not place the first wager.

26. The method of claim 25, wherein assessing the premium comprises:

assessing, by the one or more processors, the premium.

27. The method of claim 26, wherein generating the additional first wagers comprises:

generating, by the one or more processors, the additional first wagers.

28. The method of claim 25, wherein the premium comprises a price of one of the first wagers.

29. The method of claim 1, further comprising:

generating additional first wagers; and wherein the second information is based on the additional first wagers as well as on the first wagers placed by the users.

30. The method of claim 29, wherein generating the additional first wagers comprises:

generating the additional first wagers using at least one of computer programs or parameters input by one or more administrators.

31. The method of claim 29, wherein generating the additional first wagers comprises:

generating the additional first wagers using data about wagers previously accepted.

32. The method of claim 31, wherein generating the additional first wagers using data about wagers previously accepted comprises:

retrieving, by the one or more processors, a wager profile, the wager profile comprising a distribution of wagers accepted from one or more users in one or more previous rounds of wagering; and generating, by the one or more processors, the additional first wagers using at least one of the wager profile, the distribution of wagers, wagers from the distribution of wagers, or trends observed from the wager profile.

33. The method of claim 29, wherein generating the additional first wagers comprises:

generating the additional first wagers using the first information.

34. The method of claim 1, further comprising:

generating, by the one or more processors, pseudo-wagers from internal processing;

using, by the one or more processors, the pseudo-wagers to supplement actual wagering by the users to create an appearance of wagering activity at variance with the actual wagering.

35. The method of claim 1, further comprising:

providing the at least two users with an opportunity to wager based on the third information, the opportunity to wager being provided at a premium relative to another opportunity to wager based on the second information and the first set of likelihood values.

36. The method of claim 35, wherein providing the at least two users with the opportunity to wager comprises:

providing, by the one or more processors, the at least two users with the opportunity to wager.

37. The method of claim 35, wherein the third information comprises the second set of likelihood values.

38. The method of claim 1, wherein the event comprises an event related to at least one of a card game, a slot game, a lottery game, a casino game, a race, or a sporting event.

39. The method of claim 1, wherein the event comprises at least one of:

games of chance;
a card game;
a slot game;
a dice game;
craps;
a lottery game;
a casino game;
a race;
a political contest;
a sporting contest;
a lottery;
bingo; or
keno.

40. The method of claim 39, wherein the sporting contest comprises at least one of:

a baseball game;
a football game; and
a basketball game.

41. The method of claim 39, wherein the political contest comprises a United States Presidential election.

42. The method of claim 1, wherein the users comprise users of a wagering system.

43. The method of claim 42, wherein the wagering system comprises a pari-mutuel wagering system.

44. The method of claim 42, wherein at least some other users of the wagering system do not receive the first information, wherein the at least two other users use at least two gaming devices other than the one or more gaming devices, and wherein the one or more servers are configured to communicate with the at least two gaming devices via a communications network.

45. The method of claim 42, wherein providing the first information comprises:

making the first information available to all users of the wagering system.

46. The method of claim 1, wherein the event comprises a pari-mutuel game.

47. The method of claim 46, wherein the pari-mutuel game comprises at least one of a card game, a slot game, a lottery game, a casino game, a race, or a sporting event.

48. The method of claim 1, wherein the event comprises a non-pari-mutuel game.

49. The method of claim 1, wherein the event comprises an intermediate outcome of an otherwise broader event.

50. The method of claim 49, wherein the otherwise broader event comprises at least one of a card game, a lottery game, or a race; and wherein the event respectively comprises at least one of the next card to be drawn in the card game, the next ball to be drawn in the lottery game, or the race participant that is leading in the race at a point prior to an end of the race.

51. The method of claim 1, wherein the first information comprises one or more pieces of information.

52. The method of claim 1, wherein not every user to whom the first information is provided places a first wager of the first wagers.

53. The method of claim 1, wherein the event comprises a horse race, and the first information comprises at least one of a color of a horse, an age of the horse, a number of the horse, or a breed of the horse.

54. The method of claim 1, wherein the characteristic of the true outcome comprises a positive indication of the true outcome.

55. The method of claim 54, wherein the event comprises a card game, and the characteristic of the true outcome comprises at least one of a color of a winning card of the card game, a suit of the winning card, a number of the winning card, a range of numbers comprising the number of the winning card, or an identity of the next card to be drawn.

56. The method of claim 54, wherein the event comprises a horse race, and the characteristic of the true outcome comprises at least one of a color of a winning horse of the horse race, an age of the winning horse, a number of the winning horse, or a breed of the winning horse.

57. The method of claim 1, wherein the characteristic of the true outcome comprises a negative indication of the true outcome.

58. The method of claim 57, wherein the event comprises a card game, and the characteristic of the true outcome comprises at least one of a color that is not a color of the winning card of the card game, a suit that is not a suit of the winning card, a number that is not a number of the winning card, a range of numbers that do not comprise the number of the winning card, or a number that is not a number of the next card to be drawn.

59. The method of claim 1, further comprising:
prior to providing the first information, assessing a premium to the users as compensation for the first information.

60. The method of claim 59, wherein the premium comprises a price of one of the first wagers.

61. The method of claim 59, wherein the premium comprises a wager credit, the wager credit being redeemed by placing a future wager.

62. The method of claim 61, wherein the wager credit expires if the wager credit has not been redeemed by an expiration date.

63. The method of claim 1, further comprising:
prior to providing the first information, receiving one or more indications from the users, the one or more indications being indicative of an intent to place a first wager.

64. The method of claim 1, further comprising:
after providing the first information, providing one or more users of the users with an option not to place the first wager.

65. The method of claim 1, further comprising:
prior to providing the first information, providing one or more users of the users with an option of placing the first wager without receiving the first information.

66. The method of claim 1, wherein at least one user of the users comprises a non-human entity participating on behalf of at least one of a human individual or an organization.

67. The method of claim 1, wherein the at least two possible outcomes of the set of possible outcomes comprise combinations of one or more other possible outcomes of the set of possible outcomes.

68. The method of claim 1, wherein the first set of likelihood values is not equal to the second set of likelihood values.

69. The method of claim 1, wherein providing the first information comprises:
making the first information available to the public.

70. The method of claim 1, wherein providing the first information comprises:
outputting the first information as at least one of audio information or visual information.

71. The method of claim 70, wherein outputting the first information comprises:
outputting the visual information to at least one of a continuously updating ticker system, a user display interface, a portable device, or one or more sheets of paper.

72. The method of claim 70, wherein outputting the first information comprises:
outputting the audio information to at least one of a loudspeaker, or an audio speaker of a device.

73. The method of claim 1, wherein providing the third information comprises:
making the third information available to the public.

74. The method of claim 1, wherein providing the third information comprises:
outputting the third information as at least one of audio information or visual information.

75. The method of claim 74, wherein outputting the third information comprises:
outputting the visual information to at least one of a continuously updating ticker system, a user display interface, a portable device, or one or more sheets of paper.

76. The method of claim 74, wherein outputting the third information comprises:
outputting the audio information to at least one of a loudspeaker, or an audio speaker of a device.

77. An apparatus, the apparatus comprising:
one or more processors, wherein the apparatus is configured to communicate with one or more gaming devices via a communications network; and
memory, wherein the memory stores instructions that, when executed, cause at least one of the one or more processors to:
provide first information about a set of possible outcomes of an event to users of the one or more gaming devices, wherein at least a part of the first information identifies a characteristic of a true outcome of the set of possible outcomes, wherein the true outcome comprises at least one of:
an outcome that has actually occurred, and
an outcome that will definitely occur;
receive second information, the second information being based on at least first wagers placed by the users, the first wagers being placed following provision of the first information, wherein at least two of the first wagers are associated with at least one possible outcome of the set of possible outcomes;

determine a first set of likelihood values corresponding to the set of possible outcomes using the second information, wherein each likelihood value of the first set of likelihood values corresponds to a respective possible outcome of the set of possible outcomes;

determine a second set of likelihood values based at least in part on the first set of likelihood values if one or more likelihood values of the first set of likelihood values are less than a first threshold value or greater than a second threshold value, wherein the first threshold value is different from the second threshold value, and wherein the first threshold value and the second threshold value are derived from user data regarding expected biases;

associate the second set of likelihood values with at least two possible outcomes of the set of possible outcomes; and provide third information based on the second set of likelihood values to at least two users of the users.

78. A non-transitory tangible computer readable, medium, the non-transitory tangible computer readable medium comprising a set of instructions that, when executed, cause at least one processor of one or more processors to:

provide first information about a set of possible outcomes of an event to users of one or more gaming devices, wherein at least a part of the first information identifies a characteristic of a true outcome of the set of possible outcomes, wherein the true outcome comprises at least one of:

an outcome that has actually occurred, and an outcome that will definitely occur;

receive second information, the second information being based on at least first wagers placed by the users, the first wagers being placed following provision of the first information, wherein at least two of the first wagers are associated with at least one possible outcome of the set of possible outcomes;

determine a first set of likelihood values corresponding to the set of possible outcomes using the second information, wherein each likelihood value of the first set of likelihood values corresponds to a respective possible outcome of the set of possible outcomes;

determine a second set of likelihood values based at least in part on the first set of likelihood values if one or more likelihood values of the first set of likelihood values are less than a first threshold value or greater than a second threshold value, wherein the first threshold value is different from the second threshold value, and wherein the first threshold value and the second threshold value are derived from user data regarding expected biases;

associate the second set of likelihood values with at least two possible outcomes of the set of possible outcomes; and provide third information based on the second set of likelihood values to at least two users of the users; and wherein the one or more processors are configured to communicate with the one more gaming devices via a communications network.

* * * * *